US006035304A

United States Patent [19]

Machida et al.

[11] Patent Number: 6,035,304

[45] Date of Patent: Mar. 7, 2000

[54] SYSTEM FOR STORING AND PLAYING A MULTIMEDIA APPLICATION ADDING VARIETY OF SERVICES SPECIFIC THERETO

[75] Inventors: Kazuhiro Machida, Inzai; Takenosuke Harada, Yokohama; Shigeki Kaneko, Funabashi; Ryota Tsukidate, Tokyo; Yoshiyasu Takeuchi, Tokyo; Kenichi Fujita, Tokyo, all of Japan

[73] Assignee: Matsushita Electric Industrial Co., Ltd., Osaka, Japan

[21] Appl. No.: 08/881,235

[22] Filed: Jun. 24, 1997

[30] Foreign Application Priority Data

Jun. 25, 1996 [JP] Japan .................................... 8-164992
Jun. 28, 1996 [JP] Japan .................................... 8-169976

[51] Int. Cl.[7] ...................................................... G06F 17/30

[52] U.S. Cl. .............................. 707/104; 707/103; 348/6; 455/6.1

[58] Field of Search ................................ 707/1, 103, 104, 707/200; 395/682; 348/7, 12, 13, 6; 455/4.2, 5.1, 6.1

[56] References Cited

U.S. PATENT DOCUMENTS 4,775,935 10/1988 Yourick .................................. 364/401
5,317,732 5/1994 Gerlach, Jr. et al. .................. 707/103
5,696,869 12/1997 Abecassis ................................. 386/52
5,717,814 2/1998 Abecassis ................................. 386/46
5,724,472 3/1998 Abecassis ................................. 386/52
5,768,539 6/1998 Metz et al. ......................... 395/200.79
5,819,284 10/1998 Farber et al. ........................... 707/104
5,844,553 12/1998 Hao et al. .............................. 345/329

FOREIGN PATENT DOCUMENTS 7-231308 8/1995 Japan .

*Primary Examiner*—Thomas G. Black
*Assistant Examiner*—Frantz Coby
*Attorney, Agent, or Firm*—Lowe Hauptman Gopstein Gilman & Berner

[57] ABSTRACT

A system capable of storing the application packages and thereafter reproducing a desired one of the stored application packages at any time. The application package comprises a plurality of applications. Each of the applications comprises application data which comprises forms a main body of the application and service adding information (SAI) comprising various data including an application ID of the application. The SAIs are distributed independently from and prior to the application data. Each of the SAIs can include method IDs of methods for processing object data specified by a method processing program and a plurality of link data comprising application IDs of other applications. This permits the SAIs to form a tree structure of the applications. The methods are activated in a event driven manner.

41 Claims, 48 Drawing Sheets

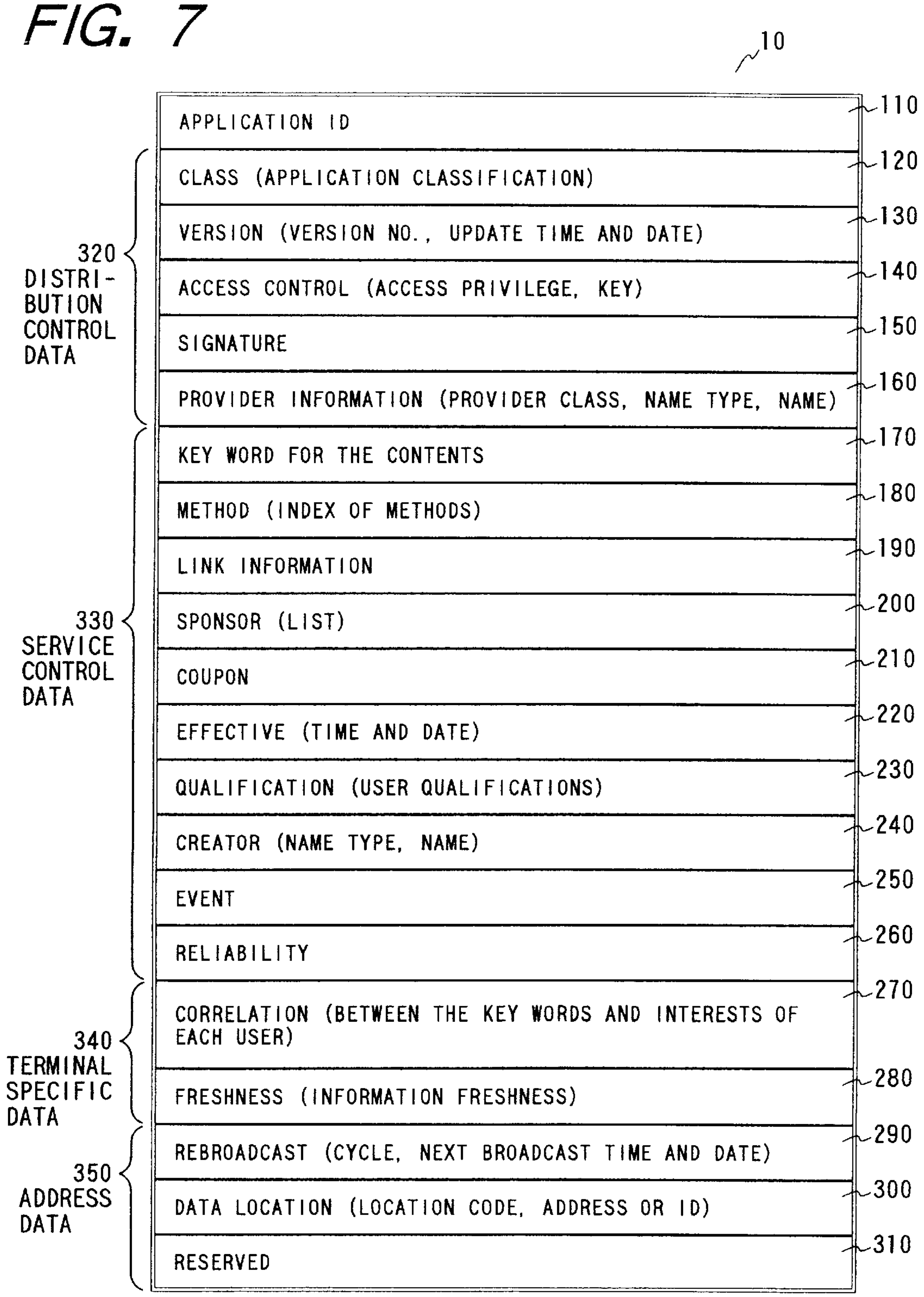

FIG. 7

| | | |
|---|---|---|
| | APPLICATION ID | 110 |
| 320 DISTRIBUTION CONTROL DATA | CLASS (APPLICATION CLASSIFICATION) | 120 |
| | VERSION (VERSION NO., UPDATE TIME AND DATE) | 130 |
| | ACCESS CONTROL (ACCESS PRIVILEGE, KEY) | 140 |
| | SIGNATURE | 150 |
| | PROVIDER INFORMATION (PROVIDER CLASS, NAME TYPE, NAME) | 160 |
| 330 SERVICE CONTROL DATA | KEY WORD FOR THE CONTENTS | 170 |
| | METHOD (INDEX OF METHODS) | 180 |
| | LINK INFORMATION | 190 |
| | SPONSOR (LIST) | 200 |
| | COUPON | 210 |
| | EFFECTIVE (TIME AND DATE) | 220 |
| | QUALIFICATION (USER QUALIFICATIONS) | 230 |
| | CREATOR (NAME TYPE, NAME) | 240 |
| | EVENT | 250 |
| | RELIABILITY | 260 |
| 340 TERMINAL SPECIFIC DATA | CORRELATION (BETWEEN THE KEY WORDS AND INTERESTS OF EACH USER) | 270 |
| | FRESHNESS (INFORMATION FRESHNESS) | 280 |
| 350 ADDRESS DATA | REBROADCAST (CYCLE, NEXT BROADCAST TIME AND DATE) | 290 |
| | DATA LOCATION (LOCATION CODE, ADDRESS OR ID) | 300 |
| | RESERVED | 310 |

10 a : SERIAL NO OF APPLICATION PACKAGE (a = 1, 2, ····).

i = 0 : THE SAI IS OF A MAIN APPLICATION (AIDa).

i ≠ : THE SAI IS OF AN APPLICATION IN SAI, IN A BROAD SENES, OF A MAIN APPLICATION (AIDa).

| ATTRIBUTE ID | LINK CLASS | LINK FELLOW | REFERENCE CLASS | REFERENCE | VALID TERM | SIGNATURE | SELECTION CRITERION (OPTION) |
|---|---|---|---|---|---|---|---|
| 191 | 192 | 193 | 190 | 195 | 196 | 197 | 199 |

| ATTRIBUTE ID | ATTRIBUTE DATA1 | SELECTION CRITERION (OPTION) |
|---|---|---|
| 101 | ATTRIBUTE DATA2 | 109 |
| | ATTRIBUTE DATA3 | |
| | ... | |

100

USER DATA TABLE 520

| NAME | SEX | BIRTH DATE | TASTE FACTOR | CATEGORY 1 | COUNT |
|------|-----|------------|--------------|------------|-------|
| 522  | 523 | 524        | 525          | CATEGORY 2 | COUNT |
|      |     |            |              | ⋮          | ⋮     |
|      |     |            |              | 526        | 527   |

670

| EVENT ID (EIDi-e) 252 | EVENT CLASS 253 | CONDITION 254 | ACTION CLASS 255 | ACTION 256 | ADDRESS 674 |
|---|---|---|---|---|---|
| 0-1 | 10 | PLAY | 01 | | |
| 2-1 | 01 | xxxxH | 00 | | |
| 2-2 | 01 | yyyyH | 10 | | |
| 2-3 | 01 | zzzzH | 00 | | |
| 3-1 | 00 | 13 : 00 | 10 | | AD3-1 |
| . . . | | | | | |

SYSTEM FOR STORING AND PLAYING A MULTIMEDIA APPLICATION ADDING VARIETY OF SERVICES SPECIFIC THERETO

BACKGROUND OF THE INVENTION

1. Field of the Invention

The invention relates to a multimedia application storage and player for storing distributed application packages each comprising a main application and service adding information which may include some additional applications and their service adding information and later playing a desired one of the distributed application packages while adding various services to the service.

2. Description of the Prior Art

As communication and data processing technologies advance, it has become possible to provide multimedia information in a digital form. Further, larger-capacity mass storage media has enabled such a broadcasting system as permits the user to play, at any desired time, applications which have been broadcast and stored in the mass storage media.

In one such prior art broadcasting system, a broadcast station broadcasts data for broadcasting programs at least including content data to be actually viewed by viewers and control data for the programs and each viewer receives and stores the broadcast data with and in a receiver and views a stored program at any time. There is also a broadcasting system so adapted as to also broadcast control programs for processing the broadcasting program. In this case, a set of program (content) data and control data is composed of one or more objects and broadcasting is done by the object. This prior art system is intended for widening the variation of displayed contents by distributing control programs.

However, in the broadcasting system, a control program has to be made for each of the broadcasting program because the contents and the corresponding control program for a broadcasting program constitutes an object. Accordingly, if the contents of a display accompanying the program is to be changed, the corresponding control program will have to be altered.

It is therefore an object of the invention to provide a broadcasting system and a multimedia storage and player which permit a variety of services to be added to the main program (or application) by simply preparing data for the services without any need of altering a control program.

SUMMARY OF THE INVENTION

According to the invention, a distributed application package is used in a system capable of storing the application packages and thereafter reproducing a desired one of the stored application packages at any time. The application package comprises at least one application. Each application comprises application data which comprises any of static data to display, time series data to play and program to execute and which forms a main body of the application and service adding information (SAI) comprising various data including an application ID of the application. The SAIs are distributed independently from and prior to the application data.

Each of the SAIs can include a plurality of method IDs of methods for processing object data specified by a method processing program; a plurality of event attributes each defining an event which is expected to occur during reproduction of the application and an object to be executed in response to the event, the object comprising one of the methods; a plurality of link attributes comprising application IDs of other applications, in the application package, for each permitting the SAI an access to a corresponding SAI of the other applications, thereby permitting the SAIs to form a tree structure of the applications; and a plurality of reference attributes for locating respective data sets in the system.

One of the applications contained in a application package is the main application of the application package. The link attributes and the reference attributes enable each of the methods identified by the plurality of method IDs to process as the object data any of the various data and the application data of lower layer applications which are directly or indirectly associated with each of the SAIs. This feature permits the main application to be provided with a wide variety of additional services.

The inventive application storing and playing system comprises a hard disc device for storing the application packages and other data and programs; a plurality of methods stored in the hard disc device for providing respective functions; user interface responsive to a reception of a command code intended for each application from a user for providing a message associated with the command code and the application ID of the application; and a method processing program, operative on the basis of the message and the application ID of the application, for executing one of the methods associated with the message using relevant data of the application identified by the application ID, thereby reproducing the relevant data of the application.

In the inventive system, in response to the user interface, the data contained in the event attributes of the application containing the method ID of the one of the methods is temporarily stored in an event table to make the data available only during the period of execution of the one of the methods. In response to an occurrence of one of events defined in the event table, an object associated with the one of events is executed. There are three kinds of events (a timer value, a command and a predetermined code in a data stream of the application data being executed).

BRIEF DESCRIPTION OF THE DRAWING

Further objects and advantages of the present invention will be apparent from the following description of the preferred embodiments of the invention as illustrated in the accompanying drawings. In the drawing.

FIG. 7 is a diagram showing an exemplary SAI consisting of attributes and used in the multimedia application storage/player of FIG. 4;

DETAILED DESCRIPTION OF THE PREFERRED EMBODIMENTS

Definition of some Terms

As mentioned above, an object of the invention is to provide a system for providing the user with not only a multimedia service (main service) but also a wide variety of additional services specific to the main service. For the purpose of the simplicity of description, it is assumed that the main service and the additional services of the main service are distributed through a multiplexed TV broadcast. In this case, the main services comprise the programs of one of the channels of the TV broadcast. Each additional service may be text information, still pictures, audio information, or any combination thereof. The additional service may be even a program of other channel or a computer program. A set of data which realizes each of these main and additional services is referred to as an "application".

Figure 1:
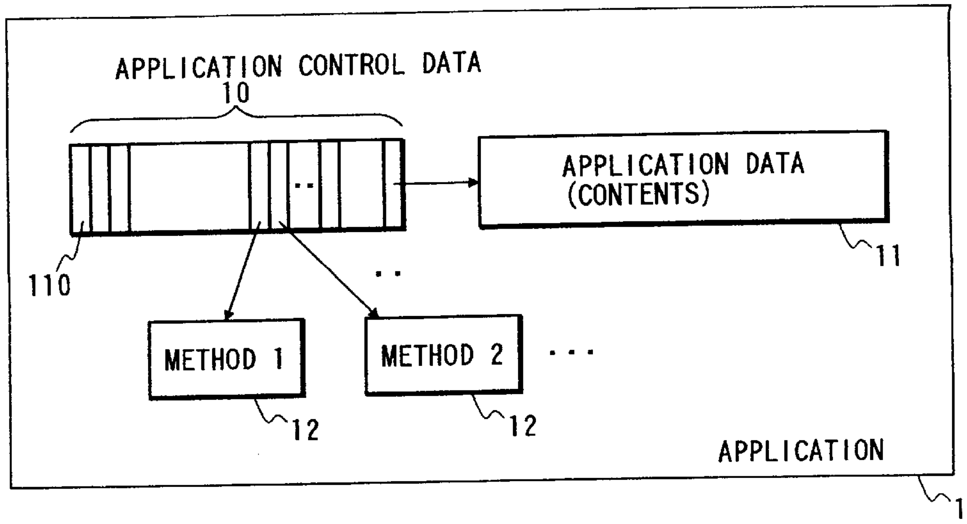
FIG. 1 is a diagram showing, in a simplified form, a structure of an application.

FIG. 1 is a diagram showing, in a simplified form, a structure of an application. In FIG. 1, an application 1 comprises application data 11 (the contents of the application) used for realizing the service for which the application is intended and service adding information (SAI) in a narrow sense, 10, which includes, as attributes, an ID 110, information necessary for providing additional services and pointing data for the application data 11 as detailed later. Service adding information (SAI) in a narrow sense, 10, usually but not necessarily includes one or more methods 12 which are used in object-oriented programming (OOP) for defining procedures for data included in the SAI (and other SAI of lower layer(s) as described later). Thus, each SAI in a narrow sense, 10, constitutes an object in a sense used in OOP.

Since SAI in a narrow sense, 10, can include link data fields which each associate the SAI with other SAI, it is possible to form a tree structure of applications 1 in which an application for a main service is located at the top and the other applications for the additional services associated with the main application are located at the other nodes. Such a set of a main application and the additional applications associated with the main application is, hereinafter, referred to as an "application package".

Figure 2:
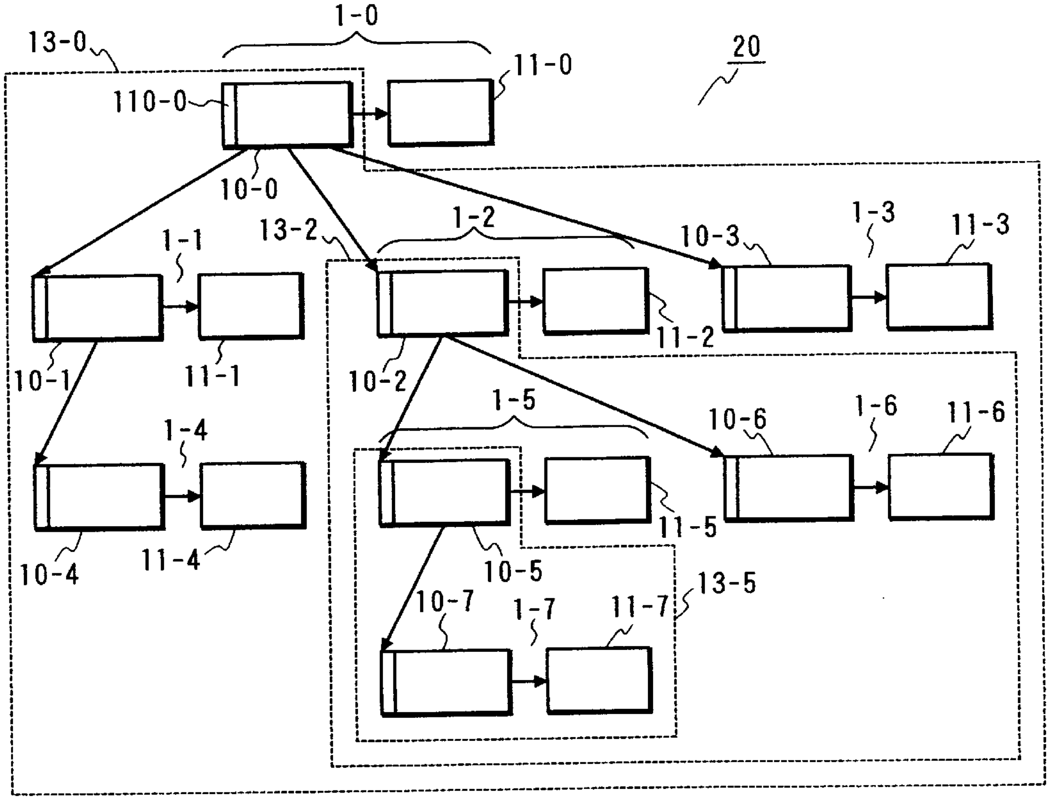
FIG. 2 is a diagram showing an example of an application package according to the principles of the invention.

FIG. 2 is a diagram showing an example of an application package according to the principles of the invention. In FIG. 2, the application package 20 comprises applications 1-0 through 1-7 which each comprise SAI 10-i in a narrow sense and associated application data 11-i (i=0, 1, 2, . . . , 7). The application 1-0 which provides a main service or the main application 1-0 is associated with applications 1-1 through 1-3 by including IDs of the applications 1-1 through 1-3 in link fields (not shown) as detailed later. The application 1-1 is further associated with application 1-4. The application 1-2 is further associated with applications 1-5 and 1-6. The application 1-5 is further associated with application 1-7.

Though the application data 11-0 is accompanied by the SAI 10-0 in a narrow sense, since the SAI 10-0 is associated directly or indirectly with the applications 1-1 through 1-7, the application 11-0 can be thought to be accompanied by not only the SAI 10-0 but also by the applications 1-1 through 1-7, which are referred to en bloc as "SAI 13-0 in a broad sense. That is, the application data 11-0 or the main application data 11-0 of the application package 20 has SAI 10-0 in a narrow sense and SAI in a broad sense, 13-0. From this point of view, the application data, e.g., 11-2 has SAI 10-2 in a narrow sense and SAI in a broad sense, 13-2, which comprises SAI 10-2 and applications 1-5 through 1-7. However, it is assumed that a simple expression "service adding information" or "SAI" means SAI 10 in a narrow sense except when otherwise noted.

It is noted that the service adding information 10 is broadcast prior to the broadcast of the corresponding application data.

Obtaining Application Packages

Figure 3:
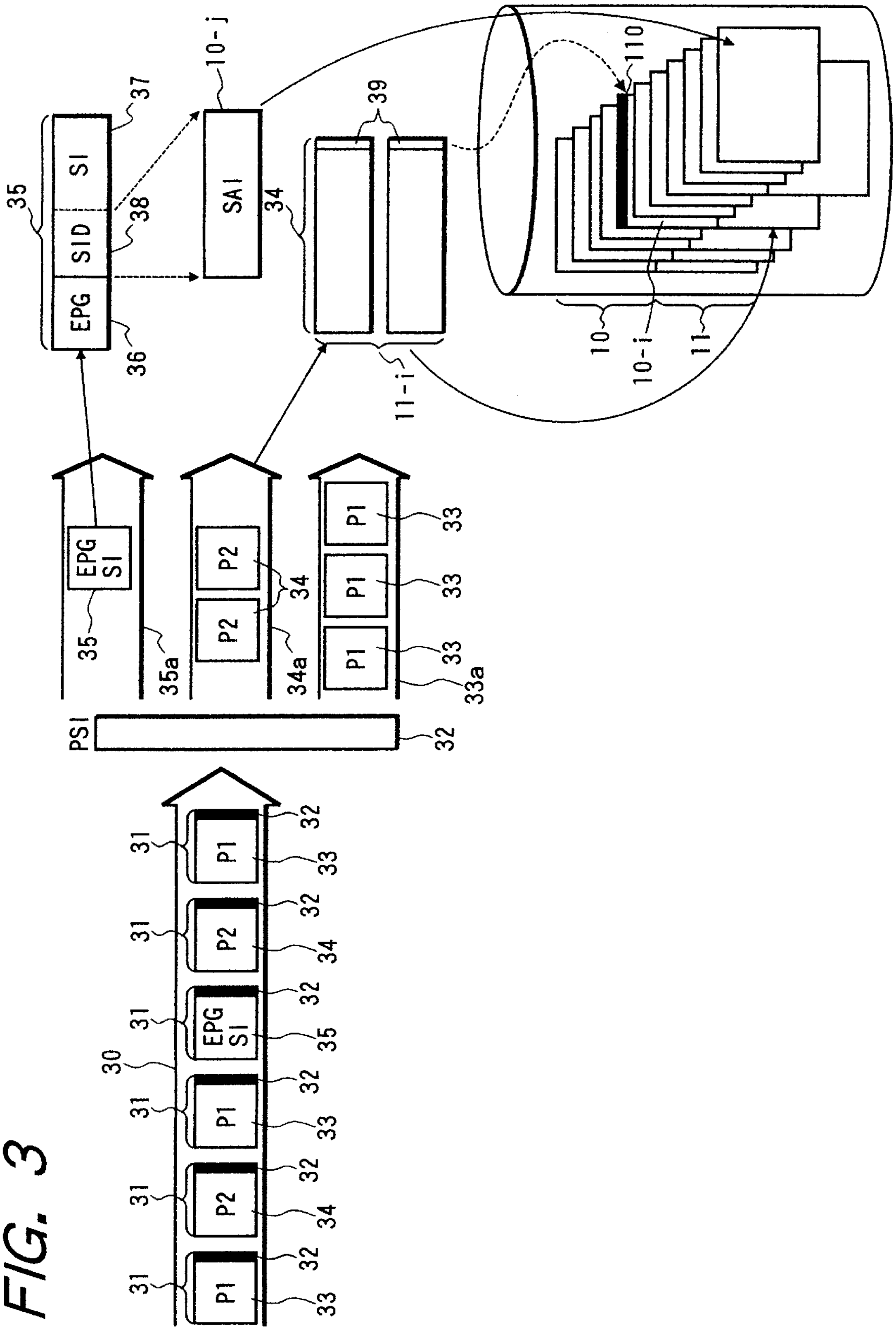
FIG. 3 is a diagram showing an exemplary way of broadcasting and storing multimedia applications according to the principles of the invention.

FIG. 3 is a diagram showing an exemplary way of broadcasting and storing applications 1 according to the principles of the invention. As shown in FIG. 3, it is assumed that the broadcasting is done in accordance with the well-known DVB (digital video broadcasting) standard. In FIG. 3, a transport stream 30 comprises packets 31 of 3 multiplexed channels 33*a*, 34*a* and 35*a*. Each of the packets 31 includes a PSI (program specific information) 32 defined in the DVB standard. When a packet 31 is received by the inventive system, the packet 31 is classified according to the PSI 32. In this example, the packets 31 containing, e.g., image program packets (P1) 33, digital video program packets (P2) 34 according to the invention and EPG (electronic program guide)/SI (service information) packets (EPG/SI) 35 (also defined in the DVB standard) are classified into channel 33*a*, 34*a* and 35*a* respectively with the PSIs removed. The EPG/SI packet 35 comprises EPG data 36, service information (SI) 37 and a service information descriptor (SID) 38. Most of the above described service adding information (SAI) 10 is defined as the service information descriptor (SID) 38. Then, the SID 38 has terminal specific data added thereto and is stored in a hard disc together with the terminal specific data as SAI 10-j as further detailed later.

On the other hand, the PSI-removed digital video program packets (P2) 34 are stored in the hard disc as application data 11-i corresponding to SAI 10-i whose ID 110 coincides with the IDs 39 of the packets (P2) 34, which yields a complete application 1-i. In this case, pointing data for the stored application data 11-i is written in the corresponding SAI 10-i as detailed later.

Since SAI 10-i is transmitted prior to the transmission of the corresponding application data 11-i, some of the SAI 10 are stored alone because the corresponding application data 11 have not been received. Further, SAI in a broad sense, 13, has to be broadcast prior to the broadcast of the main application data 11. Thus, the reception of the main application data 11 completes the application package 20.

System Resources

Figure 4:
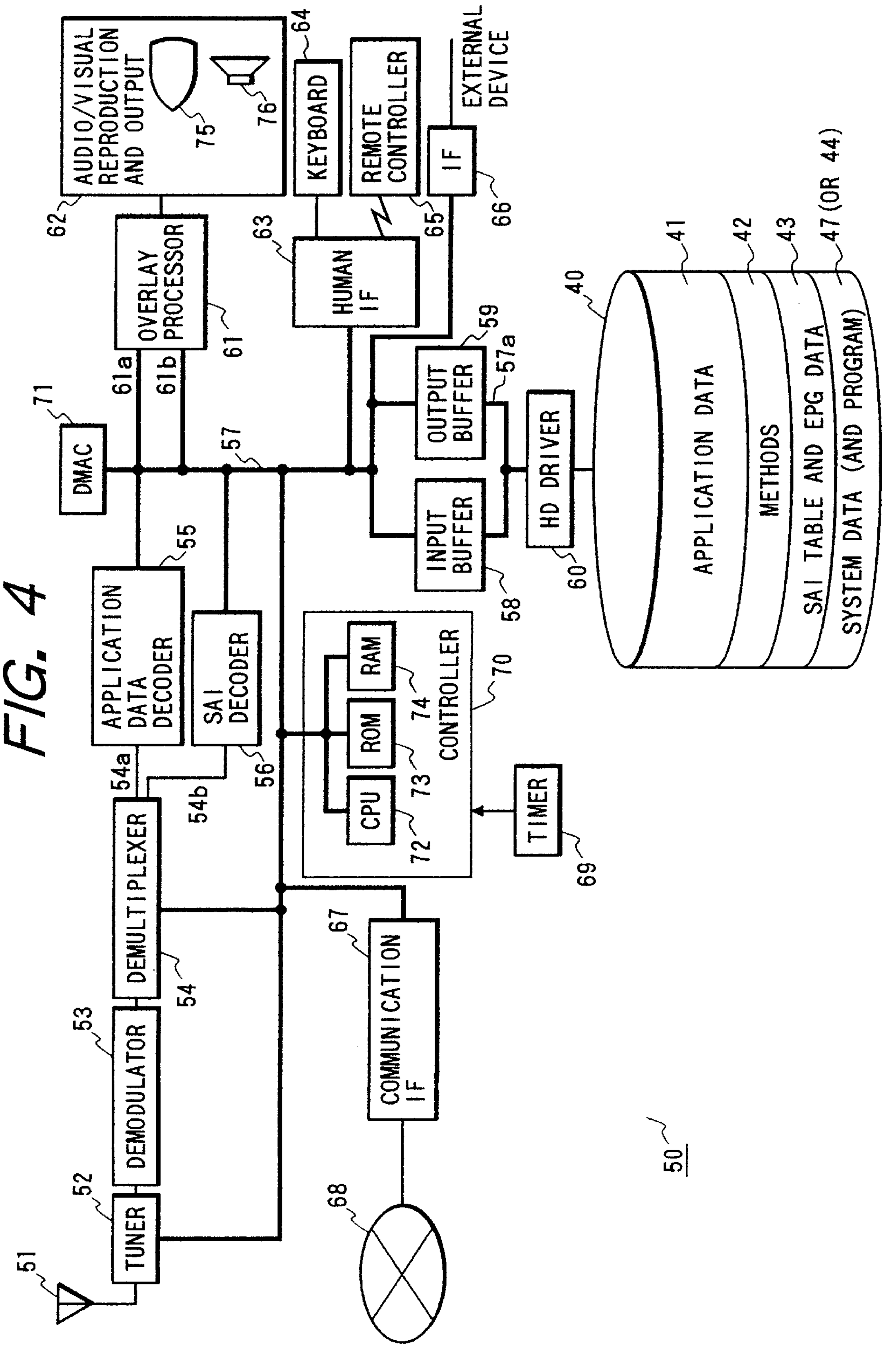
FIG. 4 is a schematic block diagram showing an arrangement of an illustrative embodiment of a multimedia application storage/player according to the principles of the invention.

FIG. 4 is a schematic block diagram showing an arrangement of an illustrative embodiment of a multimedia application storage/player according to the principles of the invention. In FIG. 1, the multimedia application storage/player 50 comprises an antenna 51 for receiving radio waves; a tuner 52 for selecting a desired broadcast signal 30; a multiplexer 54 for separating EPG.SI packets 35 and application data packets 34 from the signal 30; an application data decoder 55 for decoding data of the application data packets 34 and launching the decoded application data on a data bus 57; a SAI decoder 56 for decoding the EPG.SI packets 35 and launching the decoded data on the data bus 57, a controller 70 for controlling the operation of the whole system 50; an input buffer 58 for temporarily storing the data from the application data decoder 55, EPG data from the SAI decoder 56 and data-added SI data from the controller 70 and passing these data to a data bus 57*a*; a hard disc (HD) driver 60 for writing the data from the input buffer 58 into the hard disc 40 and reading data from the hard disc (HD) 40; an output buffer 59 for temporarily storing the data from the HD drive 60; an overlay processor 61 for overlaying the data input from terminal 61*a* with the data input from terminal 61*b*; an audio/visual reproduction and output portion 62 for reproducing and outputting the received signal; a keyboard 64 and a remote controller 65 for permitting the user to enter data; a human interface (IF) 63 for providing an interface between the data bus 57 and the keyboard 64 and the remote controller 65; an IF 66 for permitting a communication with an external device (not shown); a communication IF 67 for providing an interface with the public telecommunication network 68; a timer 69 for supplying a timer signal to the controller 70, a DMAC (direct memory access controller) for controlling the data transfer from the application data decoder 55 to the input buffer 58, from the output buffer 59 to the input terminal 61*a* of the overlay processor 61, and from the application data decoder 55 to the input terminal 61*a* of the overlay processor 61. The controller 70 comprises a CPU (central processing unit) 72, a ROM (read only memory) 73 and a RAM (random access memory) 74 as well-known in the art. The audio/visual reproduction and output portion 62 includes a display device 75 and a loudspeaker 76.

It will be helpful for better understanding to describe software resources and the structure of SAI 10 prior to describing operation of the multimedia application storage/player 50.

Figure 5A:
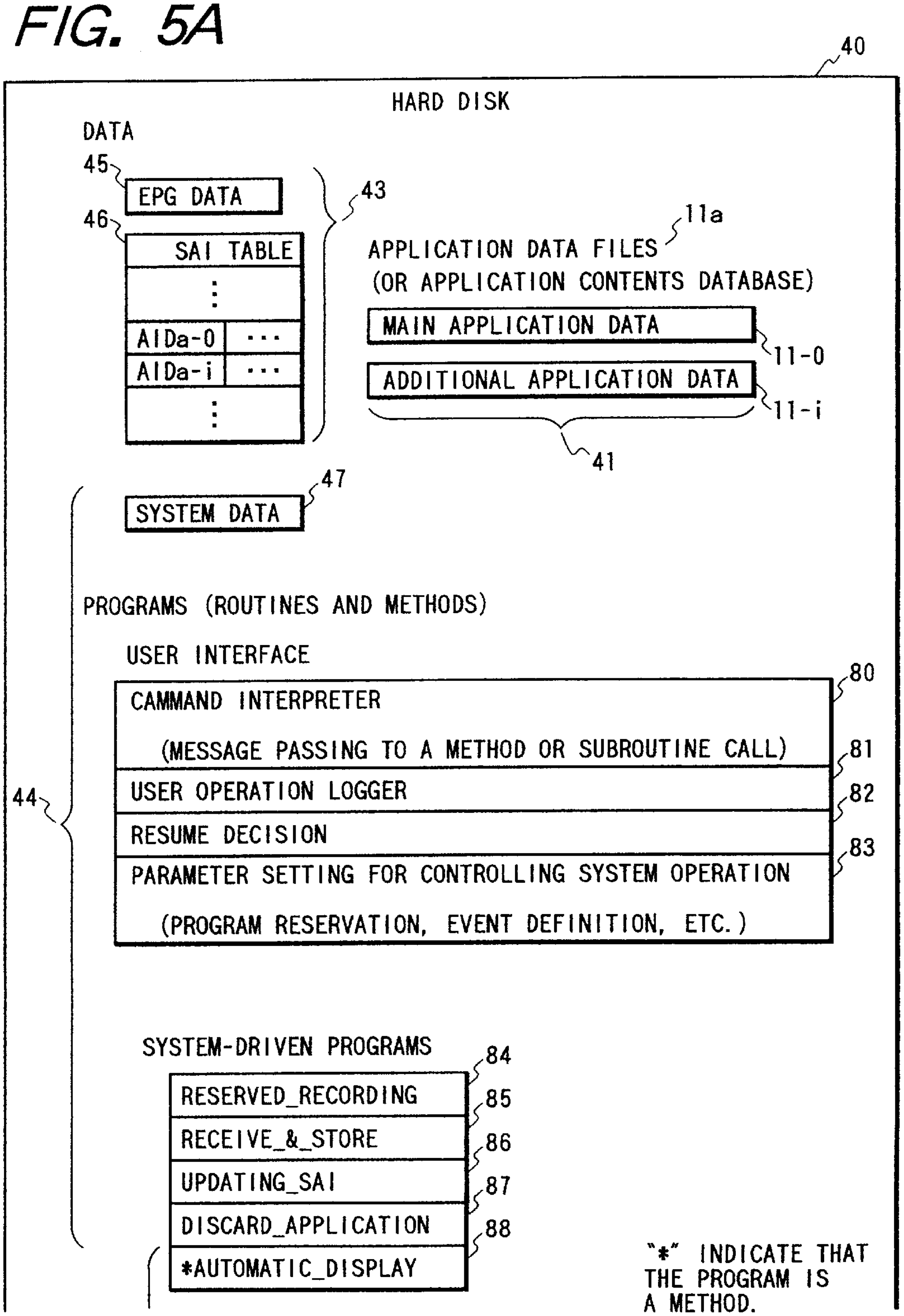
FIGS. 5A and 5B are diagrams which, when combined at the former bottom and the latter top, constitute a table of contents in the HD 40 of FIG. 4.
Figure 5B:
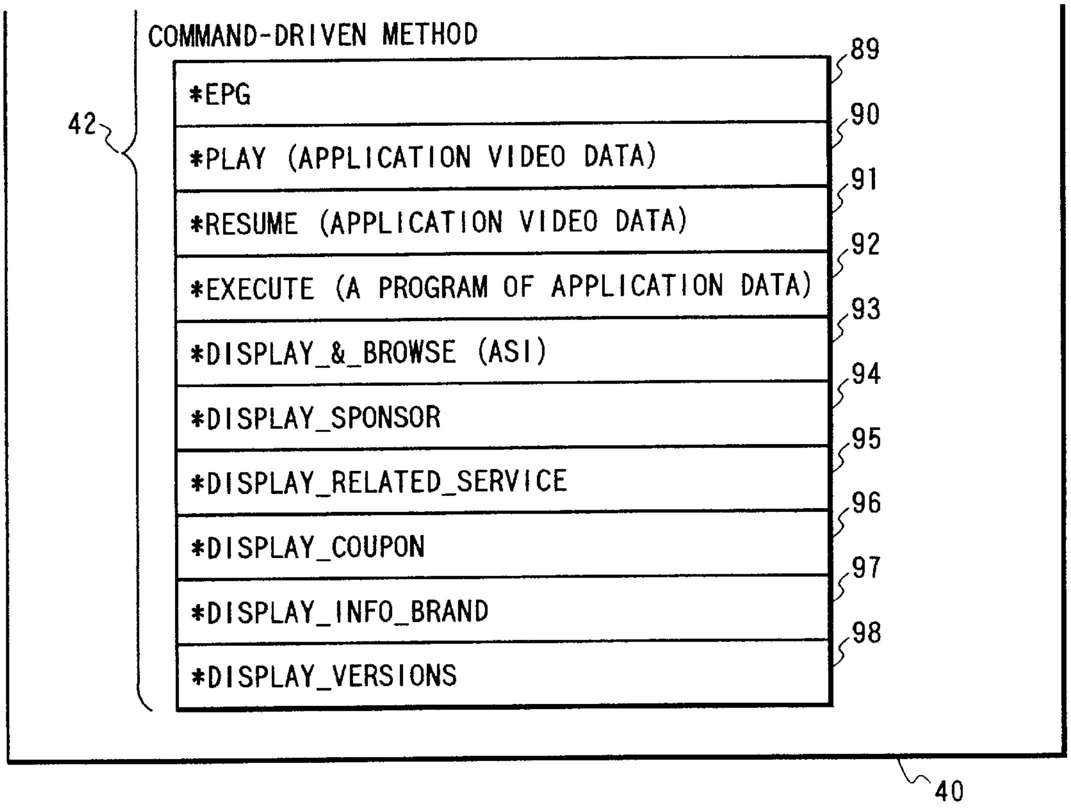

FIGS. 5A and 5B are diagrams which, when combined at the former bottom and the latter top, constitute a table of contents in the HD 40 of FIG. 4. In FIG. 5A, the HD 40 contains, as data, application data 11 in the form of files 11*a* or a database, EPG data 45, an SAI table 46 and system data as described in conjunction of system operation. A small piece of EPG data is repeatedly broadcast and is collected for coming few days through a week to form the EPG data 45.

As a user interface and its related function, the HD 40 contains a well-known command interpreter 80; a user operation logger 81 for logging data entered by the user into a log file; a resume decision 82 which is activated when the user issues a play command for a main application, checks the log file to see if the main application has been played to the end and issues either a pay command or a resume command plus a restart address; and a parameter setting 83 for permitting the user to set parameters for program reservation, event definition, etc.

The following programs are of event-driven types. As system (or application)-driven methods or subroutines, the HD 40 contains programs RESERVED_RECORDING 84, RECEIVE_&_STORE 85, UPDATING_SAI 86, DISCARD_APPLICATION 87, and AUTOMATIC_DISPLAY 88. These programs 84 through 88 are demon programs. The above described programs 80 through 87 may be realized either as subroutines or as methods because operation of the programs is independent of the kind of applications. However, it is preferable to realize the program 88 and the following programs as methods.

In FIG. 5B, the HD 40 further contains, as command-driven methods, methods EPG 89, PLAY (APPLICATION VIDEO DATA) 90, RESUME (APPLICATION VIDEO DATA) 91, EXECUTE (A PROGRAM OF APPLICATION DATA) 92, DISPLAY_&_BROWSE (ASI) 93, DISPLAY_SPONSOR 94, DISPLAY_RELATED_SERVICE 95, DISPLAY_COUPON 96, DISPLAY_INFO_BRAND 97, DISPLAY_VERSIONS 98.

Figure 6:
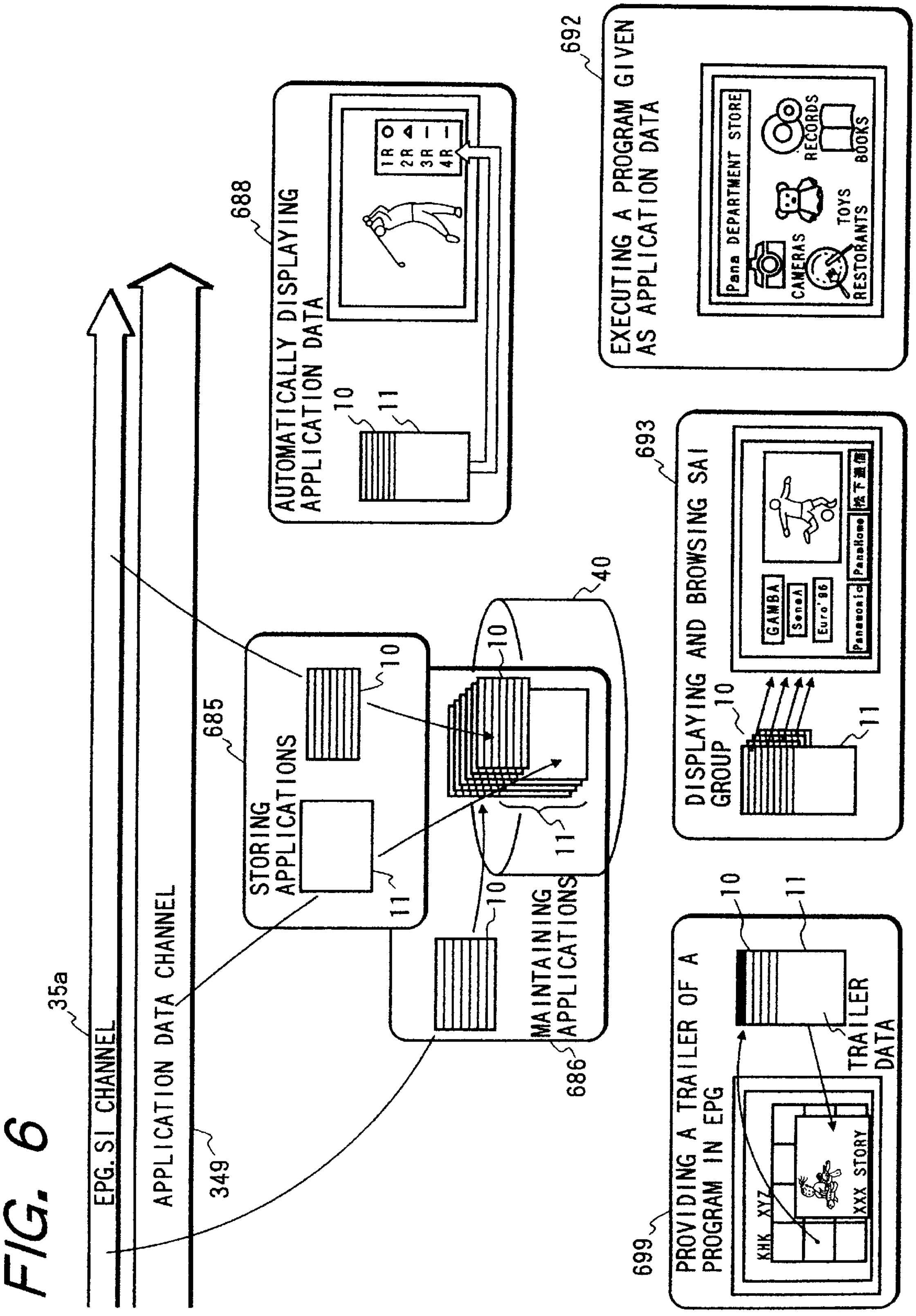
FIG. 6 is a diagram showing exemplary operations of the functions of FIG. 4.

Some of these methods will be described with examples. FIG. 6 is a diagram showing exemplary operations of the programs of FIGS. 5A and 5B.

In order to store applications (685), the method RESERVED_RECORDING 84 always monitors the method the EPG.SI channel 35*a* and the application data channel 34*a*. For applications specified or reserved by the user, RESERVED_RECORDING 84 stores SAI 10 and corresponding application data 11 with the former and the latter associated with each other in the hard disc 40.

The selected and stored applications are maintained by the resident demon program UPDATE_SAI 86. If partial replacement data for certain SAI is received, the demon program 86 updates the SAI with the received data as shown in box 686. If any of the predetermined events that suite a user's taste is detected, then UPDATE_SAI 86 adds a link to an appropriate link list according to the detected event so that when a viewer program is invoked, information which suits the user's taste is displayed preferentially. If some space is to be secured in the hard disc 40, the demon program DISCARD-APPLICATION 87 discards the oldest application which is not reserved. A reserved application is will not be discarded till the user cancels the reservation or issues a discard command for the reserved application.

Automatically displaying application data as shown in box 688, is achieved by using the method AUTOMATICALLY DISPLAY. In this case, the application data may be displayed either overlaying or blending the original picture. For example, an indicator of the direction of a wind in the golf course or the score of a relevant player can be displayed in response to the narration. Similarly, as for such data concerning a dealer as a reference to the dealer in an automobile commercial during the broadcasting or playing of main application data 11-0, it is also possible to displaying data adapted to the user's area on pictures identical to the original commercial pictures instead of using the original data by adding, to the SAI 10-0 of the main application 1-0, a link data to an application the application data 11-i of which contains the data adapted to the user's area and the SAI 10-i of which has a reference to a method of overlaying the adapted data on the original data in the commercial pictures.

Alternatively, the user can operate the remote controller to display current scores of the registered players, pictures in which a swing form is analyzed or details for any of the golf clubs used by the players independently of the context of the program or the main application under play.

As for EGP (electronic program guide), there have been developed viewers which interactively provide a program guide table through easy operation (e.g., Gem Ster, Star Sight, etc.). However, these viewers can provide detailed information only in the form of "text information". On the other hand, the invention permits the user to view a trailer interactively by adding, to the SAI 10-0 of each of the main applications 1-0 contained in the program guide table, a link data to an application for playing the trailer of the main application 1-0 (i.e., an application which contains the method PLAY 90 in its SAI and has trailer data as its application data) as shown in box 699. This provide the user with rich information for selecting one or more programs.

The method DISPLAY_&_BROWSE 93 permits the user to display and browsing SAI itself, that is, display not only the application data 11 but also details of the SAI 10 such as information on sponsors, coupons and links to the other applications associated with the main application as shown in box 693. Following the links to the other applications permits the user to browse SAI of other applications, serving as a service navigator. If the SAI to which a link points is not found, it is also possible to retrieve the SAI from the information source through a communication interface.

Executing a program given as application data is possible by creating an application 1 the application data of which comprises a computer program and the SAI of which has a reference to the method EXECUTE 92. The computer program can have a variety of contents, e.g., an on-line TV telemarketing as shown in box 692 of FIG. 6.

Structure of SAI

Figure 8:
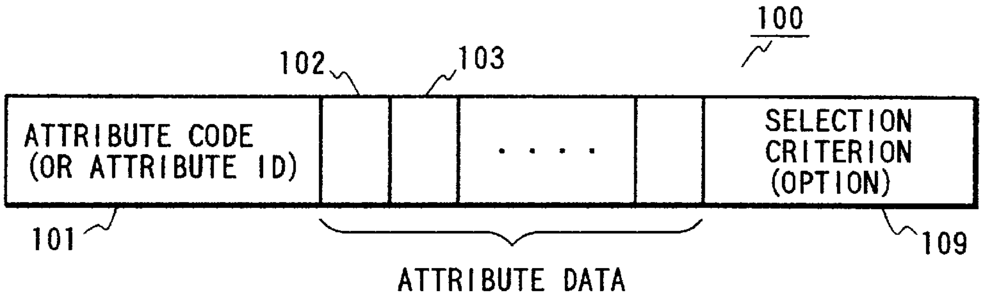
FIG. 8 is a diagram showing the structure of each of the attributes 110 through 310, where it is assumed that each of the attributes 110 through 310 is denoted by a numeral 100.

FIG. 7 is a diagram showing an exemplary SAI consisting of attributes and used in the multimedia application storage/player of FIG. 4. In FIG. 7, SAI 10 of each application 1 is a set of attributes 110 through 310. FIG. 8 is a diagram showing the structure of each of the attributes 110 through 310, where it is assumed that each of the attributes 110 through 310 is denoted by a numeral 100. Then each attribute 100 at least comprises an attribute code or ID 101 and attribute data.

Specifically, in addition to an attribute APPLICATION ID 110, SAI 10 comprises distribution control data 320, service control data 330, terminal specific data 340, and address data 350. The attributes other than terminal control data 340 which comprises attributes 270 and 280 and has been added to the SAI 10 when stored in HD 40, e.g., the attributes 110 through 260 and 290 through 310 are distributed by, e.g., broadcasting in this specific embodiment.

In the following description, it is assumed, following the notation rule in FIGS. 7 and 8, that the element number of the attribute ID of each attribute is equal to the element number of the attribute plus one, and each attribute ID is written in higher case.

Figure 9:
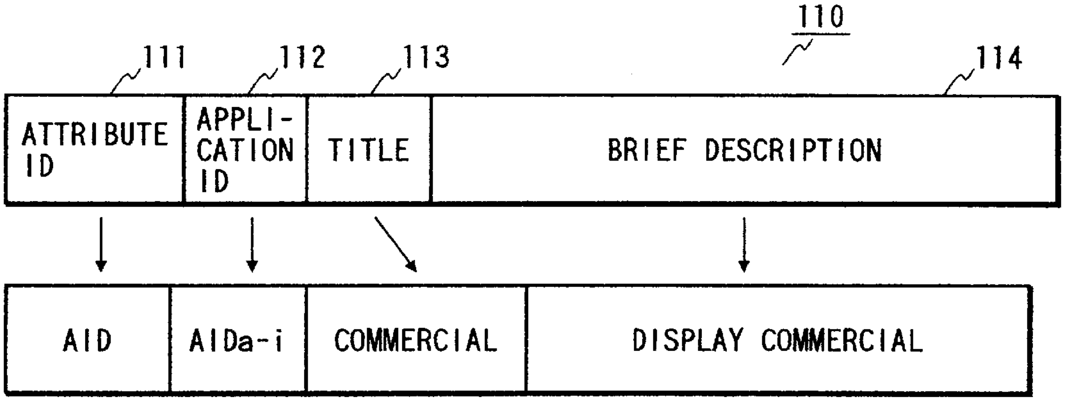
FIG. 9 shows a diagram showing an exemplary structure of the attribute APPLICATION ID 110 of FIG. 7 and an example of APPLICATION ID 110.

The SAI 10 at least comprises the attribute APPLICATION ID 110. FIG. 9 shows a diagram showing an exemplary structure of the attribute APPLICATION ID 110 of FIG. 7 and an example of APPLICATION ID 110. It is noted that the application ID of an application 1 can be regarded as identical to the ID of the SAI 10 of the application 1 because every application 1 can have only one SAI 10. In FIG. 9, the attribute APPLICATION ID 110 comprises, for example, the above described attribute code or ID 111, an application ID 112, a title 113, and a brief description 114. It is assumed that the application ID 112 of (the SAI 10 of) a certain main application 1 is, say, $AID_{a-0}$ and the application ID 112 of an application 1 contained in the SAI (in a broad sense) 13 of the main application $AID_{a-0}$ is $AID_{a-i}$ as shown in field 112. Here, the subscript "a" is a serial number of the application package 20 or the main application and "i" is a serial number of each application contained in the SAI 13 of the main application $AID_{a-0}$ (i=1, 2, . . . N), where N is the number of applications associated directly or indirectly with the application $AID_{a-0}$.

($AID_{a-0}$ and $AID_{a-i}$ indicate a concatenation of an application package ID ($AID_a$) and an ID within an application package, e.g., $ID_i$. If $AID_a$=xxxx and $ID_i$=yy, then $AID_{a-i}$ may be xxxxyy, xxxx-yy, and so on.)

Again in FIG. 7, the distribution control data 320 comprises the attributes of CLASS 120 comprising:

a code or word indicative of the kind or classification of application data (contents) 11;

VERSION 130 comprising:

a list of (version No., update time and date);

ACCESS CONTROL 140 comprising:

a list of (access privilege, key);

SIGNATURE 150 comprising:

an electronic signature for preventing illegal alteration; and

PROVIDER 160 comprising:

a provider class indicative of the kind of provider (own company, a production, other broadcast station, etc.), a name type (full, abbreviated, common, stage or screen), and a provider name.

The service control data 330 comprises the attributes of

KEY_WORDS 170 comprising:

one or more key word indicative of the contents 11

METHOD 180 comprising:

an index of methods used in the application 1;

LINK 190 comprising:

data defining a relation with other application or SAI as detailed later;

SPONSOR 200 comprising:

a sponsor list;

COUPON 210 comprising:

the degree, effect objects and effective date of an attached coupon and the requirement for the coupon;

EFFECTIVE 220 comprising:

effective time and data of the contents 11;

QUALIFICATION 230 comprising:

data indicative of the conditions required for using the application if the use is limited;

CREATOR 240 comprising:

information on the creator or producer of the contents;

EVENT 250 comprising:

a definition of event for a event-driven method; and

RELIABILITY 260 comprising:

numerical data indicative of the reliability of the contents 11.

The terminal specific data 340 comprises the attributes of

CORRELATION 270 comprising:

numerical data indicative of a correlation between the key words 171 and interests of each user; and FRESHNESS 280 comprising:

any of the time expired from the last update time found in attribute 131, the time till the next broadcast time (described later), or the time and date till the effective time and date founded in attribute 221.

The address data 350 comprises the attributes of

REBROADCAST 290 comprising:

a broadcasting cycle, next broadcast time and date;

LOCATION 300 comprising:

a location code indicative of any of HD 40, a removable memory media, a provider, etc. and location information such as a path name, a volume ID plus path name, and a network address of the application data or the contents of the application ($AID_{a-i}$); and RESERVED 310 comprising:

a reserved space for future use.

Figure 10:
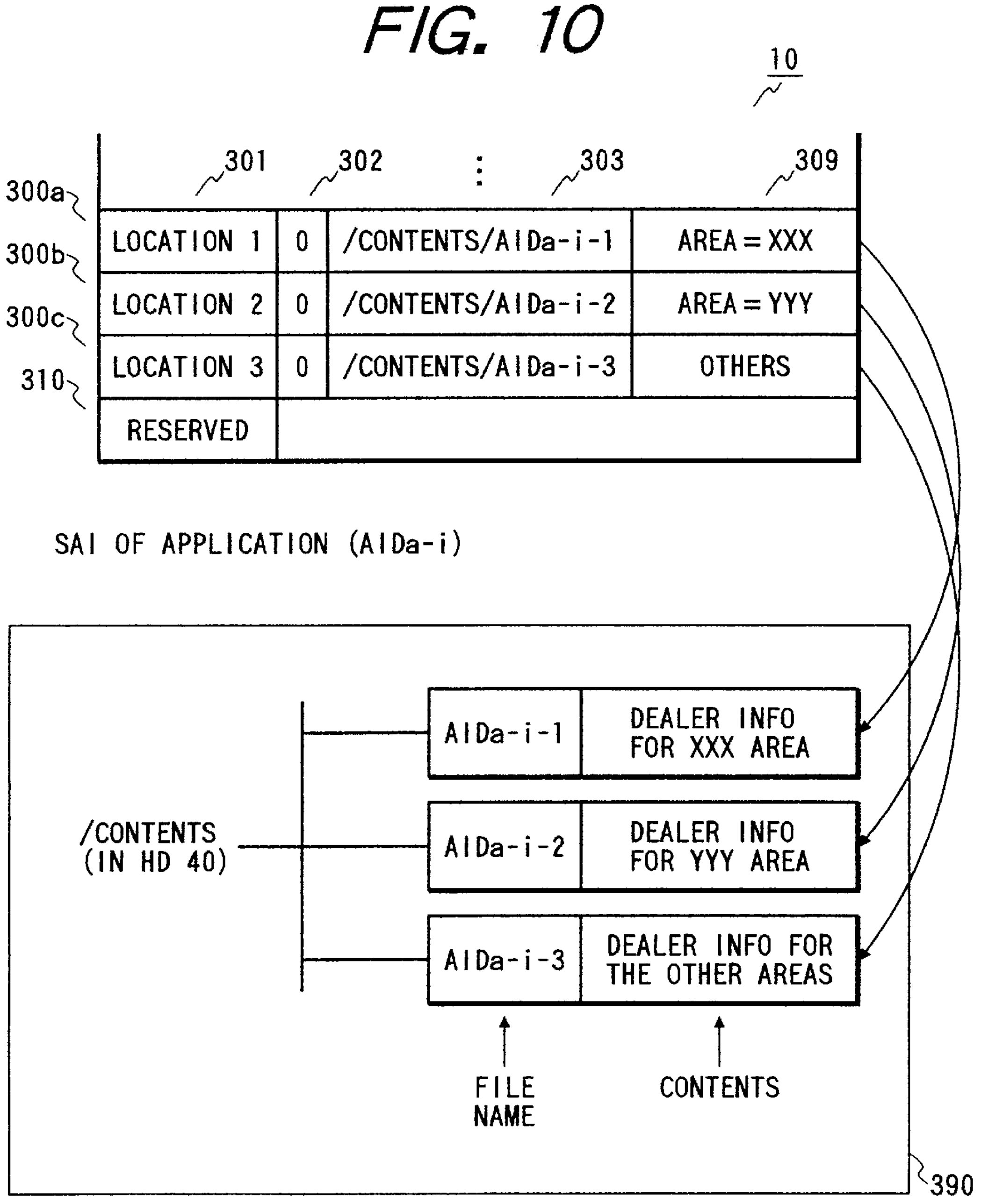
FIG. 10 is a diagram illustrating an example of SAI 10 which contains three attributes each including a SELECTION CRITERION 109.

Returning now to FIG. 8, each attribute 100 can have a SELECTION CRITERION field 109 if necessary. According to the invention, SAI is permitted to have a plurality of attributes of an identical kind, which causes the necessity. FIG. 10 is a diagram illustrating an example of SAI 10 which contains three attributes each including a SELECTION CRITERION 109. In FIG. 10, the SAI of an application 1 whose ID is $AID_{a-i}$ (hereinafter, referred to as an "application ($AID_{a-i}$) 1") has three attributes LOCATION1 300*a* through LOCATION3 300*c*. As described above, each LOCATION attribute comprises LOCATION CODE 302, LOCATION INFORMATION 303 and SELECTION CRITERION 309. The three attributes are as follows.

| | | | |
|---|---|---|---|
| LOCATION1 | 0 | /contents/$AID_{a\text{-}i\text{-}1}$ | area=XXX |
| LOCATION2 | 0 | /contents/$AID_{a\text{-}i\text{-}2}$ | area=YYY |
| LOCATION3 | 0 | /contents/$AID_{a\text{-}i\text{-}3}$ | OTHERS. |

As shown in FIG. 10, the files $AID_{a-i-1}$ through $AID_{a-i-3}$ contains dealer information for XXX area, YYY area and the other areas, respectively.

Thus, assuming that LOCATION CODE=0 means the application data is in a built-in hard disc, i.e., HD 40, the attribute 300*a* indicates that if the storage/player 50 is located XXX area, data to display is located in the file identified, for example, by a path /contents/$AID_{a-i-1}$ in a /contents folder 390, causing dealer information for XXX area to be displayed. Similarly, it is seen from attributes 300*b* and 300*c* that if the storage/player 50 is located in YYY area, the contents of a file identified by a path /contents/ $AID_{a-i-2}$, that is, dealer information for YYY area is displayed, and for the other areas, the contents of a file identified by a path /contents/AID*a–i–3*, that is, dealer information for the other area is displayed.

Thus, including SELECTION CRITERIONs in a plurality of attribute of an identical kind makes system operation rich in variety.

Figure 22:
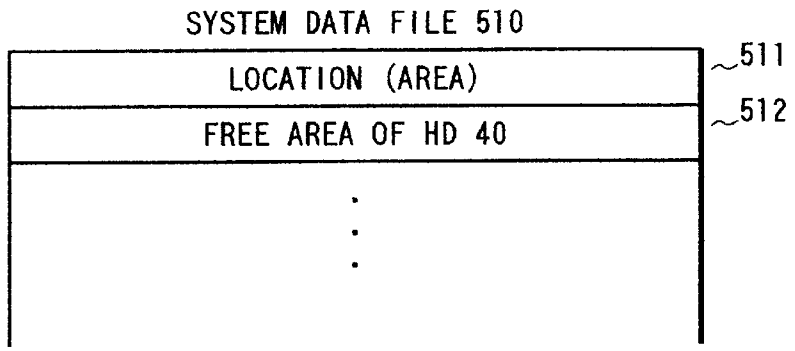
FIG. 22 is a diagram showing a system data file containing data concerning the system 50 of FIG. 4.

As seen from the above description, the multimedia application storage/player 50 has to store, as a part of the system data 47 of FIG. 5A, data concerning the system 50 itself including the location of the system 50 as shown in FIG. 22.

Linking Capability

Figure 11:
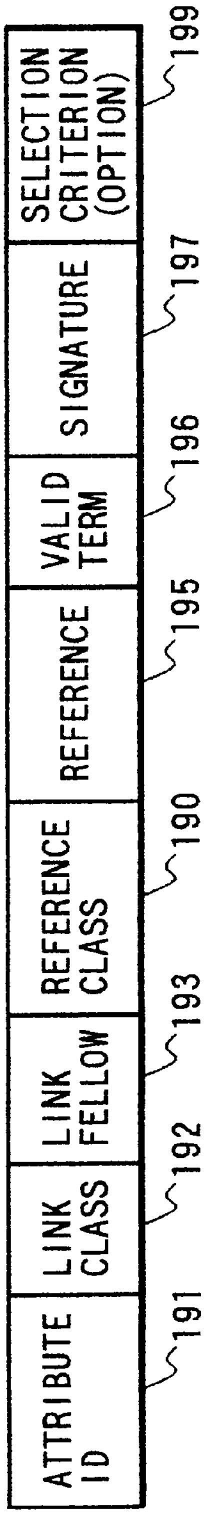
FIG. 11 is a diagram showing an exemplary structure of the attribute LINK 190 of FIG. 7.

FIG. 11 is a diagram showing an exemplary structure of the attribute LINK 190 of FIG. 7. In FIG. 11, the attribute LINK 190 comprises the above described attribute ID LINK 191, a LINK CLASSIFICATION 192 indicative of the classification of the link fellow, a LINK FELLOW 193 indicative of the fellow of the link, a REFERENCE CLASSIFICATION 94 indicative of the classification of the reference (i.e., the kind of the application data of the application identified by the LINK FELLOW 193), a REFERENCE 195 indicative of the location of the application data (or the SAI) of the application identified by the LINK FELLOW 193, a VALID TERM 196 and a SIGNATURE 197. The LINK 190 may further include a selection criterion 199 optionally. The SAI 10 may or may not have one or more such attribute LINK 190.

The LINK CLASSIFICATION 192 and the REFERENCE CLASSIFICATION 194 takes one of the following codes.

| code | meaning |
|---|---|
| 00 | not linked |
| 01 | video |
| 02 | still picture |
| 03 | program |
| 04 | data |
| 05 | text |
| 06 | SAI |

The LINK FELLOW 193 and the REFERENCE 195 contain, for example, an address, a channel number or the like.

Figure 12:
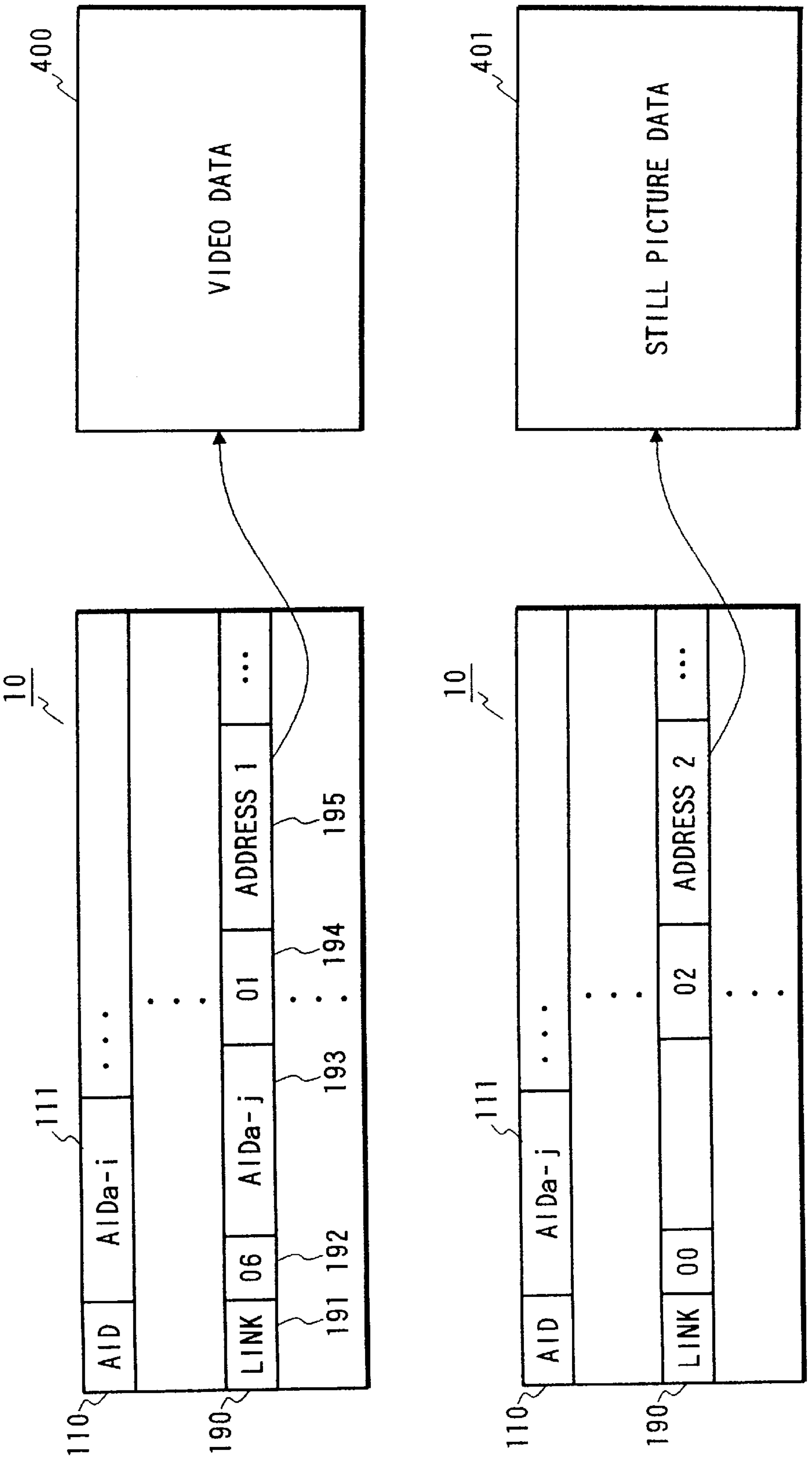
FIG. 12 is a diagram showing an example of a link structure established by LINK attributes 190.

FIG. 12 is a diagram showing an example of a link structure established by LINK attributes 190. In FIG. 12, the attribute LINK 190 of an SAI ($AID_{a-i}$) 10 has 06, $AID_{a-j}$, 01 and address1 as LINK CLASSIFICATION 192, LINK FELLOW 193, REFERENCE CLASSIFICATION 194 and REFERENCE 195, respectively. Accordingly, the SAI ($AID_{a-i}$) 10 is linked to an SAI (AID*a–j*) 10 and refers to video data 401 located at address1. On the other hand, the SAI ($AID_{a-j}$) 10 has 00, empty, 02 and address2 as LINK CLASSIFICATION 192, LINK FELLOW 193, REFERENCE CLASSIFICATION 194 and REFERENCE 195, respectively. Accordingly, the SAI ($AID_{a-j}$) 10 has no downstream link fellow but refers to still picture data 401 located at address2. In this way, it is seen that the SAI ($AID_{a-j}$) 10 is a downstream end of a link path formed by LINK attributes. It is noted that a link structure can be constituted with SAI comprising only attributes 10 and LINK attribute 190.

Also, an SAI 10 can have an attribute which contains moving picture data to play, still picture and text data to display, or a program to execute.

Figure 13:
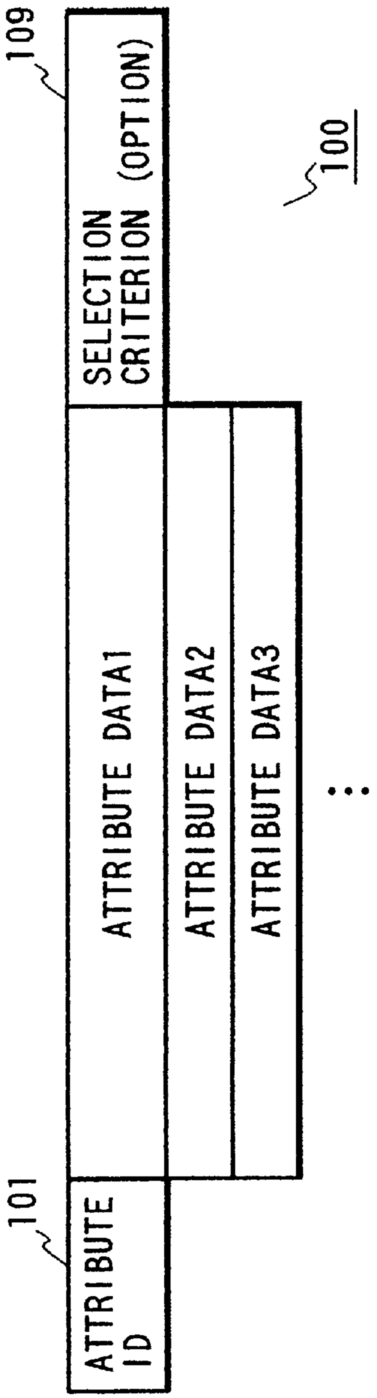
FIG. 13 shows an example of an attribute 100 which have two sub-values.

It should be noted that in FIG. 8 a part or the whole of the fields of attribute data can have multivalues or sub-values. FIG. 13 shows an example of an attribute 100 which have two sub-values. In this case, all of the fields other than the attribute 101 and the selection criterion 109 have 3 value groups ATTRIBUTE DATA-1 through -3. In this case, each of the value groups ATTRIBUTE DATA-2 and -3 is called "substitute data" for the value group ATTRIBUTE DATA-1.

Example of SAI Display

Being provided with the above described data and data structure, the multimedia application storage/player 50 is capable of displaying some of the SAI 10 in the following manner.

Figure 14:
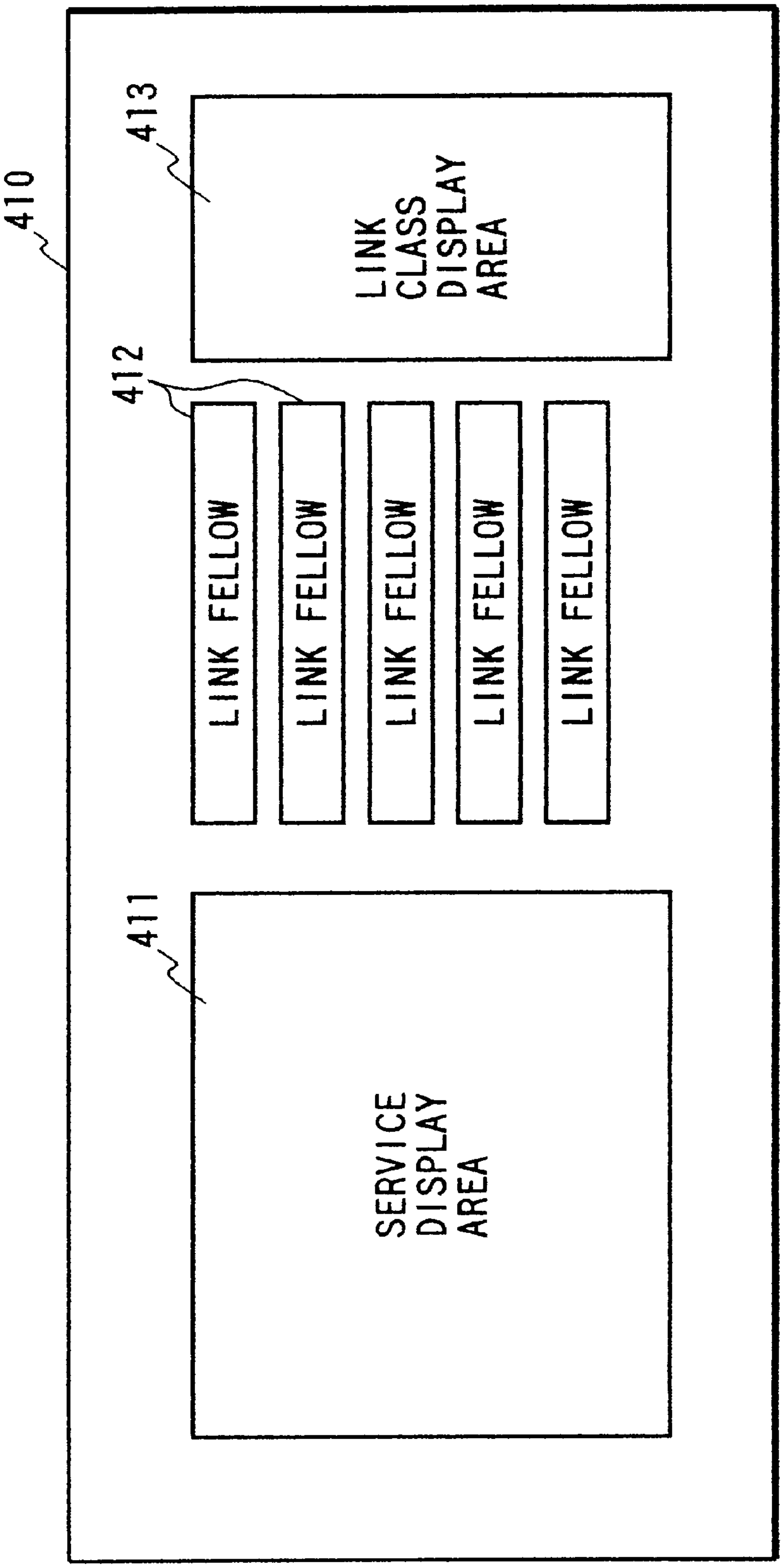
FIGS. 14 through 16 are diagrams showing how SAI 10 is displayed on the screen of the display device 75 of FIG. 4.
Figure 15:
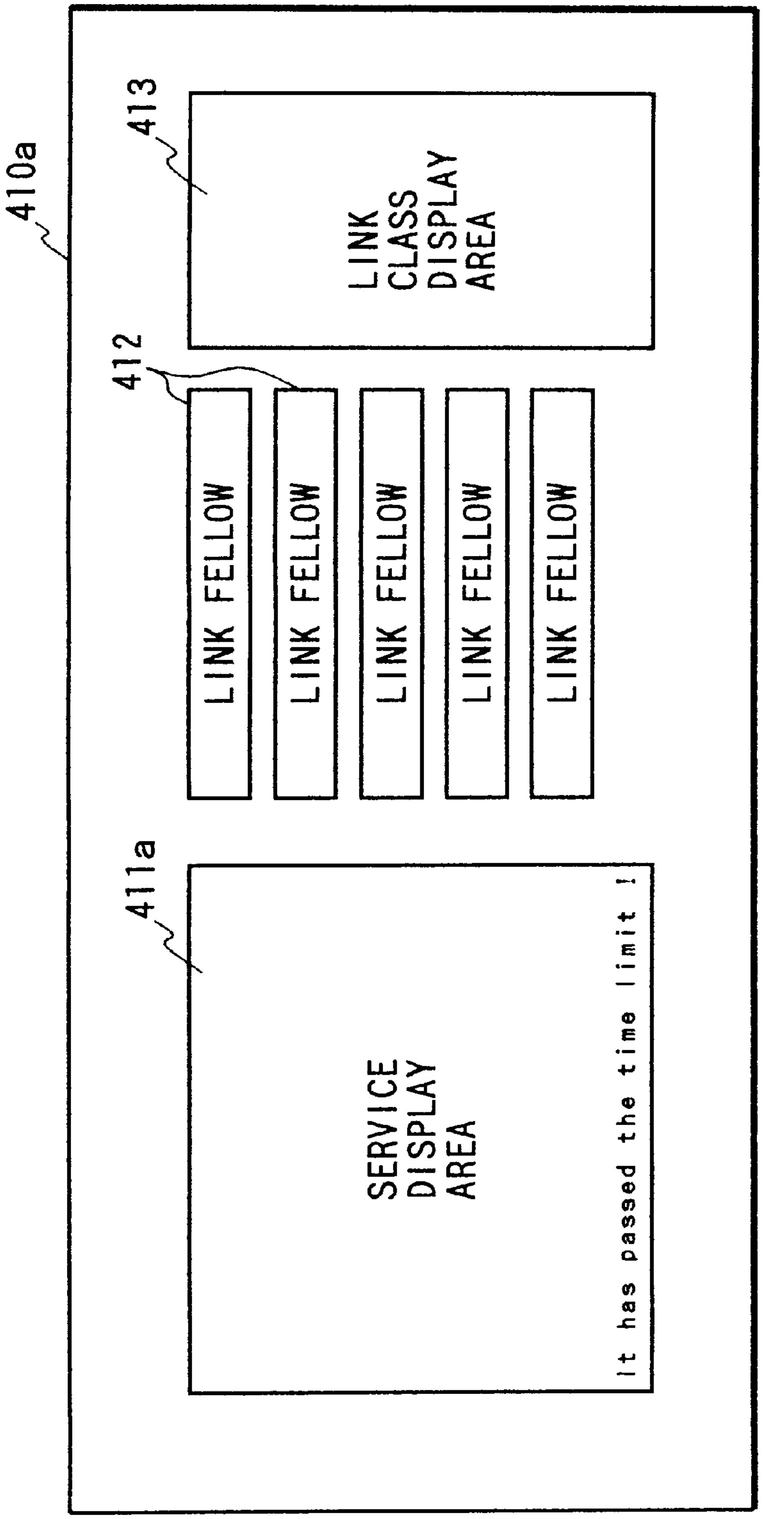
Figure 16:
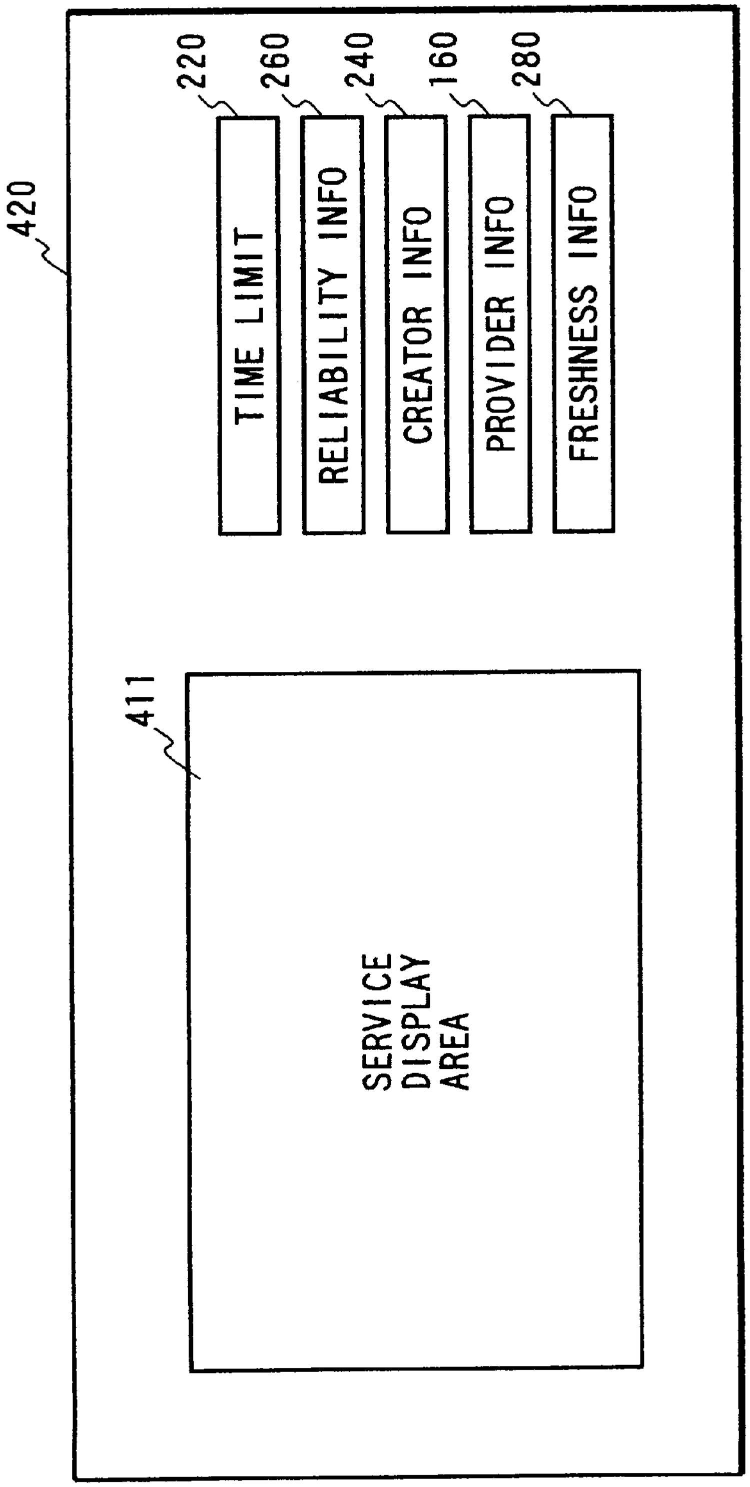

FIGS. 14 through 16 are diagrams showing how SAI 10 is displayed on the screen of the display device 75 of FIG. 4. In FIG. 14, link fellows 193-1 through 193-5 are displayed in respective area 412 stacked in a column on the right of a service display area 411, and corresponding link classes 192 are displayed in the right column 413 in the screen 410.

In FIG. 15, the displayed contents are identical to those of FIG. 14 except that there has been displayed a message "It has passed the time limit!" in the service display area 411*a* in FIG. 15.

In FIG. 16, the time limit (effective time and date) 220, reliability information 260, creator information 240, provider information 160 and freshness information 280 are displayed in respective area 412 stacked in a column on the right of a service display area 411 in the screen 420.

Grouping Capability

Figure 17:
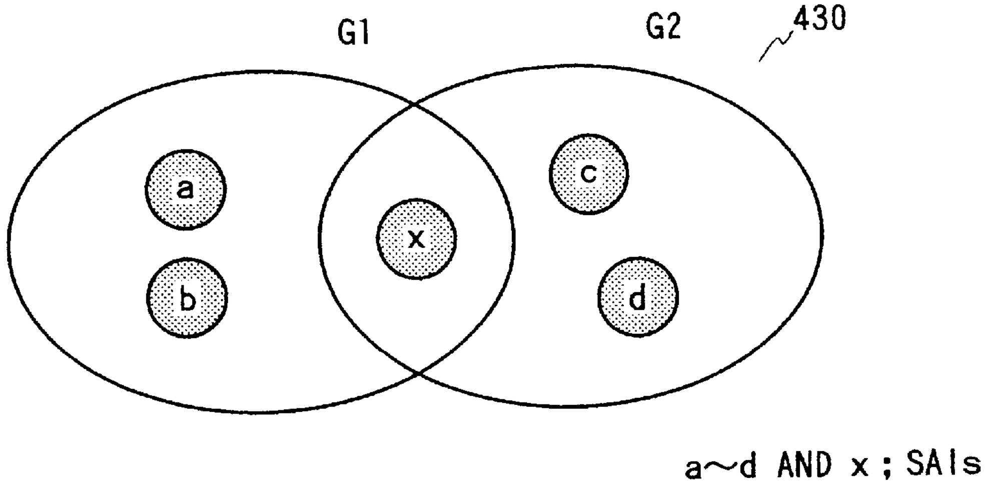
FIG. 17 is a diagram showing an exemplary group structure formed by grouping SAIs 10.

FIG. 17 is a diagram showing an exemplary group structure formed by grouping SAIs 10. Assuming that small circles with a letter inside indicates SAIs in the group structure 430, then FIG. 17 indicates that SAIs a, b and x are included in a group G1 and SAIs x, c and d are included in a group G2. Accordingly, SAI x is included in both groups G1 and G2.

Figure 18:
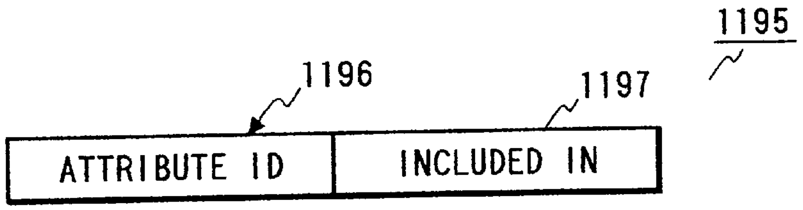
FIG. 18 is a diagram showing a structure of a GROUP attribute containing the group IDs of the group in which the SAI is included.
Figure 19:
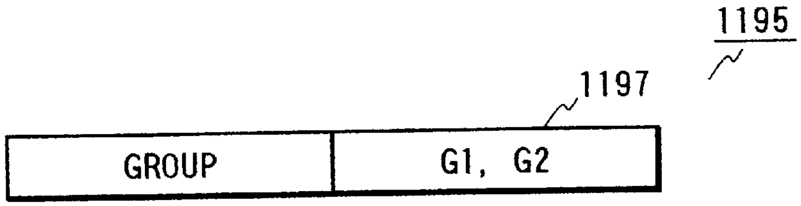
FIG. 19 is a diagram showing an example of a GROUP attribute which the SAI x contains.

In order to establish a group structure 430 as shown in FIG. 17, each of the members or SAIs included in any group in the group structure has, in the first place, to have an additional attribute as defined in FIG. 18. In FIG. 18, the additional attribute comprises an ATTRIBUTE ID field 1196 containing "GROUP" and a INCLUDED IN field 1197 for containing group IDs of the groups in which the SAI is included. FIG. 19 is a diagram showing an example of a GROUP attribute which the SAI x contains. In FIG. 19, the GROUP attribute 1195 contains group IDs G1 and G2 because the SAI x is included in both groups G1 and G2.

Figure 20:
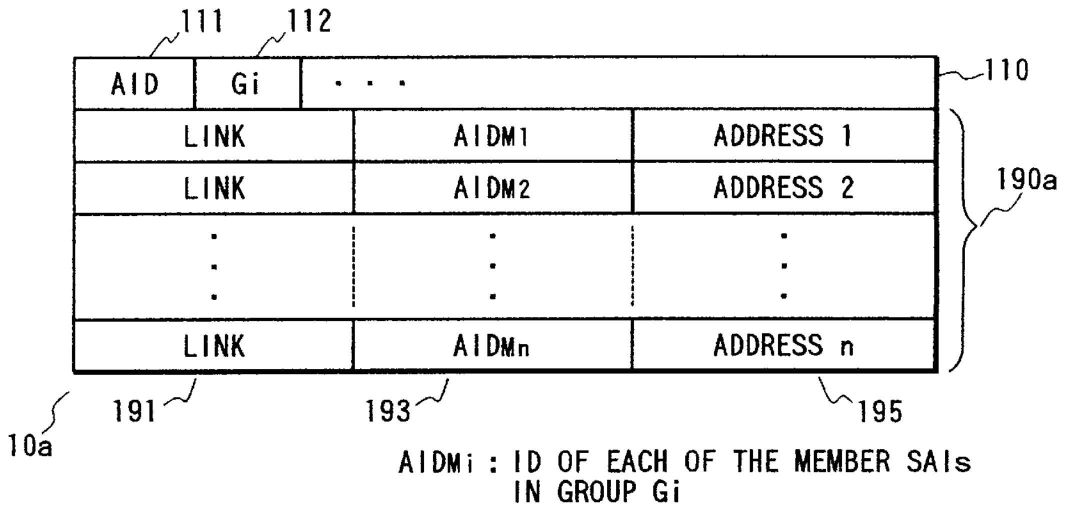
FIG. 20 is a diagram showing an exemplary meta-SAI created for group $G_i$.

In the second place, a meta-SAI (meta-service adding information) has to be created for each of the groups in the group structure. FIG. 20 is a diagram showing an exemplary meta-SAI created for group $G_i$. In FIG. 20, a meta-SAI 10*a* of a group $G_i$ basically comprises the above described APPLICATION ID attribute 110 and at least one LINK attribute 190*a* for respective member SAIs of the group $G_i$. The APPLICATION ID attribute 110 contains the ID of the group, $G_i$, in the APPLICATION ID field 112. Each of the LINK attribute 190*a* for a member SAI ($AID_{Mi}$) in the group $G_i$ comprises ATTRIBUTE ID 191, STORED ADDRESS 195 and the ID 193 of the member SAI. That is, LINK attribute 190*a* for $AID_{Mi}$ comprises LINK, STORED Address and $AID_{Mi}$. Each time an SAI included in a group $G_i$ (i.e., an SAI which contains $G_i$ in its GROUP attribute) is received, the above described program UPDATING_SAI 86 adds a link attribute of the SAI to the meta-SAI of group $G_i$. Thus created meta-SAI is registered to a group table as shown in FIG. 21.

Figure 21:
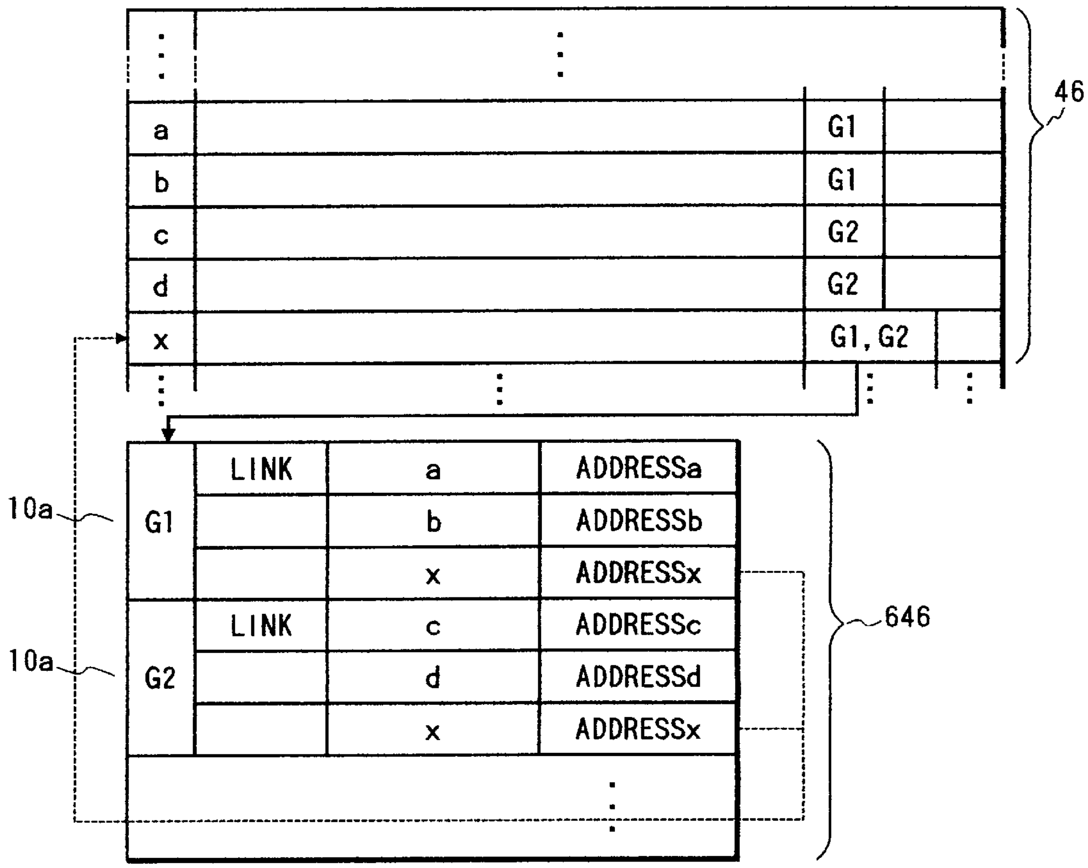
FIG. 21 is a diagram showing the relations among data created in the above described manner in the above mentioned SAI table 64.

FIG. 21 is a diagram showing the relations among data created in the above described manner in the above mentioned SAI table 64 and the group table. In FIG. 21, from SAIs a through d and x, the group ID(s) in which each SAI is included is (or are) obtained in the SAI table 46 (e.g., G1 is obtained for SAI a). By using a meta-SAI of an obtained group ID, it is possible to know the application IDs of the member SAIs of the group ID in the group table 664 (If meta-SAI G1 is used, IDs a, b and x are obtained). By using the application IDs, the user can access the SAIs included in the group known from any SAI.

Operation

Prior to using the multimedia application storage/player 50, expected users have to enter some information to prepare data used in the operation of the system 50. FIG. 22 is a diagram showing a system data file containing data concerning the system 50 of FIG. 4. In FIG. 22, the system data file 510 contains location 511 where the system 50 is located, a free area 512 of HD 40, etc. When the system 50 is used for the first time, the system request the user to enter the area.

Figure 23:
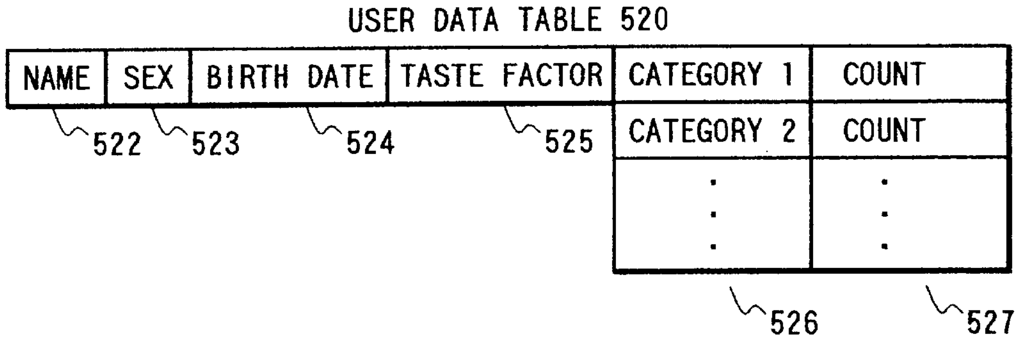
FIG. 23 is a diagram showing a user data table 520 used in the system 50 of FIG. 4.

FIG. 23 is a diagram showing a user data table 520 used in the system 50 of FIG. 4. In FIG. 23, the user data table 520 comprises the fields of NAME 522, SEX 523, BIRTH DATE 524, TASTE FACTOR 525, CATEGORY 526, COUNT 527, etc. Each time of use, if the code of the category of the application each user has viewed is found in the CATEGORY 526 field, then the value of the COUNT 527 field corresponding to the CATEGORY field 526 is incremented. Otherwise, the code of the category is added to the CATEGORY field and an value "1" is entered in the COUNT 527 field corresponding to the added code. The TASTE FACTOR 525 field contains a statistical data calculated from the data in the CATEGORY 526 and COUNT 527 fields. When one tries to enter a command after starting the system 50, the system prompts the user to enter his or her name. If the system 50 can not find the entered name in the user data table 520, then the system 50 informs the user of the fact, further prompts the user to enter his or her birth date and sex, ahd a new record comprising the entered data is added to the user data table 520.

Storing Applications

Referring now to FIG. 5, radio waves received from the antenna 51 is supplied to the tuner 52. A preset signal is selected from the received radio waves by the tuner 52. The selected signal is demodulated by the demodulator 53 into a packet stream 30 of FIG. 3, which is separated by the demultiplexed by the demultiplexer 54 using PSI 32 of each packet 31 into an application data packet stream 34*a* on line 54*a* and an EPG/SI packet stream 35*a* on line 54*a*. The packet streams 34*a* and 35*a* are supplied to the application data decoder 55 and the SAI decoder 56, respectively, and decoded. Then, the above mentioned $RECEIVE_{13}$ &_STORE program 85 stores, in the above mentioned contents folder 390 in the HD 40, a data file comprising the packets which are output from the application decoder 55 and have an identical ID ($AID_{a-i}$) 39. Then the program 85 changes the values of the LOCATION CODE 302 and the LOCATION 303 to "0" and "/contents/$AID_{a-i}$", respectively, in the LOCATION attribute 300 of the SAI ($AID_{a-i}$) 10.

Figure 24:
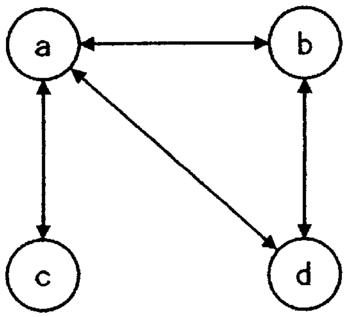
FIG. 24 is a diagram showing an exemplary link structure of four SAIs.
Figure 25:
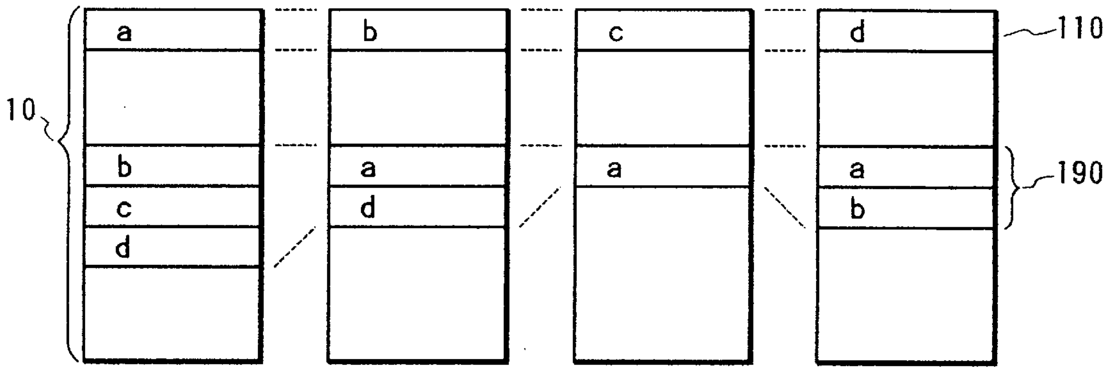
FIG. 25 is a diagram showing the LINK attributes in each SAI in the link structure of FIG. 24.

If a packet from the SAI decoder 56 contains EPG data 36, then the program 85 adds the EPG data 36 to the above mentioned EPG data file 45. If a packet from the SAI decoder 56 contains SID (service information descriptor) 38, then the program 85 adds the SID 38 to the SAI table 46. The program 85 calculates the correlation between the key words in the KEY WORD field 170 and the data in the TASTE FACTOR 525 of the user data table 520 of FIG. 23 and enters the correlation in the correlation attribute 270. The program 85 further calculates freshness from the updated time and date in the VERSION attribute 130 or the next broadcast time and date in the REBROADCAST attribute 290 and enters the calculated freshness in the FRESHNESS attribute 280. Thus, the registration of received SAI is completed. Link data control in application recording We discuss the case when a part of the SAIs constituting a link structure is to be recorded prior to the other part in the following. It is assumed that the SAIs a through d is linked as shown in FIG. 24. In FIG. 24, three SAIs a, b and d are linked bilaterally among others, and the SAI "a" is further linked bilaterally to an SAI c. The inner structure of each of the SAIs a through d is shown in FIG. 25. In FIG. 25, the SAI a 10 has three LINK attributes 190 to SAIs b, c and d. The SAI b has two LINK attributes 190 to SAIs a and d. The SAI c has one LINK attribute 190 to SAI a. The SAI d has two LINK attributes 190 to SAIs a and b.

Figure 26:
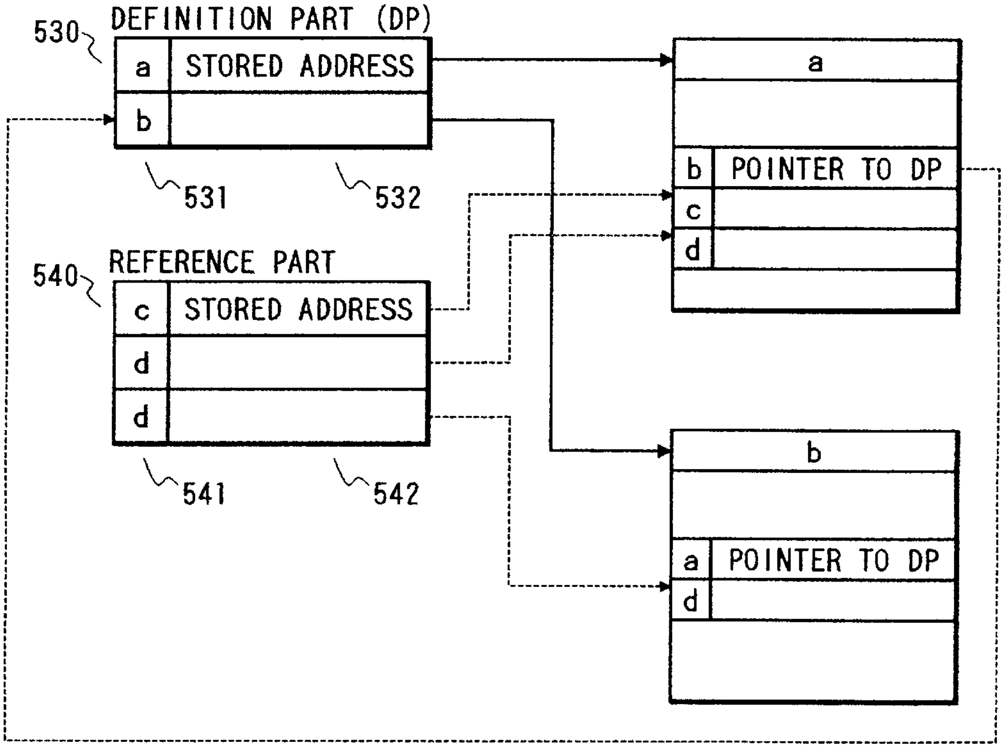
FIG. 26 is a diagram showing the state of HD 40 after receiving and storing only the SAIs a and b in case when the SAIs a through d are linked as shown in FIG. 25.

FIG. 26 is a diagram showing the state of HD 40 after receiving and storing only the SAIs a and b in case when the SAIs a through d are linked as shown in FIG. 25. In FIG. 25, each record of a SAI definition part 530 comprises an ID field 531 containing an ID of each of the SAIs in the SAI table 46 and a stored address field 532 containing the address of the SAI. Each of a reference (unreceived SAI) part 540 comprises an ID field 541 containing an ID of each of the SAIs to be referred to and a stored address field 542 containing the address of the SAI.

Figure 27:
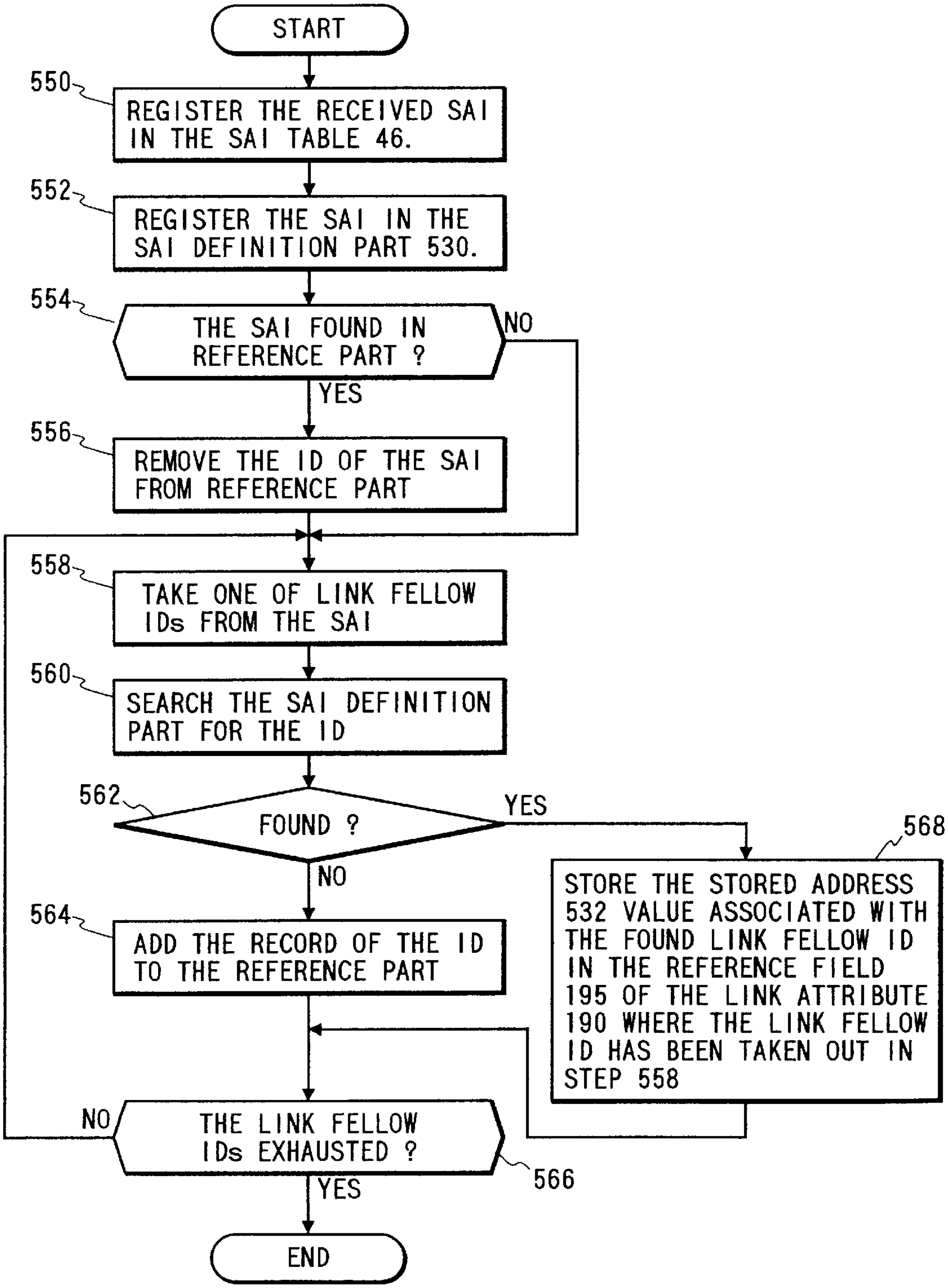
FIG. 27 is a flow chart of a procedure executed at the time of reception of an SAI included in associated SAIs.

FIG. 27 is a flow chart of a storing procedure executed by the CPU 72 under the control of the RECEIVE_&_STORE program 85 at the time of reception of an SAI according to the principle of the invention. In FIG. 27, when the program 85 is invoked in response to a reception of an SAI 10 in step 550 the CPU 72 first registers the received SAI 10 in the SAI table 46 as described above. In step 552, the CPU 72 adds the record for the received SAI 10 to the SAI definition part 530, and in step 554 makes a check to see if there is the ID of the received SAI 10 in the reference (unreceived SAI) part 540. If the ID is found, the found ID is removed from the reference part 540 in step 556 and the control is passed to step 558. If the result is NO in step 554, then the CPU 72 proceeds to step 558. In step 558, the CPU 72 takes one of the link fellow IDs 193 from the SAI. In step 560, the CPU 72 searches the definition part 530 for the link fellow ID. If the ID is not found in step 562, the CPU 72 adds the record of the ID to the reference part 540 in step 564. If the link fellow ID is found in step 562, then in step 568 the CPU 72 stores the value of the stored address field 532 associated with the found link fellow ID (or the address of the application data of the application identified by the link fellow ID) in the REFERENCE field 195 of the LINK attribute 190 from which the link fellow ID has been taken in step 558. After step 564 or 568, the CPU 72 make a check to see if the link fellow IDs have been exhausted in the received SAI 10 in step 566. If so, the CPU 72 ends the operation, and otherwise returns to step 558.

Figure 28:
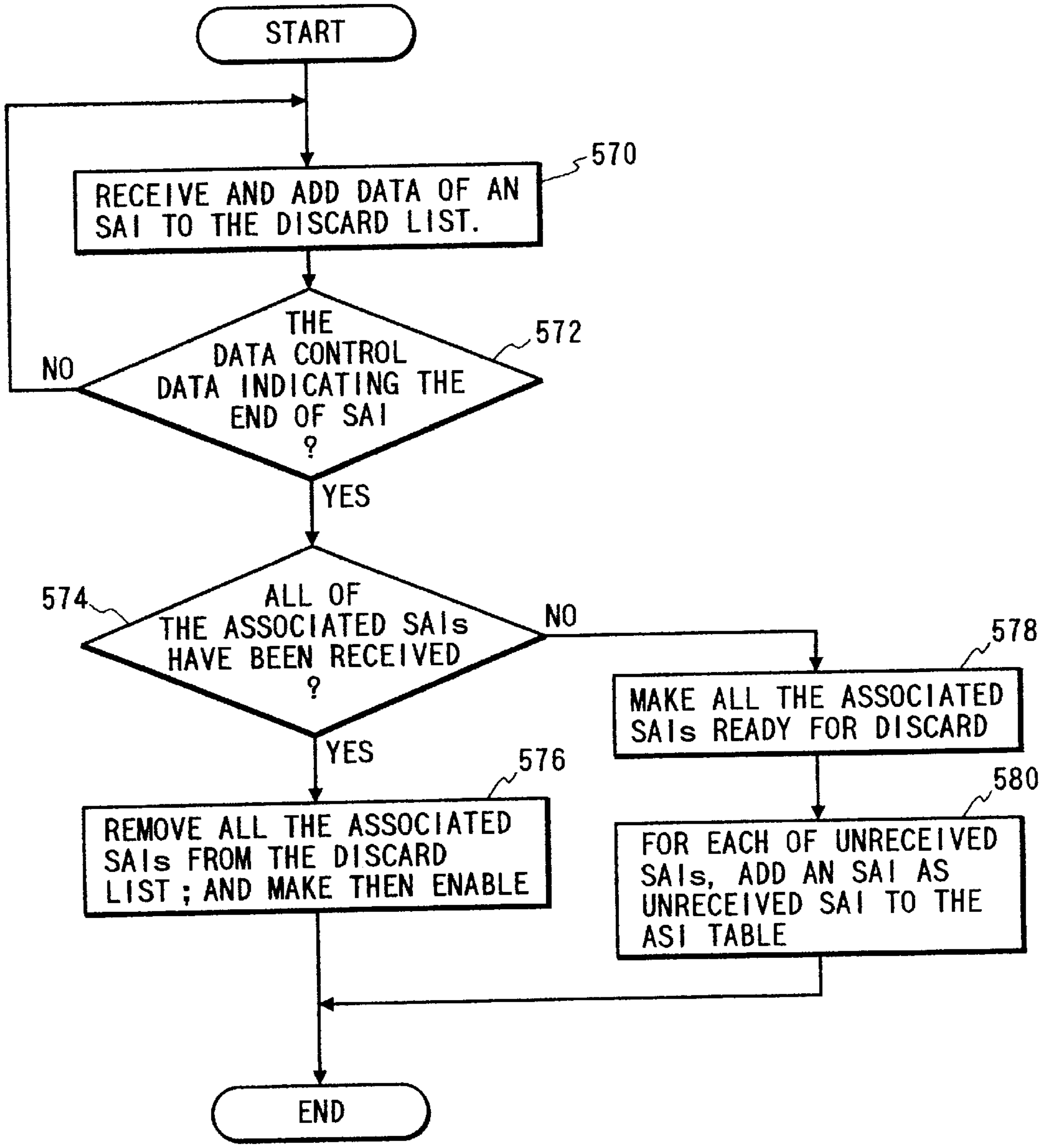
FIG. 28 is a flow chart of a procedure executed at the time of reception of an SAI included in associated SAIs to guarantee the consistency of the associated SAIs.

FIG. 28 is a flow chart of a procedure executed in receiving an SAI included in associated SAIs to guarantee the consistency of the associated SAIs. In FIG. 28, entering this procedure, the CPU 72 proceeds to step 570 to receive and add data of an SAI to the discard list (not shown). In step 572, the CPU 72 checks the data to see if the data is control data indicative of the end of SAI. If not, the CPU 72 returns to step 570. If the test result is YES in step 572, then in step 574 the CPU 72 makes a test to see if all of the associated SAIs have been received. If so, the CPU 72 makes enable and removes all the associated SAIs from the discard list in step 57 6 and ends the operation. Otherwise, the CPU 72 makes all the associated SAIs ready for discard. In the next step 580, for each of the unreceived SAIs the CPU 72 adds an SAI as an unreceived SAI to the SAI table 46 and ends the procedure.

Group Data Control in Application Recording

In receiving an SAI, a grouping process is executed on the basis of the intention of the broadcast center.

Figure 29:
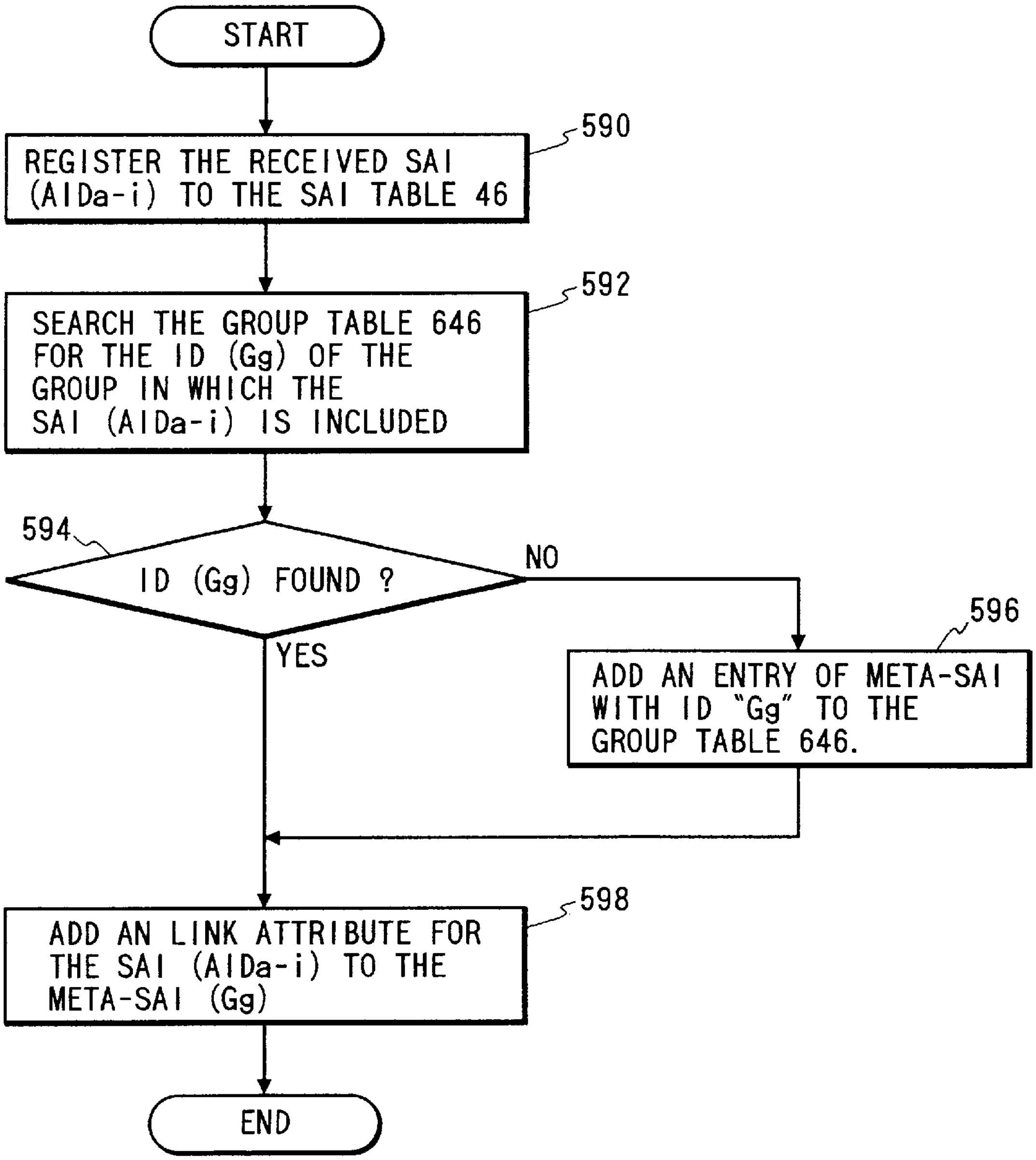
FIG. 29 is a flow chart showing a procedure the CPU 72 executes under the control of a grouping program.

FIG. 29 is a flow chart showing a procedure the CPU 72 executes under the control of a grouping program. In FIG. 29, on entering the procedure, the CPU 72 proceeds to step 590 and registers the received SAI ($AID_{a-i}$) to the SAI table 46. In the next step 592, the CPU 72 searches the group table 646 of FIG. 21 for the meta-SAI which, as an ID, has the ID ($G_g$) of the group in which the SAI ($AID_{a-i}$) is included. If the meta-SAI ($G_g$) is found in step 594, then the CPU 72 adds, to the meta-SAI ($G_g$), an LINK attribute 190 containing $AID_{a-i}$ and the address at which the SAI ($AID_{a-i}$) is stored. If the meta-SAI ($G_g$) is not found in step 594, then the CPU 72 adds the entry of meta-SAI with $G_g$ as the ID thereof to the group table 646 in step 596 and proceeds to step 598. After step 598, the CPU 72 exits from the procedure.

Then, an information grouping and displaying program stored in HD 40 is invoked and executed (The information grouping and displaying program may be either received and stored in HD 40 prior to the above described grouping process or may have been installed in the HD 40 in advance). In this process, the groups contained in the group table 646 are displayed first. Then the user is prompted to select one of the displayed groups. If any one is selected, the SAIs contained in the record for the selected group ($G_g$) are displayed. Then the user is again prompted to select one of the displayed SAIs. In response to a selection of a SAI, the program passes a DISPLAY message addressed to the selected SAI to a message processing routine.

Figure 30:
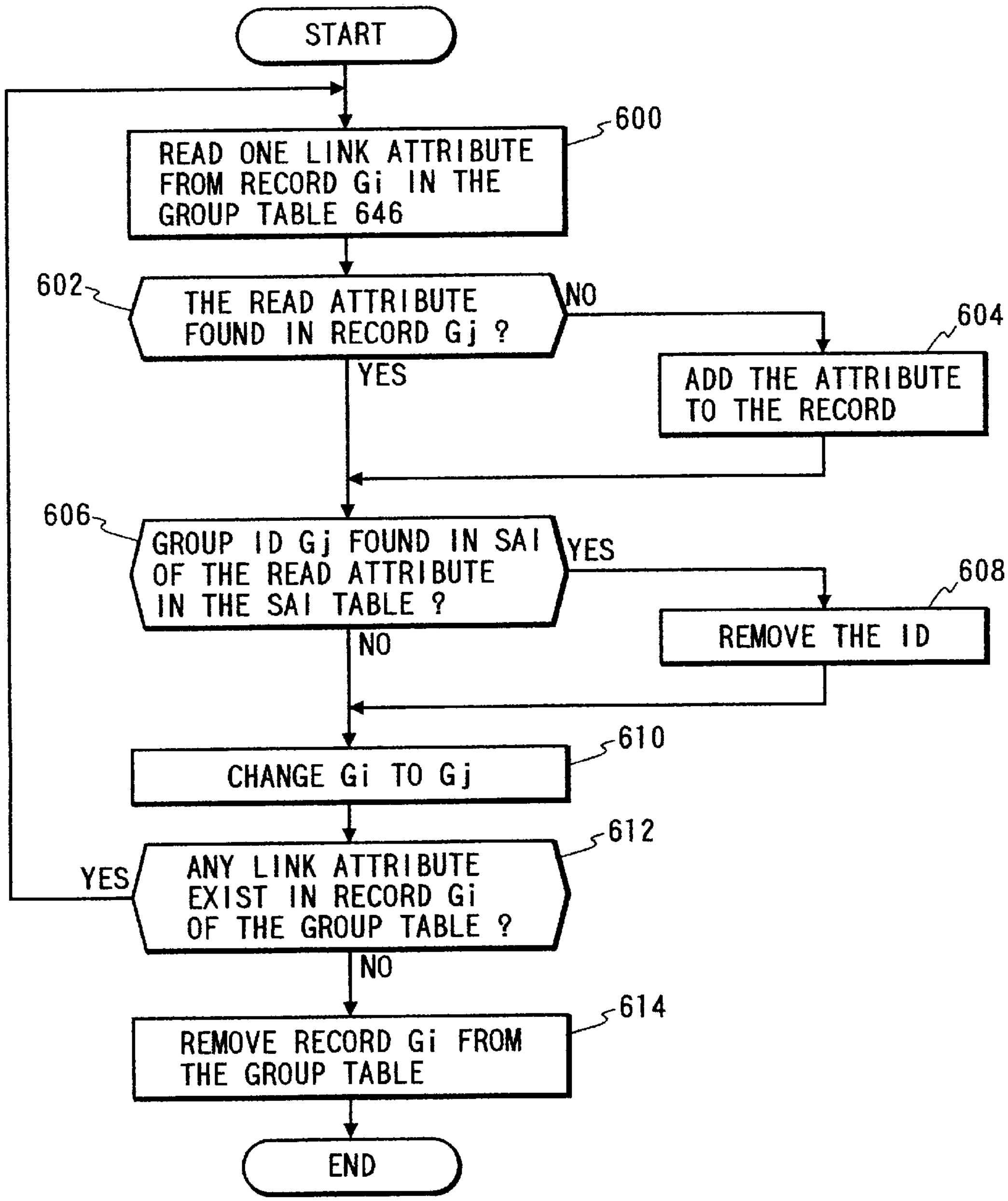
FIG. 30 is a flow chart showing a procedure executed under the control of a program (or method) GROUP MERGE when the group $G_j$ is dragged to the group $G_j$ on a group display screen.

The user can drag one of the displayed groups to any other group in a screen on which the SAI groups are displayed to merge the former with the latter. FIG. 30 is a flow chart showing a procedure executed under the control of a program (or method) GROUP MERGE when the group $G_j$ is dragged to the group $G_i$ on a group display screen. In FIG. 30, the CPU 72 reads one LINK attribute from record $G_i$ in the group table 46 in step 600 and makes a check in step 602 to see if the read attribute is found in record $G_j$ in the group table 646. If not, then the CPU 72 adds the read attribute to record $G_j$ in step 604 and proceeds to step 606. If the test result in step 602 is YES, the CPU 72 also proceeds to step 606, where the CPU 72 makes a test to see if there is group ID ($G_j$) in the SAI of the ID contained in the read attribute in the SAI table 46. If so, then the CPU 72 removes the ID ($G_j$) from the SAI in step 608 and proceeds to step 610. Otherwise the CPU 72 also proceeds to step 610, where the CPU 72 changes $G_i$ to $G_j$ in the SAI. Then the CPU 72 makes a check to see if there is any LINK attribute left in record $G_i$. If so, the CPU 72 returns to step 600. Otherwise, the CPU 72 removes record $G_i$ from the group table 646 in step 614 and exits from the procedure.

Figure 31:
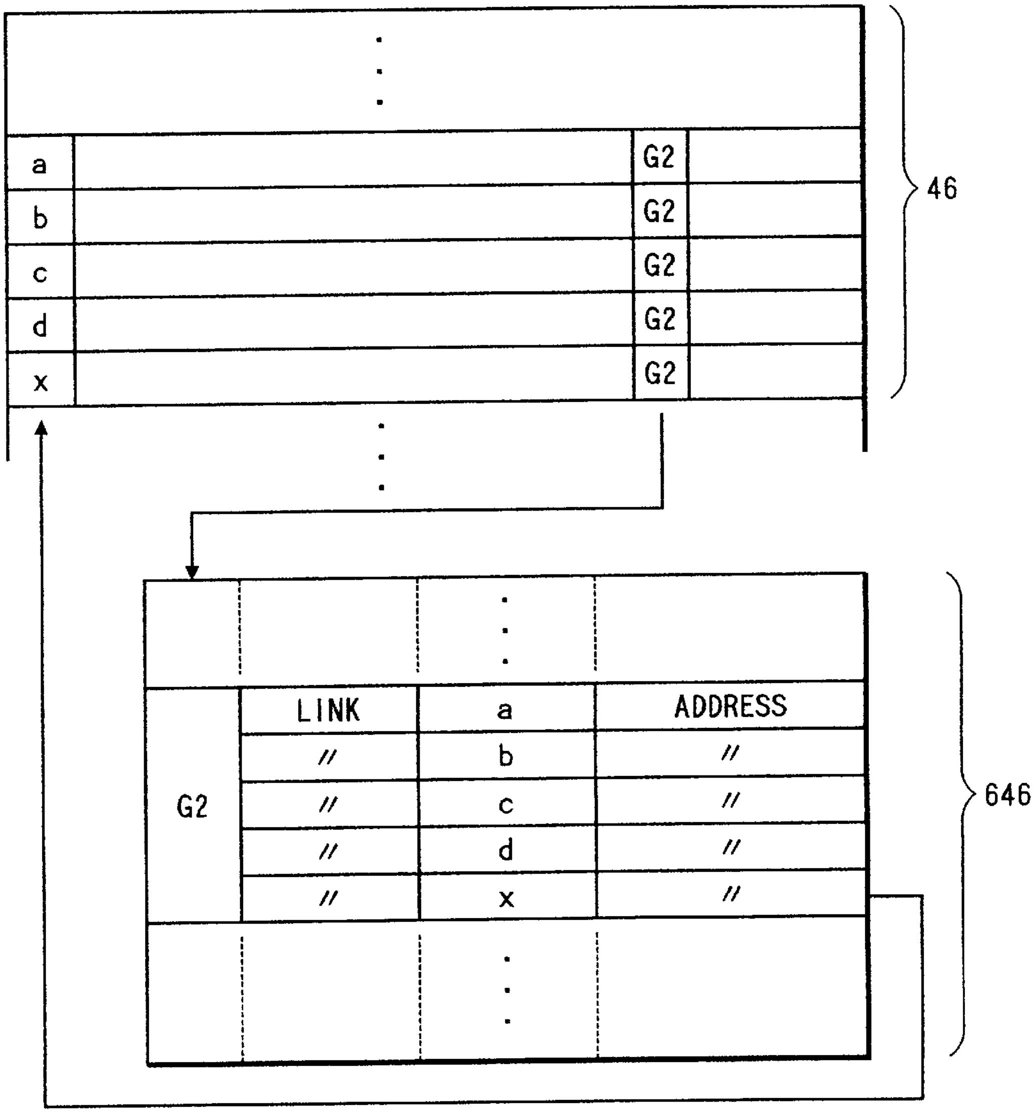
FIG. 31 is a diagram showing the state of the tables 46 and 646 after group G1 is dragged to G2 in the situation shown in FIG. 21.

FIG. 31 is a diagram showing the state of the tables 46 and 646 after group G1 is dragged to G2 in the situation shown in FIG. 21. In FIG. 31, the SAIs a through d and x have group ID G2 in the SAI table 46. In the group table 646, LINK attributes for SAIs a and b have been added to record G2 and record G1 has been deleted. Thus, the SAIs a and b in group G1 have been merged with group G2.

Obtaining SAI from the outside

Figure 32:
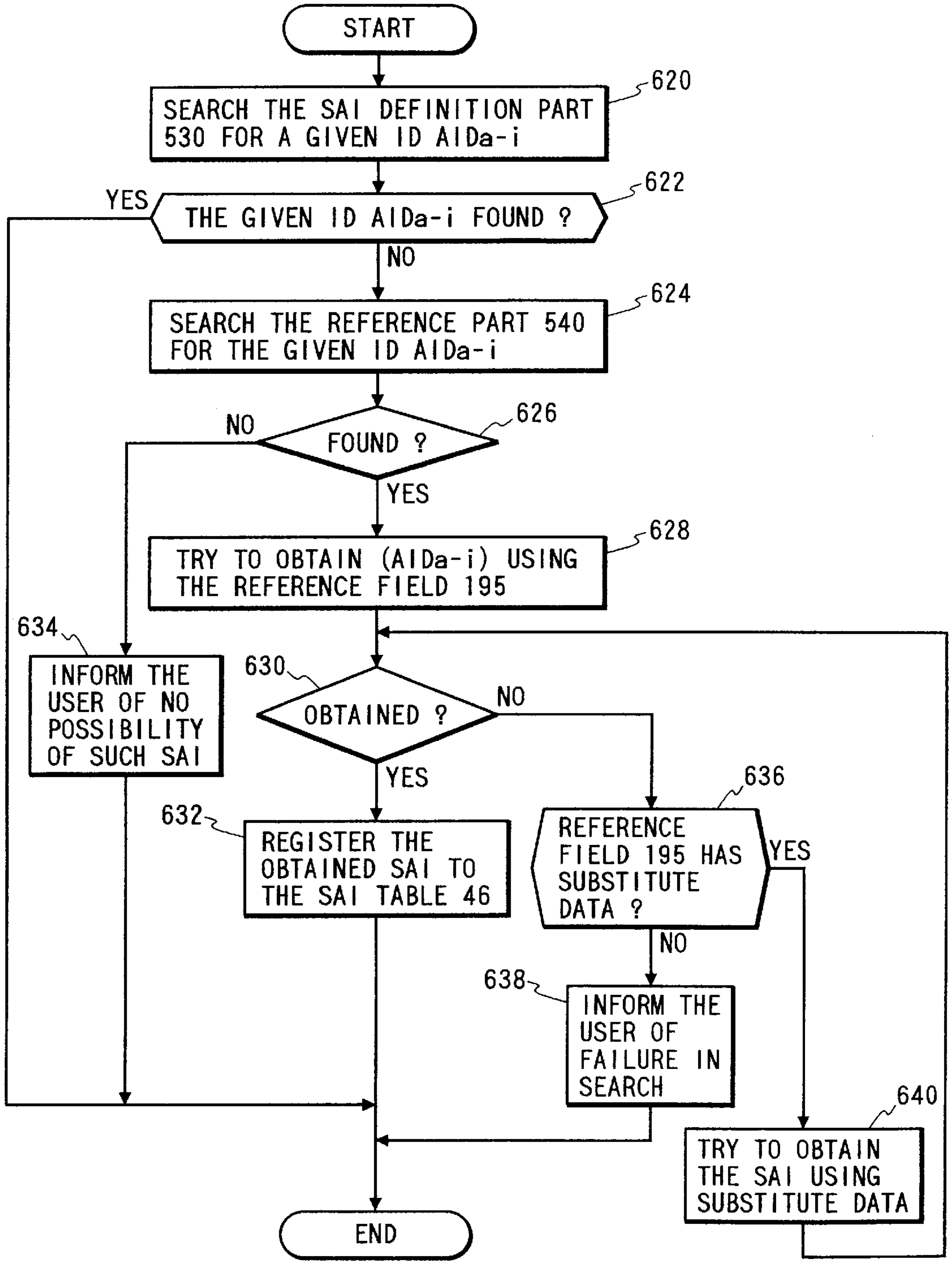
FIG. 32 is a flow chart showing a procedure of obtaining an unreceived SAI from the outside.

If a first application is to refer to a second application and the SAI of the second application has not been received, then the inventive system can retrieve the SAI from the outside of the system by using the value of the REFERENCE field 195 in the LINK attribute 190 the first application SAI. FIG. 32 is a flow chart showing a procedure of obtaining an unreceived SAI from the outside. In FIG. 32, the CPU 72 searches the SAI definition part 530 for a given ID (AIDa–i) in step 620 and in step 622 makes a check to see if the given ID (AIDa–i) is found. If so, the CPU 72 simply ends the procedure. Otherwise, the CPU 72 searches the reference (unreceived SAI) table 540 for the given ID (AIDa–i) in step 624 and in step 626 makes a check to see if the ID is found. If not, then the CPU 72 informs the user of no possibility of the existence of such SAI in step 634 and ends the procedure. If the test result is NO in step 626, then the CPU 72 tries to obtain the SAI (AIDa–i) using the REFERENCE field 195 of the link attribute 190 in step 628 and in step 630 makes a check to see if the SAI is obtained. If so, the CPU 72 registers the obtained SAI to the SAI table 46 in step 632 and exits from the procedure. Otherwise, the CPU 72 makes another check in step 636 to see if the REFERENCE field 195 has any substitute data. If so, the CPU 72 tries to obtain the SAI using the substitute data in step 640 and returns to step 630. Otherwise, the CPU 72 informs the user of the failure in search in step 638 and ends the procedure.

Discarding SAI

Figure 33:
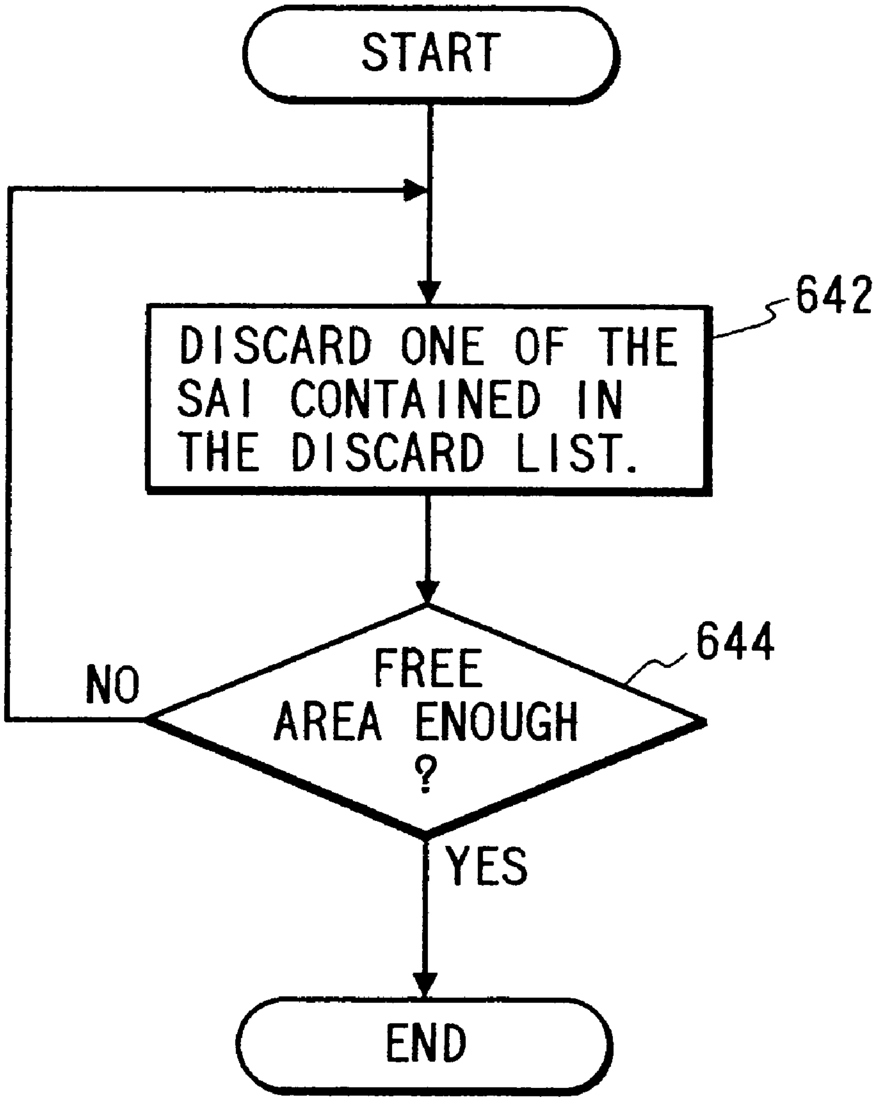
FIG. 33 is a flow chart showing a procedure of discarding SAI according to the principles of the invention.

FIG. 33 is a flow chart showing a procedure of discarding SAI according to the principles of the invention. In FIG. 33, on entering the procedure, the CPU 72 proceeds to step 642 to discards one of the SAIs registered in the discard list (not shown) created in the process of FIG. 28. Then the CPU 72 makes a check in step 644 to see if there is enough free area. If so, then the CPU 72 ends the procedure, and otherwise returns to step 642.

Event-Driven Process

By way of example, assume that a predetermined trigger data is included in any the broadcast station data 11 broadcast from the broadcast station. Then the trigger data can be detected during effectuating (i.e., displaying, playing or executing) the SAI 10 or application data 11 by monitoring the data stream from the SAI 10 or application data 11, causing a program associated with the SAI 10 or the application data 11 to be executed. Utilizing this feature permits some commercials to be inserted in a sports program or a movie at desired timing.

Figure 34:
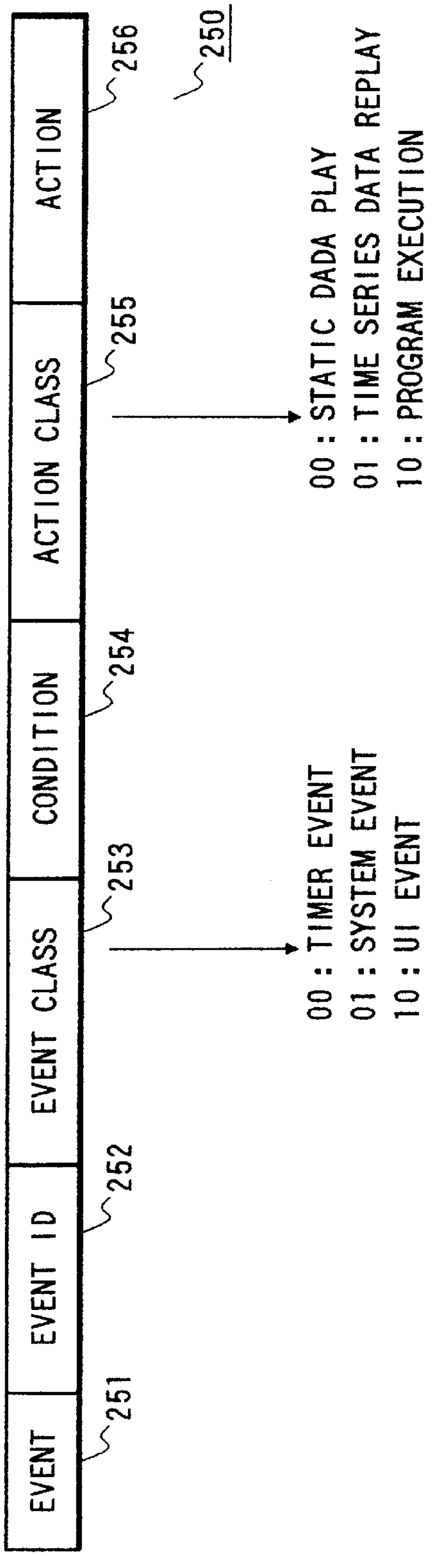
FIG. 34 is a diagram showing an exemplary structure of the EVENT attribute 250 of the SAI 10 of FIG. 7.

FIG. 34 is a diagram showing an exemplary structure of the EVENT attribute 250 of the SAI 10 of FIG. 7. In FIG. an EVENT attribute 250 comprises an attribute ID "EVENT" 251 for identifying the attribute, an event ID 252 for identifying the event defined by this attribute, an event class 253 containing data indicative of the kind of event, conditions 254 for defining the event, an action class 255 containing data indicative of the kind of action and an action 256 containing information on the action taken in case of occurrence of the event.

As for the data indicative of the kind of event and the data indicative of the kind of action, it is preferable to use a code such as follows.

| code | 00 | 01 | 10 |
|---|---|---|---|
| For event class: | | | |
| event | timer | application (system occurrence) | command (user interface) |
| For action class: | | | |
| action | static data display | time series data replay | program execution |

An instance of a system occurrence (application)-driven process will be shown in the following. It is assumed that a main application SAI ($AID_{a-0}$) is has a LINK attribute 190 which contains $AID_{a-i}$ in the LINK FELLOW 193 field and that the application ($AID_{a-i}$) contains an EVENT attribute 250 for providing commercial programs.

Figure 35:
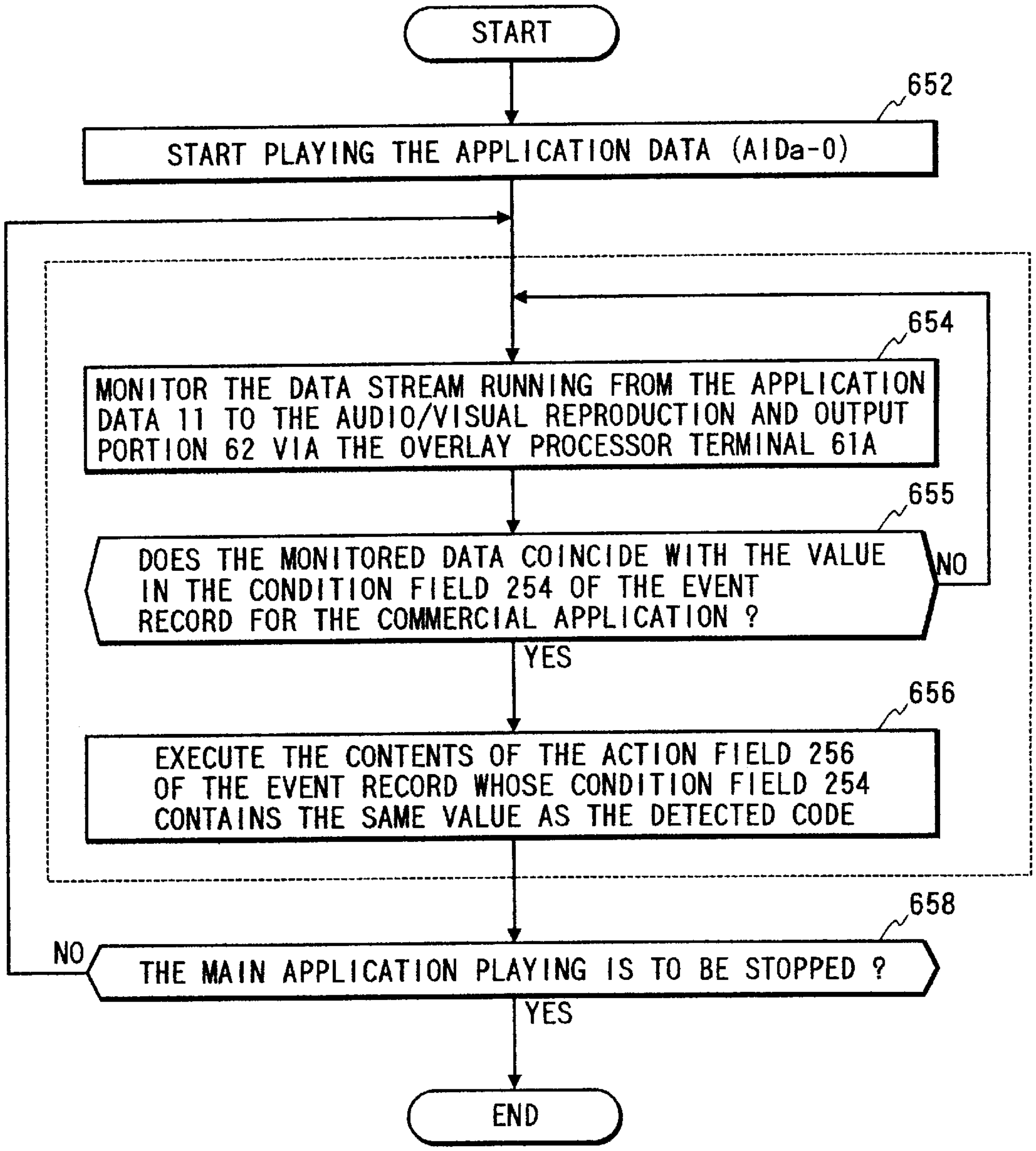
FIG. 35 is a flow chart showing an exemplary procedure in playing a main application accompanied by a commercial application of the application driven type.

FIG. 35 is a flow chart showing an exemplary procedure in playing a main application ($AID_{a-0}$) accompanied by a commercial application ($AID_{a-i}$) of the application driven type. In this example, if a predetermined event occurred or code associated with the commercial application is detected during the play of the main application, this will cause the commercial application ($AID_{a-i}$) to be played.

Figure 36:
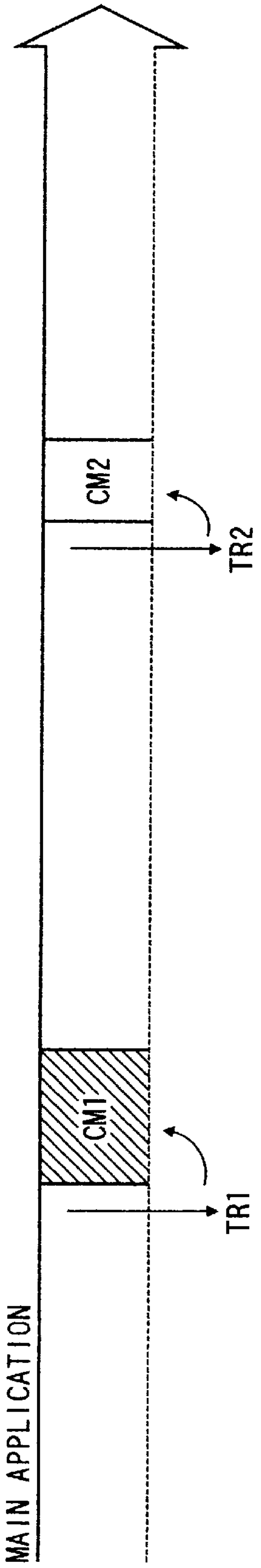
FIG. 36 is a diagram showing how a commercial program is inserted in the application data playing according to the principles of the invention.

The procedure of FIG. 35 starts in response to a reception of a PLAY command from the user. In FIG. 35, the CPU 72 starts playing the application data ($AID_a$) 11 in step 652 and in step 654 monitors the data stream running from the application data 11 (stored in, e.g., /contents/$AID_{a-0}$) to the audio/visual reproduction and output portion 62 via the overlay processor terminal 61*a* to see if the monitored data coincides with the value in the condition field 254 of the event record for the commercial application in step 655. If not, the CPU 72 returns to step 654. If the test result is YES in step 655, then the CPU 72 executes the contents of the action field 256 of the event record whose condition field 254 contains the same value as the detected code in step 656. In the next step 658, the CPU 72 makes some check to see if the main application playing is to be stopped because of a stop instruction or the end of the main application. If so, the CPU 72 ends the procedure, and otherwise the CPU 72 returns to step 654. It is noted that as a result of step 656, a commercial program is inserted in the application data playing as shown in FIG. 36. As seen from FIG. 36, it is possible to provide desired commercial at desired timing by arranging the types and the times of triggers to insert.

In the above example, the event class has been limited to the system (application) occurrence, the flow chart is applicable to the combination of the three event classes except the way of loading of EVENT data. In this case, an event table which contains all kind of events is used instead of the application event table, and accordingly the event table has to have a event class 253 field as well.

Figure 37:
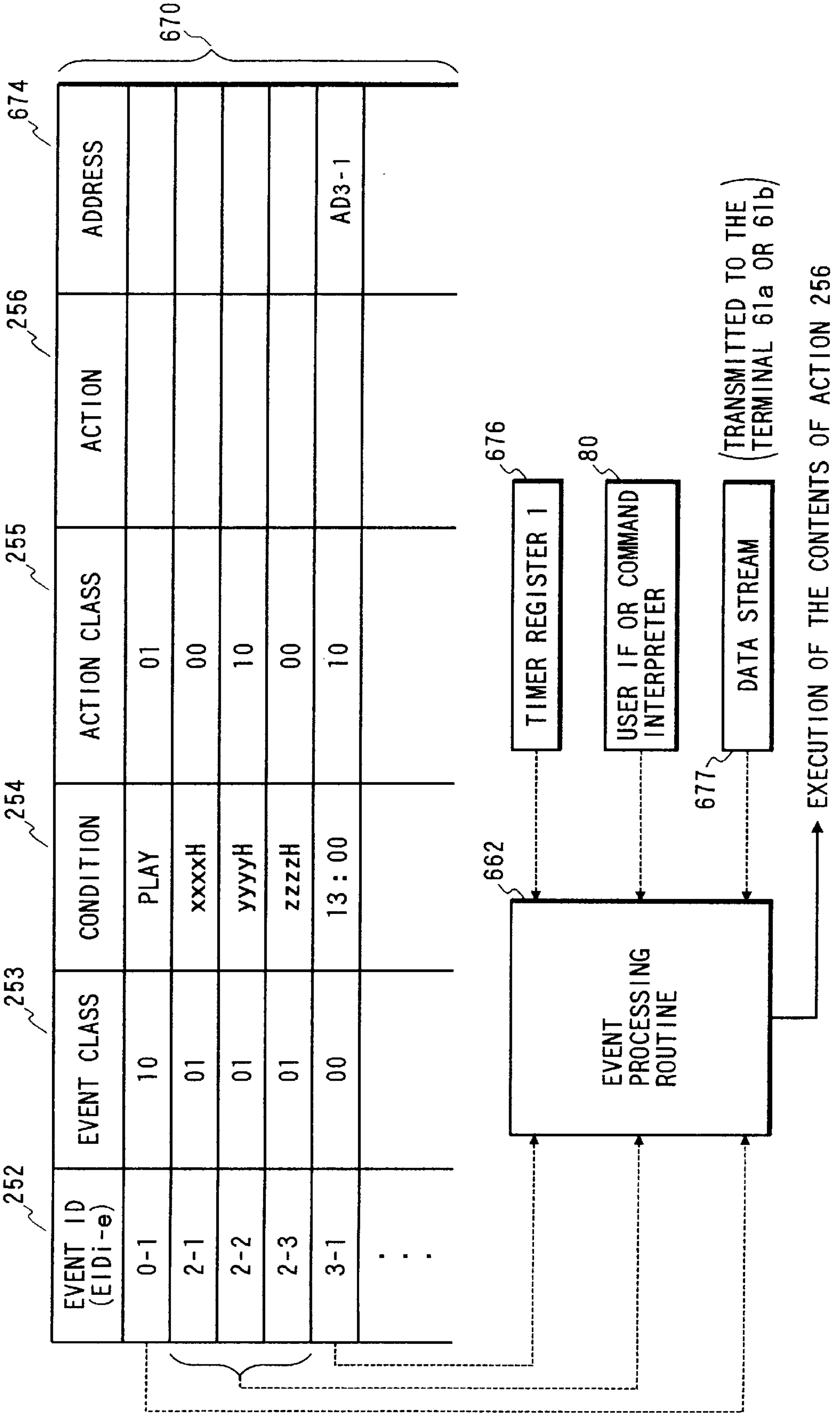
FIG. 37 shows an exemplary structure of an event table available for all kinds of events and illustrates event processing according to the invention.

FIG. 37 shows an exemplary structure of an event table available for all kinds of events and illustrates event processing according to the invention. In FIG. 37, the fields 252 through 256 of the table 670 are identical to that of FIG. 34. The event table 670 further comprises an event address 674 for indicating a location where event data is obtained (i.e., the location of a variable of the event). If the event class is, e.g., 00 indicating a timer event, then the value of the event address 674 will indicate a timer register temporarily provided for the event-driven process. If the event class is 10 indicating a command event, then the value of the event address 674 will indicate a command buffer (not shown) always used by the command interpreter 80. It should be noted that when a SAI is received, the EVENT attributes 250 of the SAI 10 are copied to the event table in a registration process.

It is assumed that the value of the event ID field 252 is expressed as $EID_{i-e}$, where "i" is an ID of SAI within an SAI group associated with the main SAI ($AID_{a-0}$), that is, "i" is for $AID_{a-i}$, i=0, 1, 2, . . . N, where N is the number of SAIs associated with (the SAI ($AID_a$) of) the main application ($AID_a$). Also, "e" is an ID within an SAI.

In FIG. 37, there is also shown an event processing routine 675. The routine 675 comprises the above described steps 654, 656 and 658. In response to the values of the event class 253, the CPU 72 (under the control of the event processing routine 662) monitors a timer register 676 temporarily provided in RAM 74, commands obtained by a command interpreter 80 and data transmitted to an overlay processor terminal 61*a* or 61*b*. The obtained data is compared with the value of condition field 255. In case of the event (3-1), the value of the timer register 676 identified by the value $AD_{3-1}$ in the address field 674 is compared with the value 13:00 in the condition field 254. If the comparison is successful, the CPU 72 executes the contents of the ACTION 256.

Operation Logging

Figure 38:
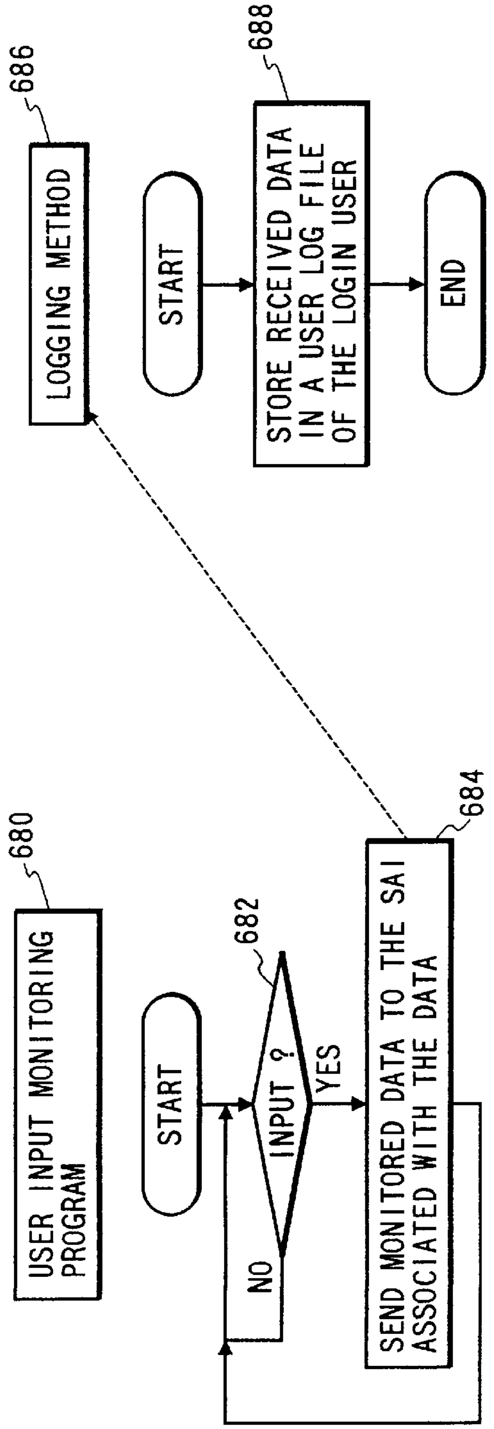
FIG. 38 is a flow chart showing a procedure for logging user-input data.

FIG. 38 is a flow chart showing a procedure for logging user-input data. In FIG. 38, a user input monitor program 680 makes a check in step 682 to see if any data is input. If so, the user input monitor program 680 passes the monitored data to the SAI associated with the monitored data in step 684. In response to a reception of the monitored data, a logging method 686 stores the received data in a log file of the log-in user in step 688.

Figure 39:
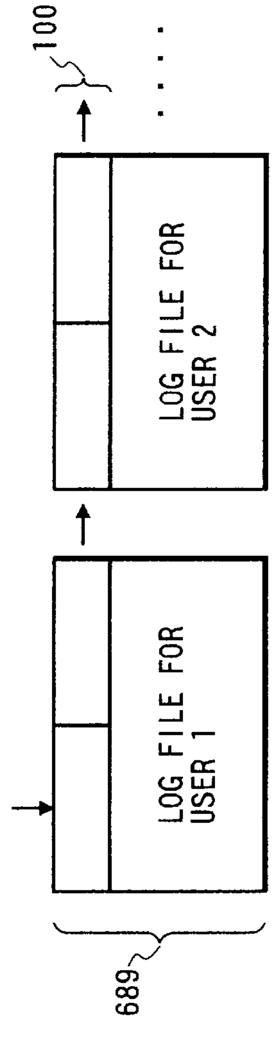
FIG. 39 is diagram showing the way of referring to each log file.

FIG. 39 is diagram showing the way of referring to each log file 689. In FIG. 39, Each log file 889 is accessible by using attribute data 100.

Figure 40A:
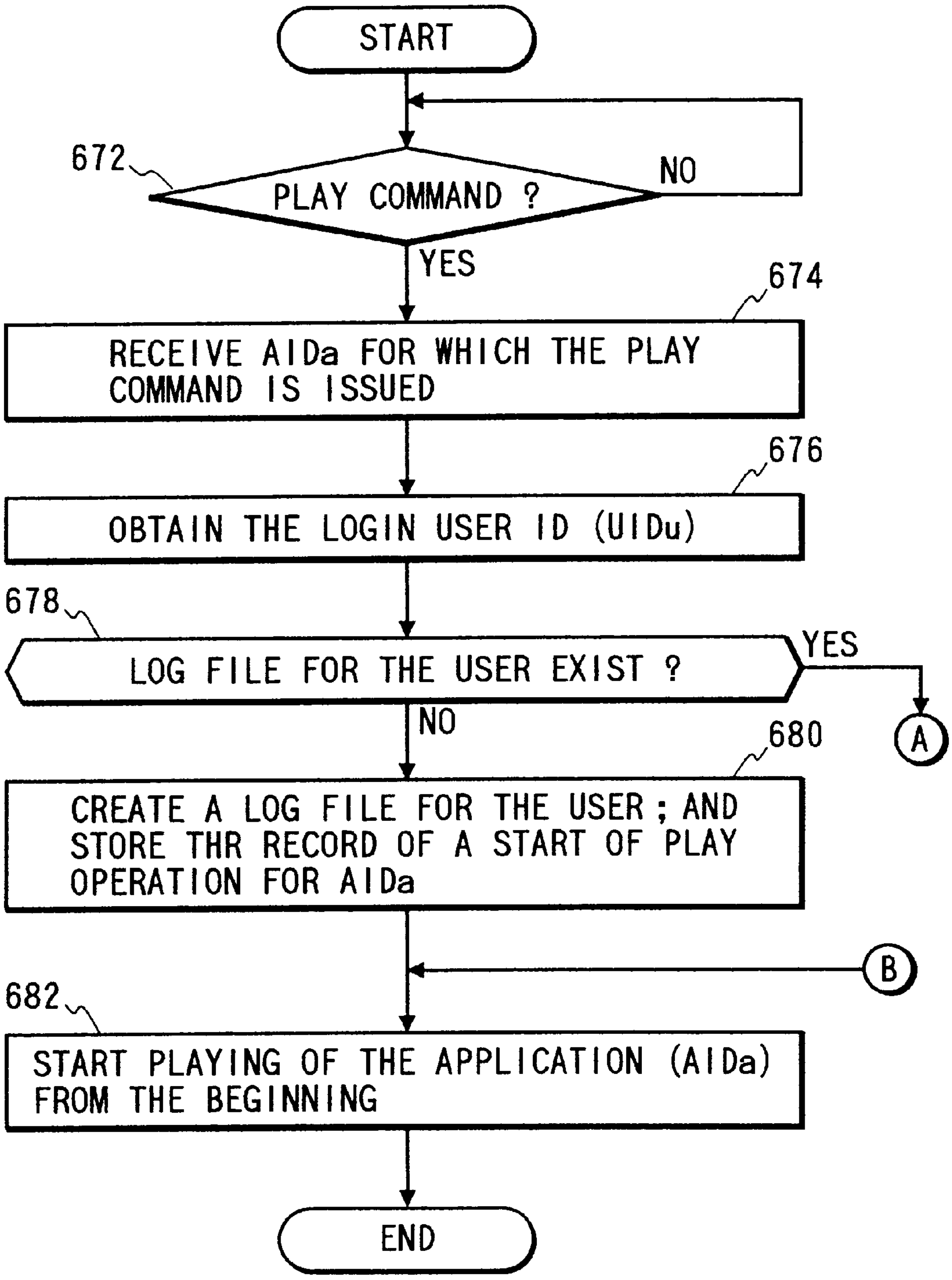
FIGS. 40A and 40B when combined A—A and B—B form a flow chart showing an exemplary procedure of resuming a play of application data the playing of which has been stopped halfway.
Figure 40B:
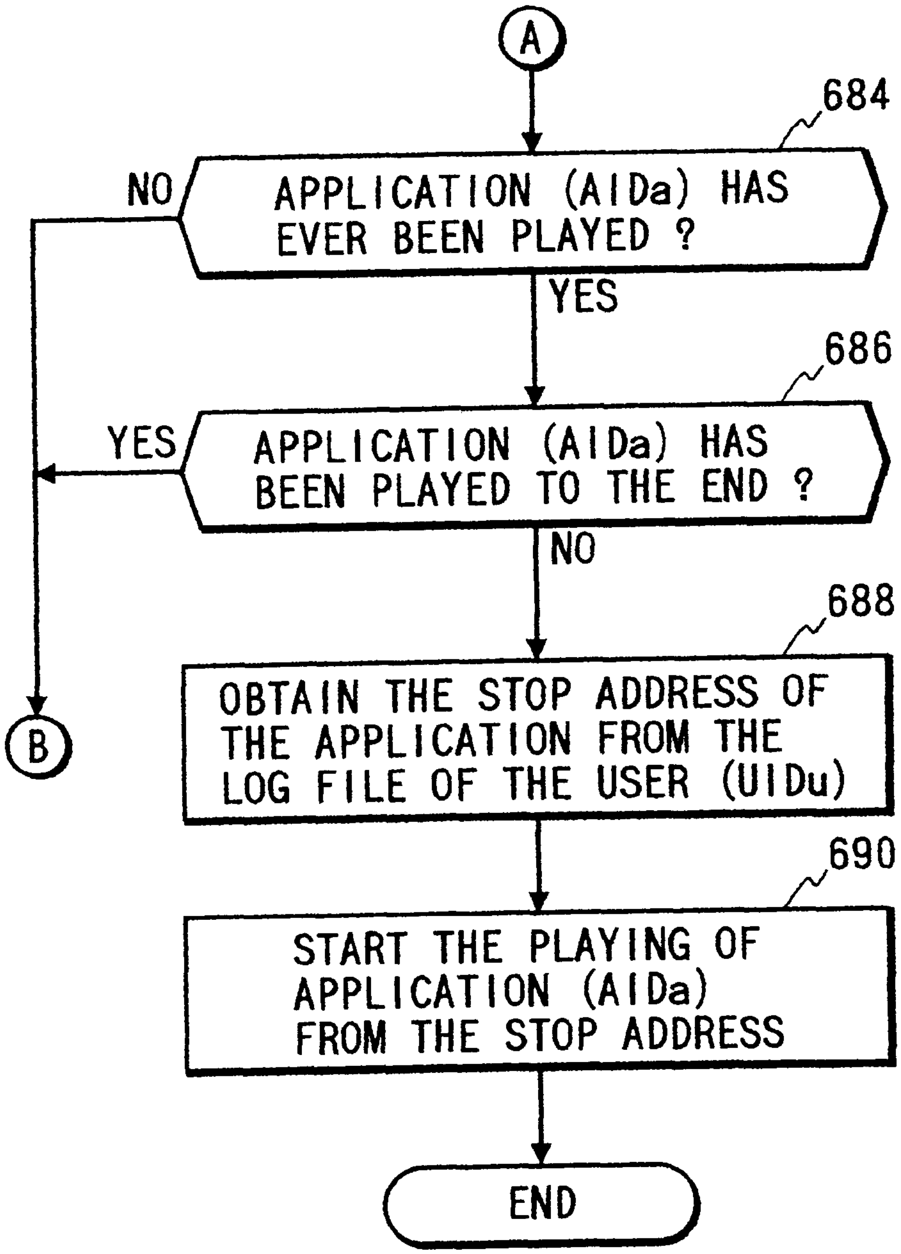

A resume function is realized by using the user log files. FIGS. 40A and 40B when combined A—A and B—B form a flow chart showing an exemplary procedure of resuming a play of application data the playing of which has been stopped halfway. In FIGS. 40A and 40B, the CPU 72 waits for a PLAY command in step 672. If a PLAY command is received in step 672, then in step 674 the CPU 72 receives an application ID ($AID_a$) for which the PLAY command has been issued and in step 676 obtains the ID ($UID_u$) of the user using the system. In step 678, the CPU 72 makes a check to see if the log file for the user ($UID_u$) exists. If not, then in step 680 the CPU 72 creates a log file for the user and store the record indicative of a start of PLAY operation for the application ($AID_a$). In the next step 682, the CPU 72 starts playing of the application ($AID_a$) from the beginning and ends the procedure.

If the test result is YES in step 678, then the CPU 72 makes a check to see if the application (AID) has ever been played. If not, the CPU 72 proceeds to step 682. Otherwise, the CPU 72 makes a check in step 686 to see if the application has been played to the end. If so, the CPU 72 proceeds to step 682. Otherwise, the CPU 72 obtains the stop address of the application from the log file of the user ($UID_u$) in step 688 and start the playing of application ($AID_a$) from the stop address in step 690. Then the CPU 72 ends the procedure.

It is also noted that audience research is achieved by the system 50 sending necessary contents periodically to the administrative center.

Method

Figure 41:
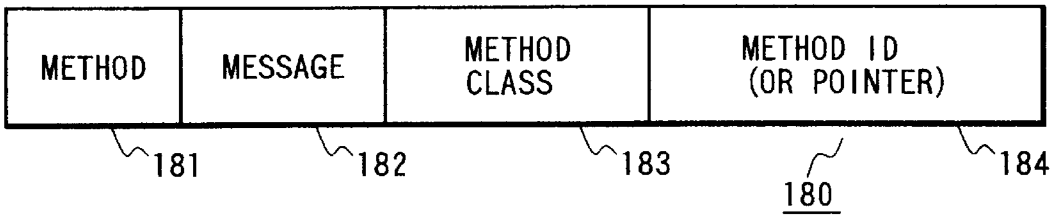
FIG. 41 shows a structure of the METHOD attribute 180 in a SAI 10.

FIG. 41 shows a structure of the METHOD attribute 180 in a SAI 10. A method is a set of data and a program for utilizing the data. The program of the method is activated by an instruction from the user. For example, if the data for commodity prices which will appear in a commercial and a program for displaying the prices are ready for use, then the user can makes a check of the prices of the commodities in the commercial program being played by making a predetermined operation. In FIG. 41, the METHOD attribute 180 comprises an attribute ID "METHOD" 181, a message field 182, a method class field 183 and a method ID (or pointer) 184.

Figure 42:
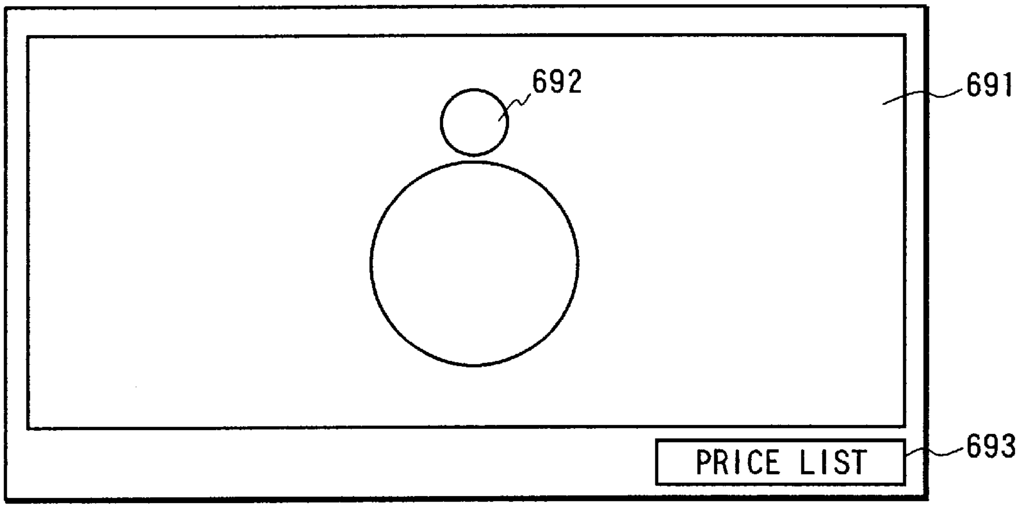
FIGS. 42 and 43 show examples of displayed services (commercial in this case)
Figure 43:
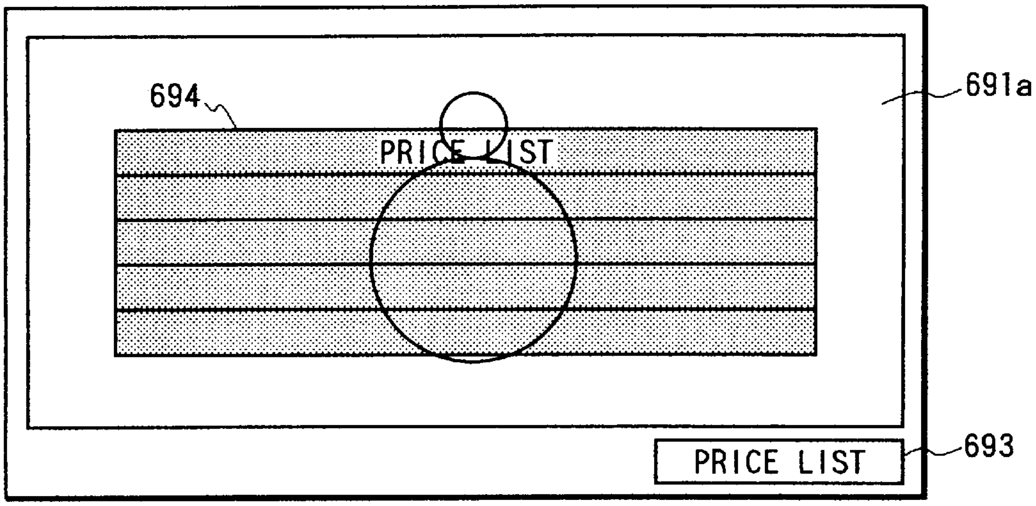

FIGS. 42 and 43 show examples of displayed services (commercial in this case). In FIG. 42, a commercial display 692 contains commodities (e.g., finger rings) 692 and a software switch 693 for indicating that a clicking of the software switch 693 yields a display of the price list of the displayed commodities 692. If the user clicks the switch 693, then this causes a method for displaying the price list to be activated, which in turn retrieves an application 1 containing price data and displays a price list 694 as shown in FIG. 43.

Figure 44:
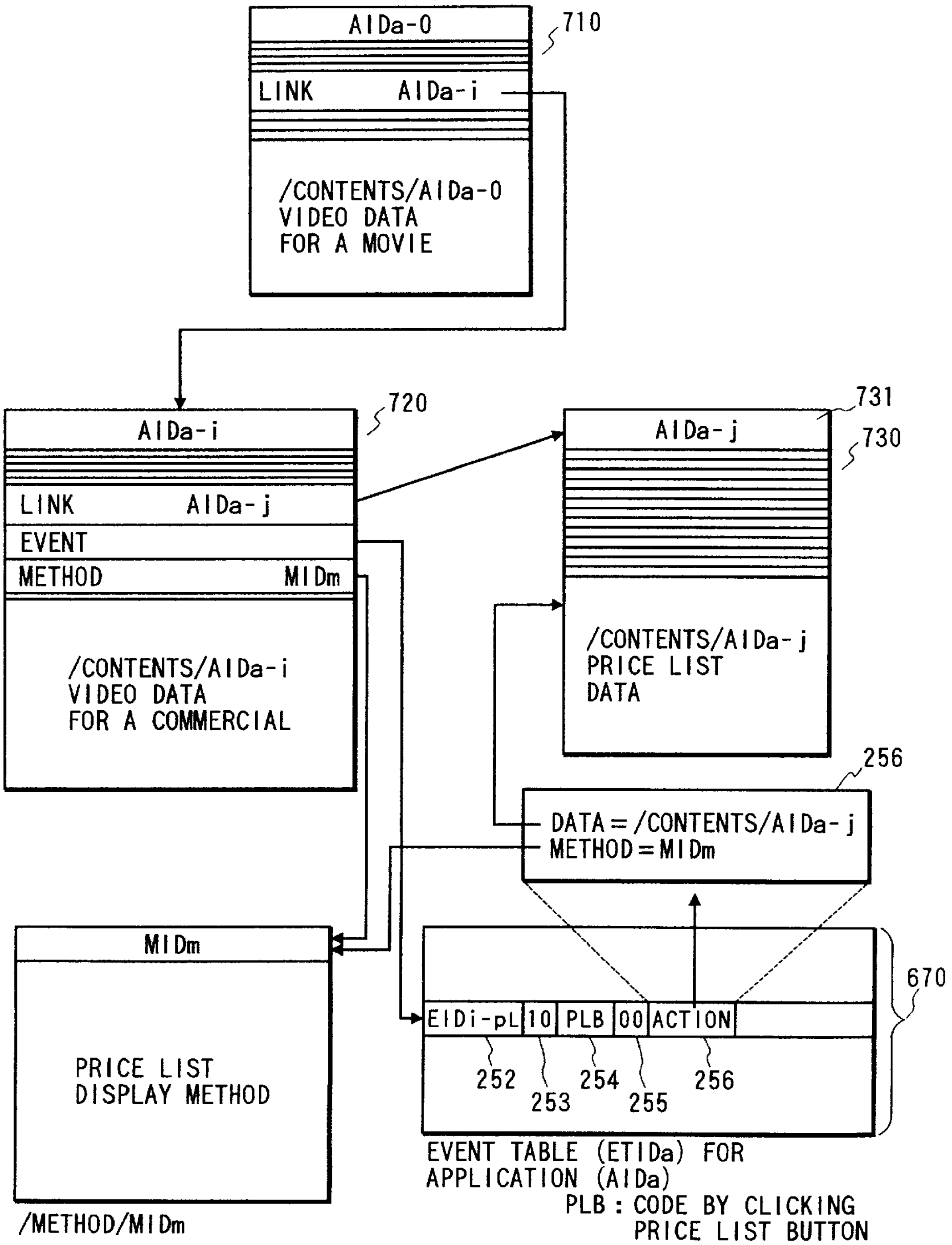
FIG. 44 is a diagram for describing operations caused by the user clicking the price list button after a commercial application ($AID_{a-i}$) has been activated during the play of a main application ($AID_{a-0}$)

FIG. 44 is a diagram for describing operations caused by the user clicking the price list button after a commercial application ($AID_{a-i}$) 720 has been activated during the play of a main application ($AID_{a-0}$) 710. It is assumed that the commercial application SAI ($AID_{a-i}$) has a LINK attribute 190 containing, in its LINK FELLOW 193, an ID, e.g., $AID_{a-j}$ 731 of a price list application 730 containing price list data for the commercial application ($AID_{a-i}$). In this situation, when the commercial application ($AID_{a-i}$) is activated, i.e., a corresponding commercial program is started, the above mentioned event table (ID=$ETID_a$ for example) 670 will have been created and at least event records (ID=$EID_{0-x}$ and $EID_{i-x}$ for example, where x=don't care) will have been copied in the event table. Among the copied event records ($EID_{0-x}$ and $EID_{i-x}$), there must be the event record for the price list application ($AID_{a-j}$), e.g., an event record (ID=$EID_{i-PL}$). The event record must contain the following values.

EVENT ID: $EID_{i-PL}$
EVENT CLASS: 10 (a command event)
CONDITION: PLB (a command code for a price list display)
ACTION CLASS: 00 (a time series data play)
ACTION: data=/contents/$AID_{a-j}$, method=$MID_m$
ADDRESS: empty (This event can not be detected by monitoring a specific memory location.)

In the above described situation if the user clicks the software prist list button 693, then the contents of the action field 256 is to be executed in the manner as described in FIG. 35. Specifically, according to the contents of the action field 256, the action is achieved by an object comprising data=/contents/$AID_{a-j}$ and method=$MID_m$. That is, the method ($MID_m$) stored in a file name=$MID_m$ in a "/method" directory is executed by using the application data ($AID_{a-j}$) stored in a file /contents/$AID_{a-j}$.

Method "LINK COPY"

Figure 45:
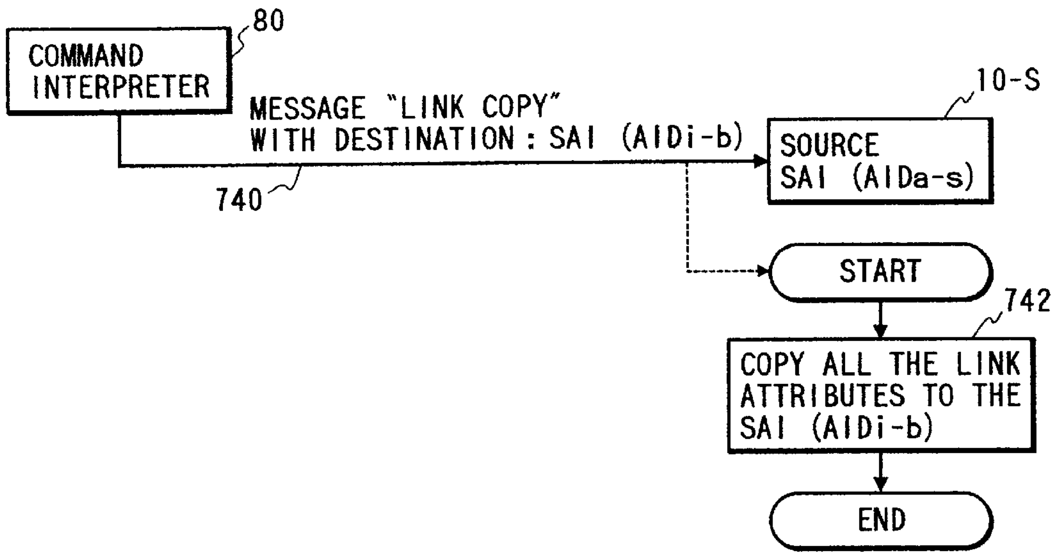
FIG. 45 is a flow chart showing the operation for a LINK COPY command for copying all the LINK attributes of source SAI ($AID_{a-S}$) to destination SAI ($AID_{a-D}$)

FIG. 45 is a flow chart showing the operation for a LINK COPY command for copying all the LINK attributes of source SAI ($AID_{a-S}$) to destination SAI ($AID_{a-D}$). If the LINK COPY command is issued, then the command interpreter 80 passes a message "LINK COPY" with DESTINATION=SAI ($AID_{a-D}$) to the source SAI ($AID_{a-i}$) in step 740. In the next step 742, a method LINK COPY copies all the LINK attributes to the destination SAI ($AID_{a-j}$), which completes the operation.

Figure 46:
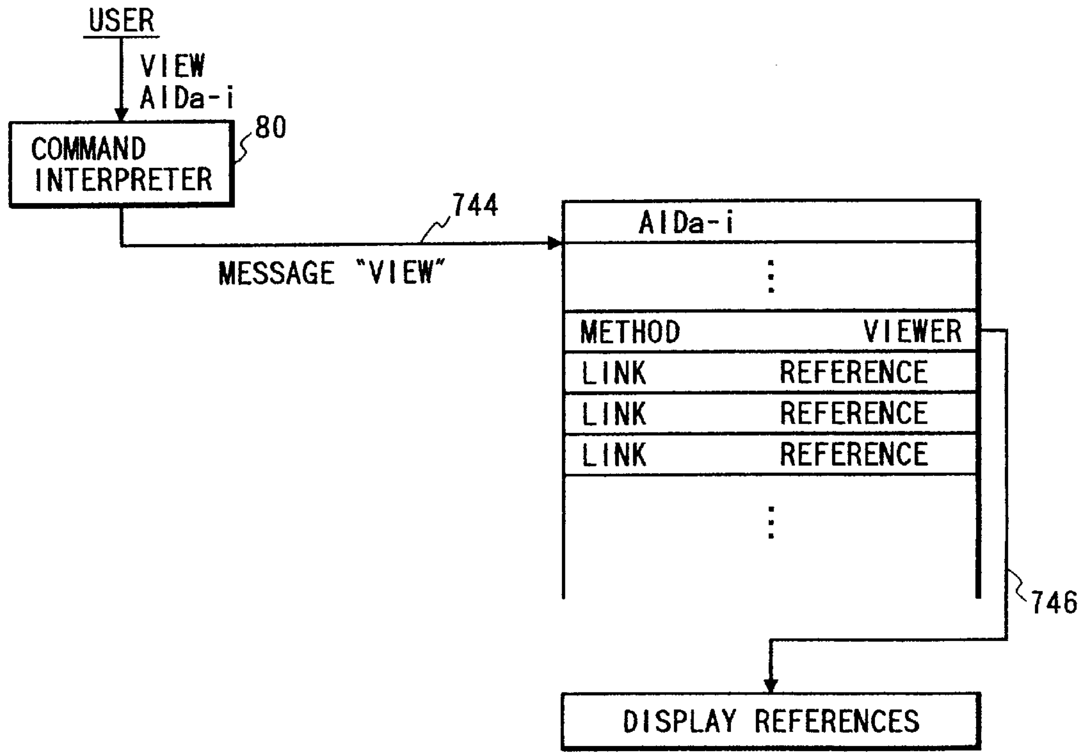
FIG. 46 is a flow chart showing the operation for a VIEW command for displaying SAI ($AID_{a-i}$)

FIG. 46 is a flow diagram showing a VIEW command is activated. If the user issues a VIEW command specifying a desired application ID ($AID_{a-i}$), then the command interpreter 80 passes a message "VIEW" to the SAI ($AID_{a-i}$) in step 744. In step 746, a method VIEWER associated with the message "VIEW" is activated.

Figure 47:
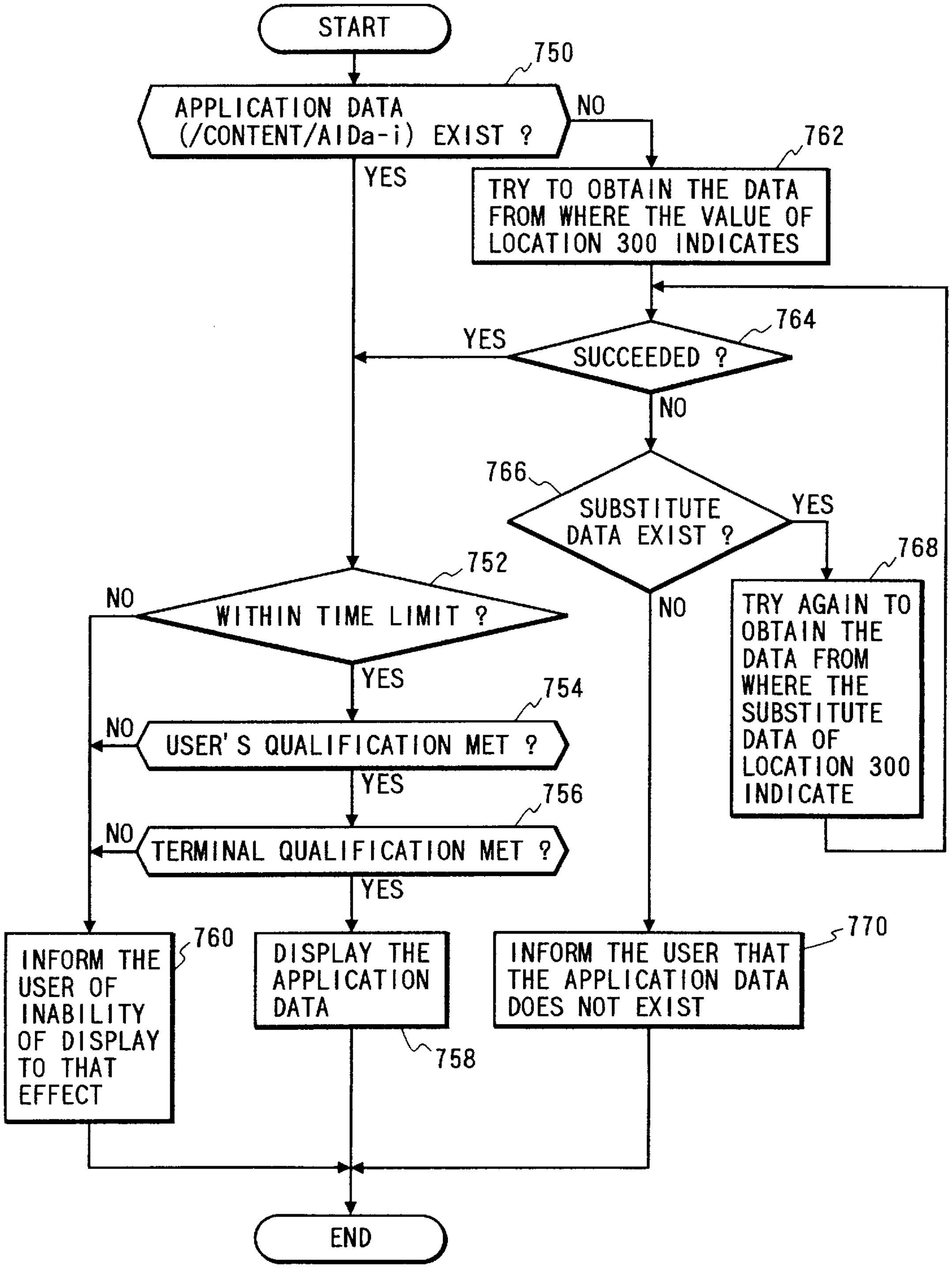
FIG. 47 is a flow chart showing the operation of a program for referring to application data of the application ($AID_{a-i}$)

FIG. 47 is a flow chart showing the operation of the method VIEWER for displaying AIDs of the SAIs identified by the values of the REFERENCE fields 195 of the LINK attributes 190 contained in the SAI ($AID_{a-i}$). When the operation of the VIEWER is started, the CPU 72 proceeds to step 750 to makes a check to see if application data ($AID_{a-i}$) exist. If so, then the CPU 72 makes a check in step 752 to see if the application data is within the time limit contained in the effective time and data field 220. If so, then the CPU 72 makes another check in step 754 to see if the values for the user in the user data table 520 satisfies the data contained in the user qualification field 230. If so, then the CPU 72 makes further check step 758 to see if the data of the system data file 510 satisfies a predetermined conditions. If so, the CPU 72 displays the application data in step 758, and ends the operation. If the test result is NO in any of the steps 752, 754 and 756, then the CPU 72 informs the user of inability of display to that effect in step 760 and ends the operation.

If the test result of step 750 is NO, then the CPU 72 tries to access to where the value of the LOCATION field 300 indicates and obtain the application data ($AID_{a-i}$) therefrom in step 762. In step 764, the CPU 72 makes a test to see if the data was obtained. If so, the CPU 72 proceeds to the above described step 752. Otherwise, the CPU 72 makes another test in step 766 to see if there is substitute data for LOCATION 300. If so, the CPU 72 tries again to access to where the substitute data of the LOCATION field 300 indicates and obtain the application data ($AID_{a-i}$) therefrom in step 768 (If an access via the internet is impossible, then a dedicated line may be used, or if a trial by means of database A is not successful, then database B may be used, and so on). Otherwise, in step 770 the CPU 72 informs the user that the application data ($AID_{a-i}$) does not exist and ends the operation.

A message list may be stored in the HD 40 for use in displaying a message in step 760. The message list may contain (1) It has passed the time limit!

(2) You are not qualified for the service.

(3) The service is not supported for this system.

Figure 60:
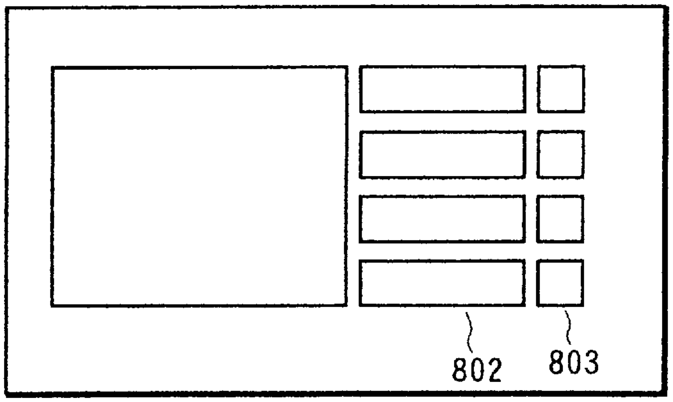
FIG. 60 is a diagram showing a displayed results by VIEWER according to the invention.

An example of a display by VIEWER is shown in FIG. 60. In FIG. 60, the display includes titles (or IDs) 802 of SAIs associated with the SAI ($AID_{a-i}$ and corresponding logotypes 803. If the same titles is to be displayed, then respective creators and/or providers may be displayed together. Also, the method VIEWER may display the freshness or brand information concerning the title.

If a viewer provided by a provider of an SAI is used, the viewer may check the SIGNATURE attribute in the SAI ($AID_{a-i}$) to see if the data is illegally altered. Also, if the viewer is provided with a signature authenticating function, then the viewer may check the SIGNATURE attribute 150 in the SAI ($AID_{a-i}$) to see if the data is illegally altered. If the viewer is not provided with a signature authenticating function, the viewer may, prior to displaying the AIDs, send the signature in the SIGNATURE attribute 150 to where the value of the LOCATION attribute 30 indicates and have the signature authenticated.

Figure 48:
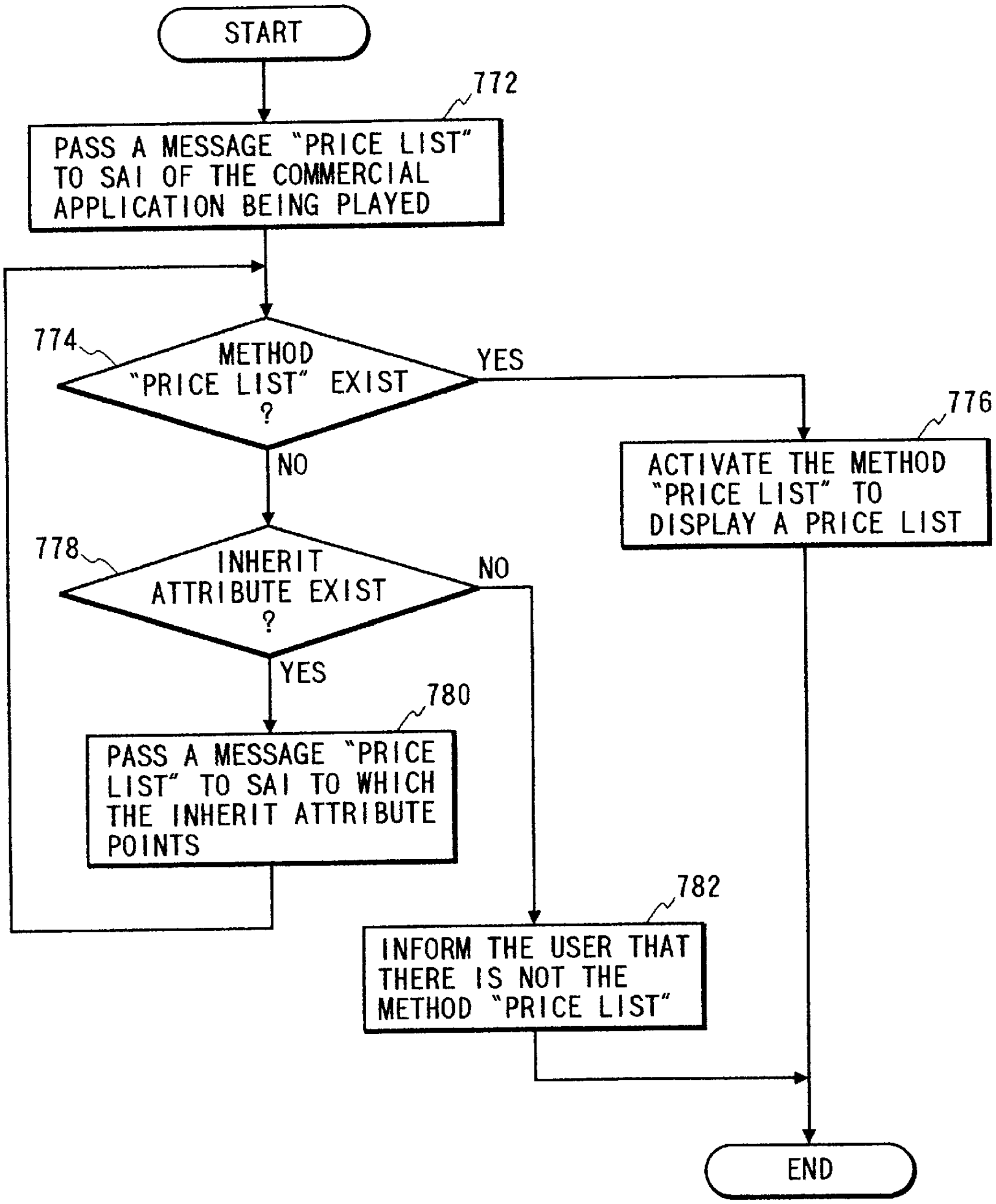
FIG. 48 is a flow chart showing the operation, including an inherit process, of displaying a price list during the play of a commercial application.
Figure 49:
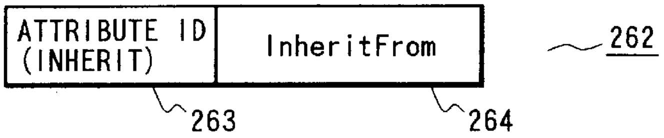
FIG. 49 is a diagram showing an exemplary INHERIT attribute 262 which can be included in the SAI 10.

FIG. 48 is a flow chart showing the operation, including an inherit process, of displaying a price list during the play of a commercial application. It is noted that the SAI 10 can include an INHERIT attribute 262 as shown in FIG. 49. In FIG. 49, the INHERIT attribute 262 comprises an attribute ID (INHERIT) 262 and a InheritFrom field 264.

If a price list is to be displayed during the play of the commercial application, the CPU 72 enters the operation of FIG. 48 to proceeds to step 772, where the CPU 72 passes a massage PRICE LIST to the SAI ($AID_{a-i}$) 10 of the commercial application 1 being played, and in step 774 makes a test to see if the method PRICE LIST exist in the SAI ($AID_{a-i}$) If so, the CPU 72 activates the found method PRICE LIST to display a price list in step 776 and ends the operation.

On the other hands, if the test result is NO in step 774, then the CPU 72 makes a test in step 778 to see if an INHERIT attribute exists in the SAI ($AID_{a-i}$). If so, then the CPU 72 passes a message PRICE LIST in step 780 to a SAI to which the INHERIT attribute 262 points. Otherwise, in step 782 the CPU 72 informs the user that there is not the method PRICE LIST, and ends the operation.

Exemplary Operation in Viewing a Soccer Game

The operation of the multimedia application storage/player (the inventive system) 50 receiving data necessary for viewing, e.g., a soccer game as a main program or application ($AID_{a-0)}$ 1-M and playing the program will be described.

In the distribution of necessary information, prior to broadcasting the contents or application data 11-M (soccer game video data in this example), the broadcast station (not shown) broadcasts the SAIs 13-0 in a broad sense, i.e., the SAI ($AID_{a-0}$) of the main application, a Viewer application ($AID_{a-V}$) for a viewer program (a viewer program itself and its SAI for playing the application data 11-M, a DisplayInfoMark application ($AID_{a-DIM}$), a DisplaySponsor application ($AID_{a-DS}$), a Commercial application ($AID_{a-C}$), and various other applications as described above. The inventive system receives and stores these information in the HD 40.

The SAIs of the applications which works in concert with the DisplayInfoMark application have respective EVENT attributes 250 for displaying an information mark on the screen in response to an information mark trigger. The SAIs of the applications which works in concert with the DisplaySponsor application 1-DS have respective EVENT attributes 250 for displaying a sponsor name and/or a logotype.

Figure 50:
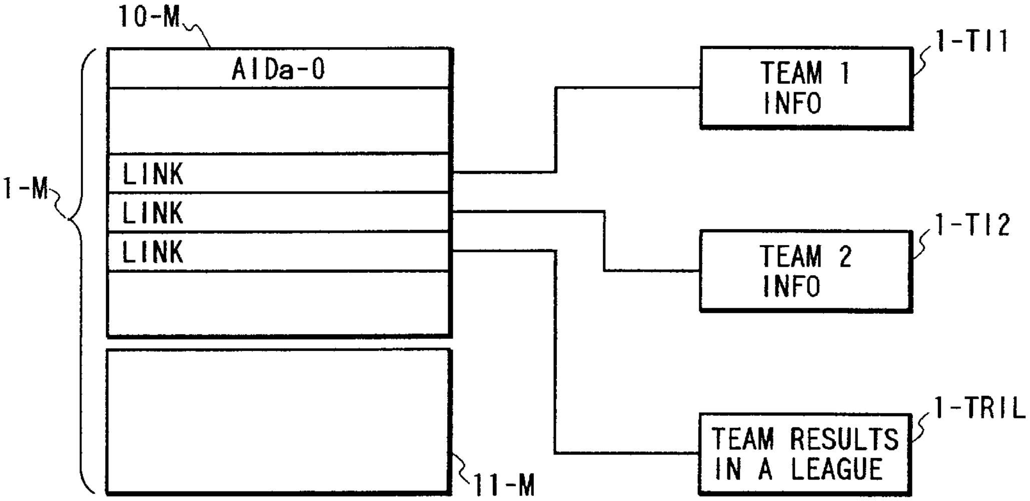
FIG. 50 is a diagram showing other information linked with the main application 1-M.
Figure 51:
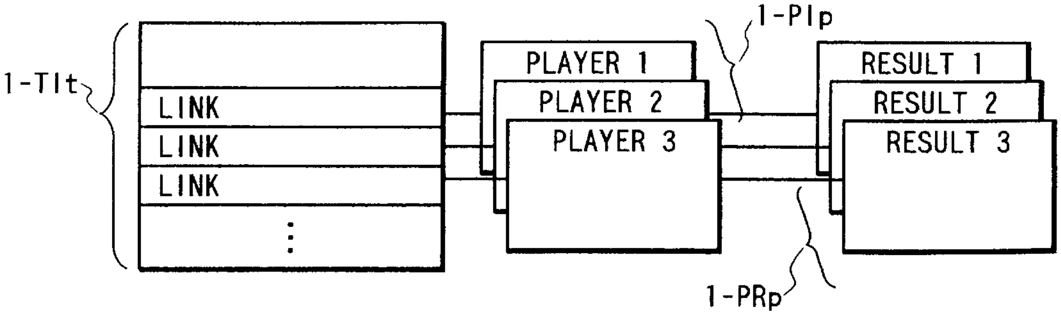
FIG. 51 is a diagram showing still other information linked with each of the Team2Info application 1-TIt (t=1 or 2, which indicates one of the teams)

FIG. 50 is a diagram showing other information linked with the main application 1-M. In FIG. 50, the main application 1-M is linked with a Team1Info application 1-TI1, a Team2Info application 1-TI2, and a TeamResultInLeague application 1-TRIL through respective LINK attributes 190. FIG. 51 is a diagram showing still other information linked with each of the Team2Info application 1-TIt (t=1 or 2, which indicates one of the teams). In FIG. 51, each of the team information application, 1-TIt, is linked via a link attribute 190 with the player information applications 1-PI$_p$ for the players of the team. The subscript "p" is a serial number assigned to each player. The player information applications 1-PI$_p$ are in turn linked with respective ParsonalResult applications 1-PR$_p$.

It is noted that the broadcast station includes, in the application data 11-m, trigger codes associated with information mark display, sponsor display, and commercial display. Also, the broadcast station periodically broadcasts SAIs containing EVENT attributes corresponding to these functions. Receiving application data 11-M of the main application for a soccer game watching, the inventive system 50 stores the application data 11-M so as to associate the data 11-M with the corresponding SAI 10-M having been stored in HD 40.

Figure 52:
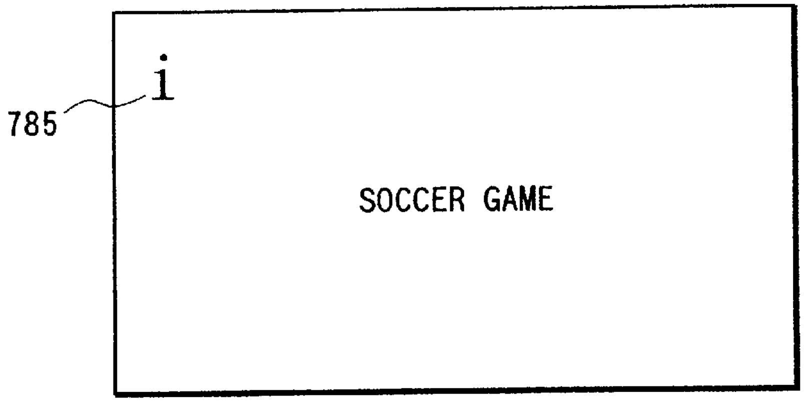
FIGS. 52 through 54 are diagrams showing screens on which an information mark, sponsors and a commercial are displayed respectively.
Figure 53:
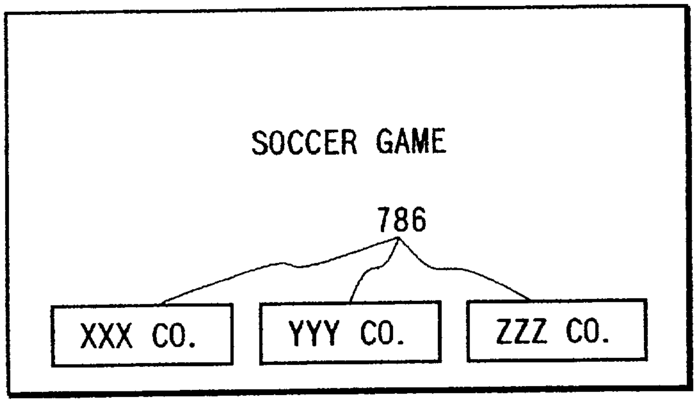
Figure 54:
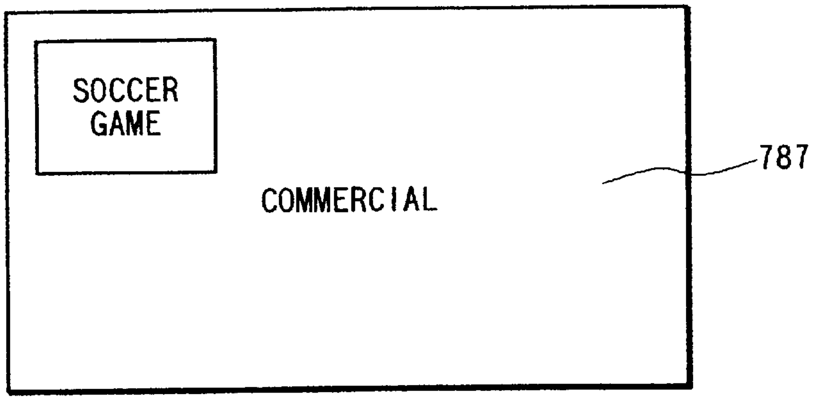

If the user selects the succor application 1-M in a EPG display screen, then the command interpreter 80 first creates an event table 670 for the application 1-M, copies the EVENT attributes contained in the SAI 10-M of the main application to be displayed to the created event table 670, and then passes a display message to the SAI 10-M of the soccer game watching application to display the soccer application 1-M. Thereafter, monitoring of event triggers is stared. If an DisplayInfoMark trigger is detected in the course of playing the soccer game watching application 1-M, then the associated action which is defined in the ACTION field 256 of the event table 670 is taken. By this action, an information mark 785 is displayed as shown in FIG. 52. Similarly, in response to a detection of one of predetermined DisplaySponsor triggers, the inventive system displays sponsor information associated with the detected trigger. The sponsor information 786 is displayed in a manner, e.g., as shown in FIG. 53. Also, if one of predetermined Commercial triggers is detected, then the inventive system plays or displays a Commercial 787 associated with the detected trigger as shown in FIG. 787.

Figure 55:
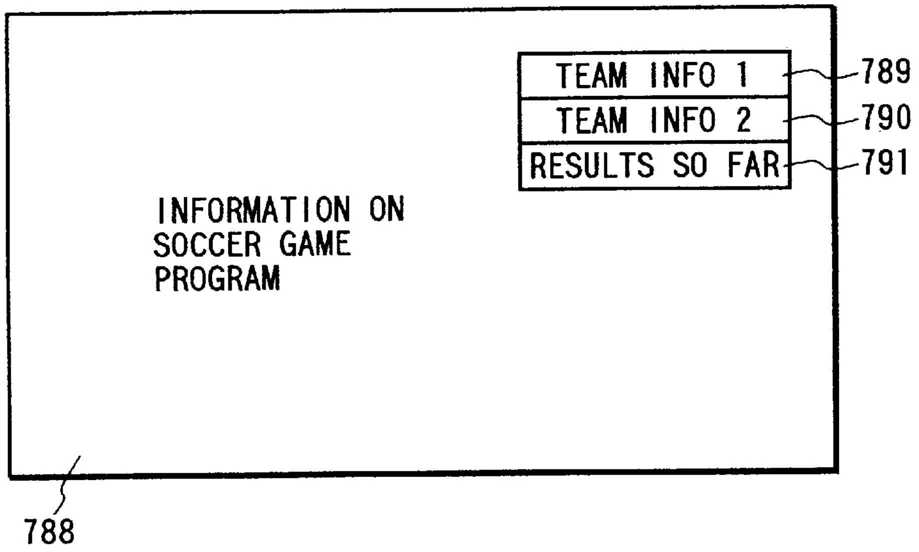
FIG. 55 is a diagram showing an exemplary display caused by a predetermined information display operation during the display of the information mark 785.
Figure 56:
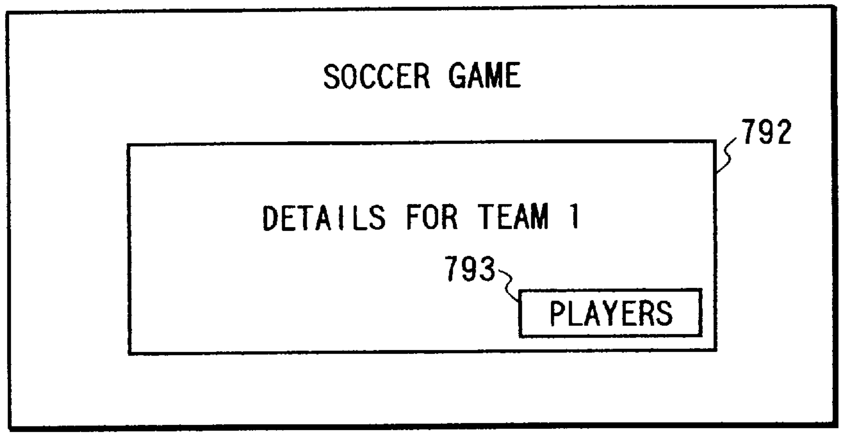
FIG. 56 is a diagram showing an exemplary display caused by clicking one of the buttons 789 through 791 in the display of FIG. 55.

If the user does a predetermined operation for displaying information during the display of the information mark 785, then the above mentioned Viewer application (a main application display mechanism) passes a Display message to the SAI 10-M of the main application, causing a corresponding DisplayInfo method contained in the SAI 10-M to be activated. This yields a display as shown in FIG. 55. In FIG. 55, there are displayed information 788 on the soccer game program and software buttons 789 for displaying team information 1 and 2 and team results so far in the league. If the team 1 info button 789 is clicked, the DisplayInfo method passes a DisplayInfo message to the SAI 10-TI1 of the Team1Info application 1-TI 1, causing a corresponding method in the SAI 10-TI1 to be activated and yields a display as shown in FIG. 56. In FIG. 56, the details for the team 1 is displayed in an area 792 and a PLAYERS button 793 for activating a method for displaying a player list is displayed near the lower right corner of the area 792.

Figure 57:
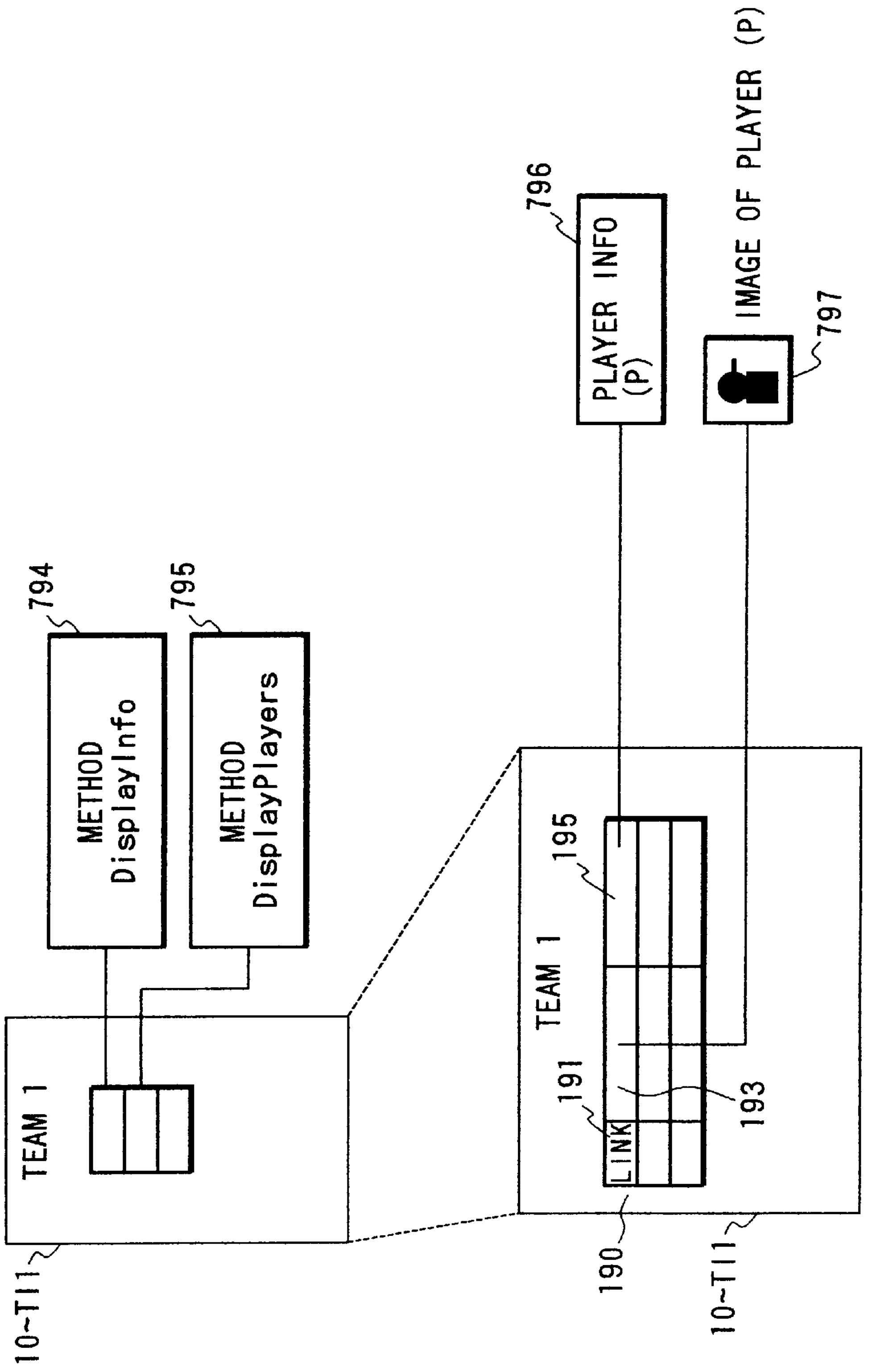
FIG. 57 is a diagram showing how a method is activated by a clocking of the PLAYERS button of FIG. 56 and information linked with the SAI 10-TI1 for the team 1.
Figure 58:
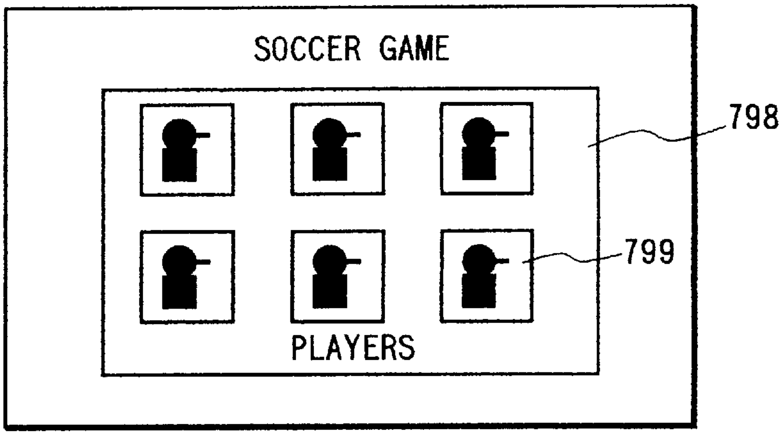
FIG. 58 is a diagram showing an exemplary display caused by a clocking of the PLAYERS button of FIG. 56.
Figure 59:
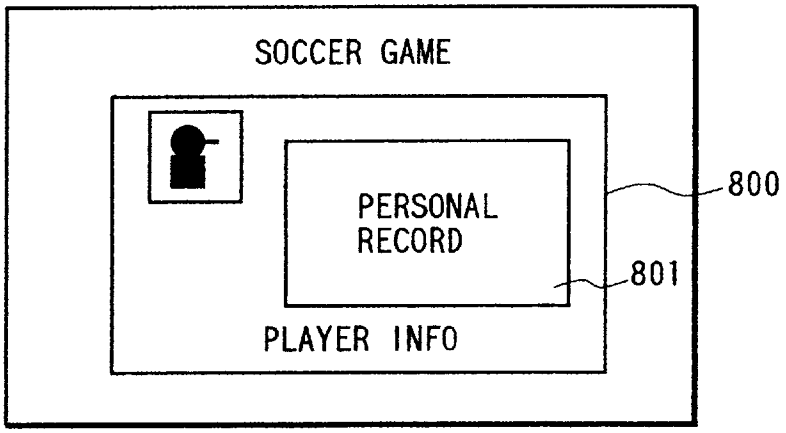
FIG. 59 is a diagram showing a display screen caused by a clicking one of the player images of FIG. 58.

If the PLAYERS button 793 is clicked, then the DisplayInfo method 794 passes a DisplayPlayers message to the SAI 10-TI1 for the team 1, causing a method 795 associated with the DisplayPlayers message to be activated. The SAI 10-TI1 for the team 1 has a LINK attribute 190 containing a link fellow 193 indicating an image 797 of each player (P) of the team 1 and a reference 195 to player information (P) 796 as shown in FIG. 57. This yields a display as shown in FIG. 58. In FIG. 58, player information 798 is displayed at the center of the screen. Each image 799 of the players displayed in the player information 798 area serves as a button for activating a method for displaying the details for a player. If the user clicks one of the displayed images, then the DisplayInfo method 794 passes a DisplayPlayerInfo message to the SAI 10-TI1 for the team 1, causing a corresponding method to be activated and yielding a display as shown in FIG. 59. In FIG. 59, a player information 800 and personal records 801 are displayed.

Displaying a Sponsor

The multimedia application storage/player 50 may display a sponsor in playing and displaying application data ($AID_{a-0}$) or in response to an instruction of sponsor display from the user during the play or display of the application data. However, there may be a plurality of sponsors in the SPONSOR attribute 120. In order to cope with this situation, the inventive system 50 calculates, for the user, the ranking point for each of the plurality of sponsors by using numerical data (not shown) which has been calculated and stored in the SPONSOR attribute and numerical data (not shown) stored in the user data table 520 of FIG. 23. The method of calculating the ranking points is disclosed in Japanese Patent Application No. Hei08-211964 (1996).

Figure 61:
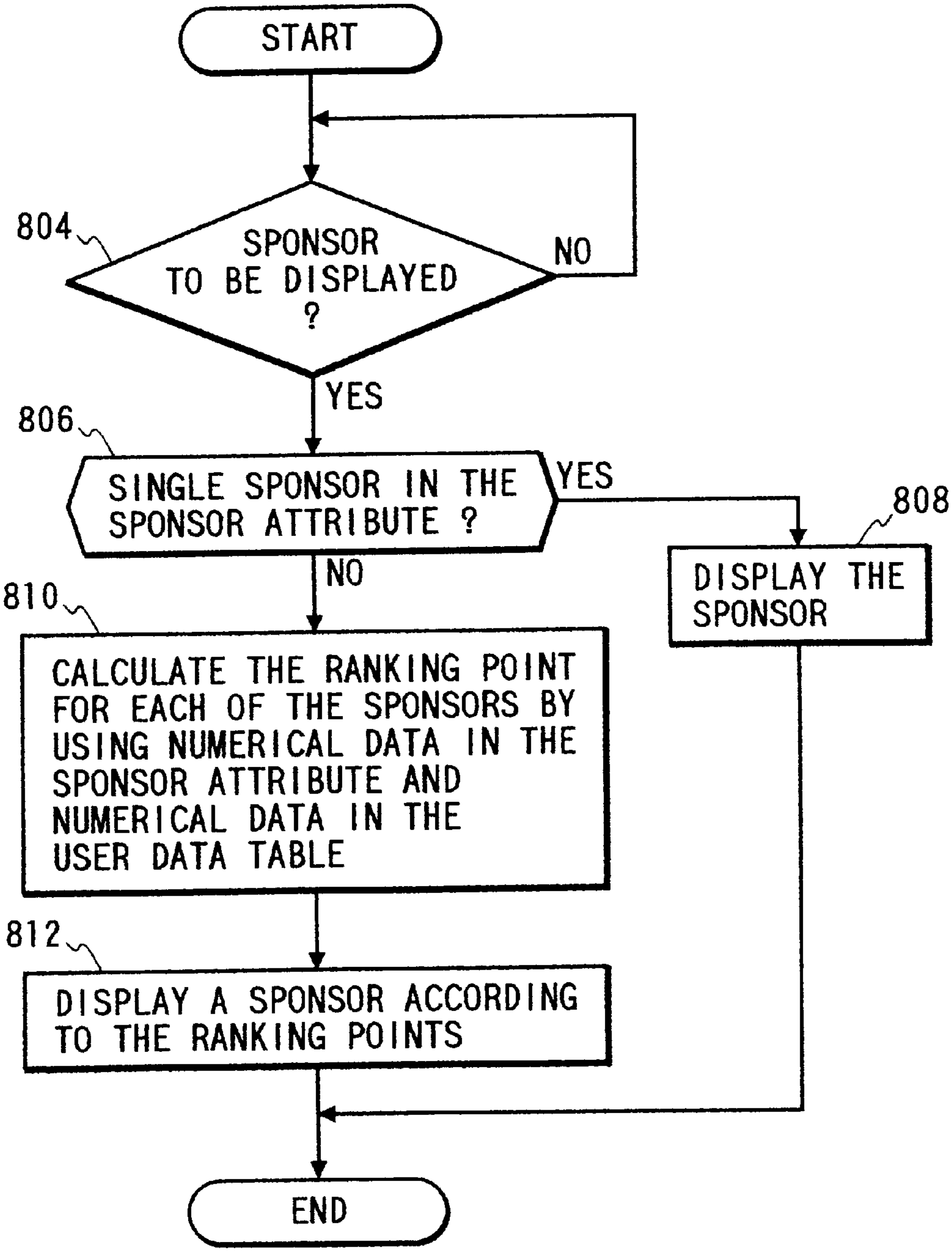
FIG. 61 is a flow chart showing the operation in displaying a sponsor according to the invention.
Figure 62:
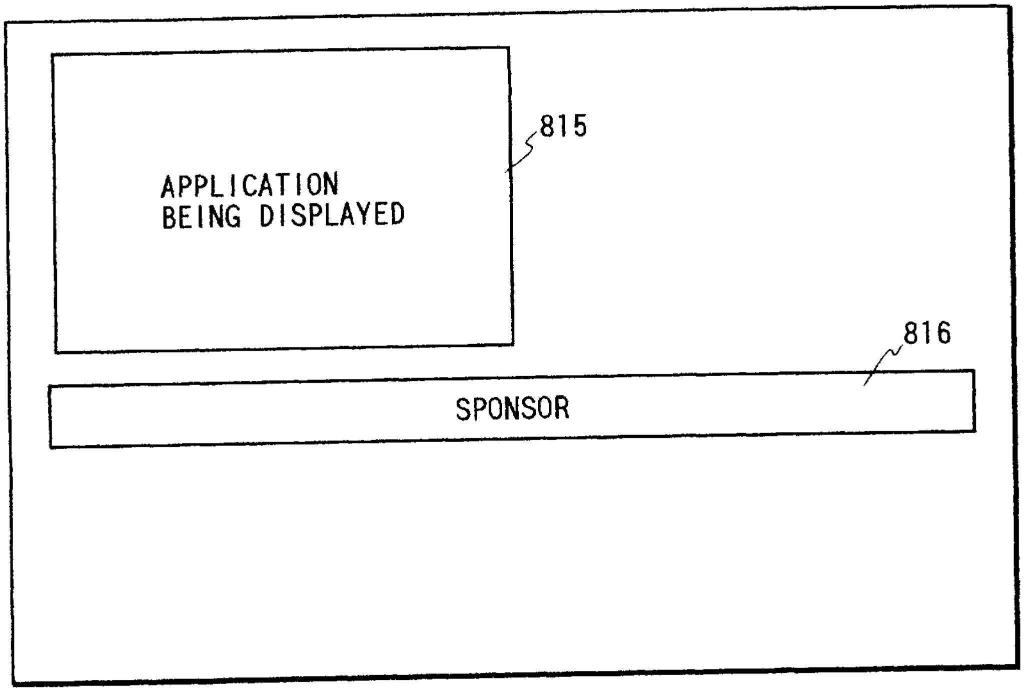
FIG. 62 is a diagram showing an exemplary screen in which an application 815 is being played and sponsor information 816 is displayed in a wide narrow area

FIG. 61 is a flow chart showing the operation in displaying a sponsor according to the invention. In FIG. 61, the CPU 72 makes a test in step 804 to see if any sponsor is to be displayed. If not, the CPU returns to step 804. If the answer is YES in step 804. In step 806, the CPU 72 makes a test to see if there is only one sponsor in the SPONSOR attribute 120. If so, the CPU 72 displays the sponsor in step 808 and ends the operation. Otherwise, in step 810 the CPU 72 calculates, for the user, the ranking point for each of the sponsors by using numerical data (not shown) which has been calculated and stored in the SPONSOR attribute 129 and numerical data (not shown) stored in the user data table 520. Then in step 812, the CPU 72 displays a sponsor according to the calculated ranking points. For example, a sponsor of the highest ranking points is displayed. FIG. 62 is a diagram showing an exemplary screen in which an application 815 is being played and sponsor information 816 is display in a wide narrow area.

Display Related Services

Figure 63:
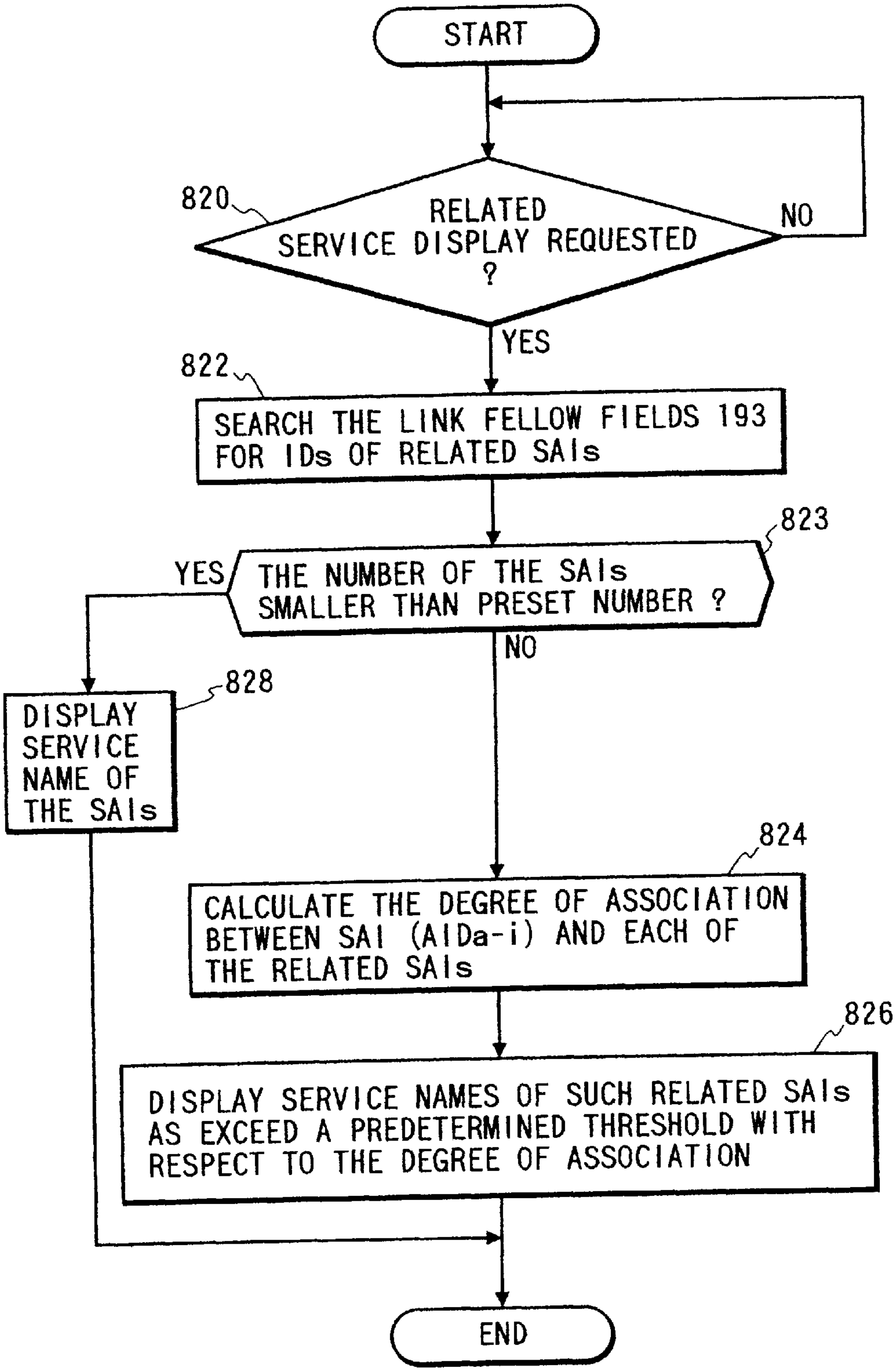
FIG. 63 is a flow chart showing the operation of a program for displaying services related with the active application ($AID_{A-i}$) in response to a request from the user.

FIG. 63 is a flow chart showing the operation of a program for displaying services related with the active application ($AID_{A-i}$) in response to a request from the user. In FIG. 63, the CPU 72 makes a test to see in step 820 to see if a related service display is requested. If not, then the CPU returns to step 820. If so, then in step 822 the CPU 72 searches the LINK FELLOW fields 193 of the LINK attributes of the SAI ($AID_{a-i}$) for IDs of the related SAIs and in step 823 makes a test to see if the number of the related SAIs is larger than a predetermined number. If so, the CPU 72 displays the names of the related SAIs in step 828 and ends the operation. Otherwise, the CPU 72 calculates the degree of association between the SAI ($AID_{a-i}$) and each of the related SAIs in step 824. Then the CPU 72 displays service names of such related SAIs as exceed a predetermined threshold with respect to the degree of association, and ends the operation. The method of calculating the degree of association is also disclosed in Japanese Patent Application No. Hei08-211964 (1996).

Figure 64:
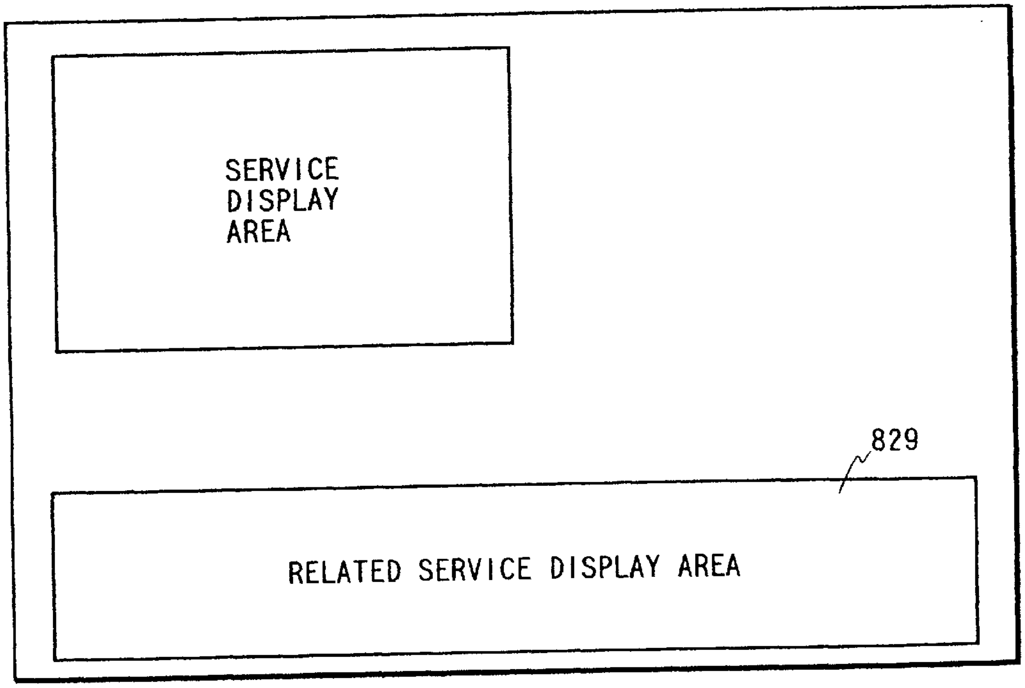
FIG. 64 is a diagram showing an exemplary display of related services.

FIG. 64 is a diagram showing an exemplary display of related services. In FIG. 64, related service display area 83 is in a lower part of the screen. By displaying related services, the applications stored in HD 40 will be more frequently used.

Displaying a Coupon

Figure 65:
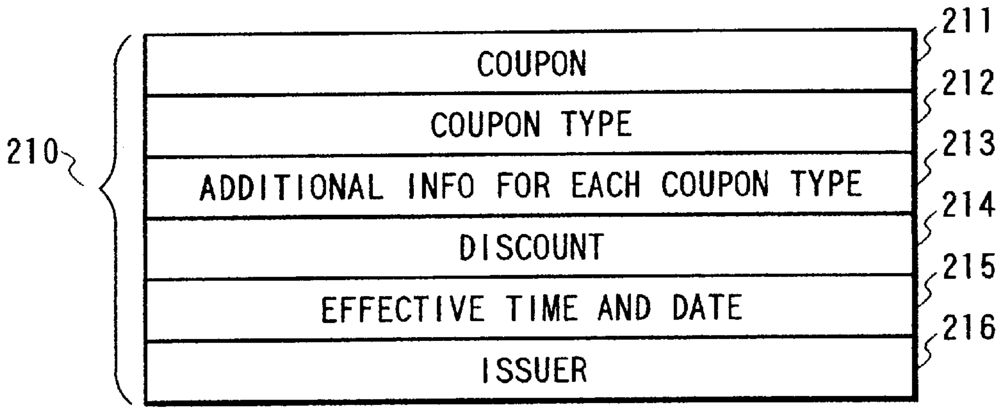
FIG. 65 is a diagram showing an exemplary structure of the above described COUPON attribute 210

The inventive system 50 displays a coupon in response to a request from the user during the play of application ($AID_{a-i}$). The coupon is for provide one or more applications with a discount. FIG. 65 is a diagram showing an exemplary structure of the above described COUPON attribute 210. In FIG. 65, the COUPON attribute 210 comprises an attribute ID (coupon) 211, coupon type 212, additional info for each coupon type 213, discount 214, effective time and date 215 and issuer 216. Some of providers give coupons to their users based on the record of usage of applications and services.

Figure 66:
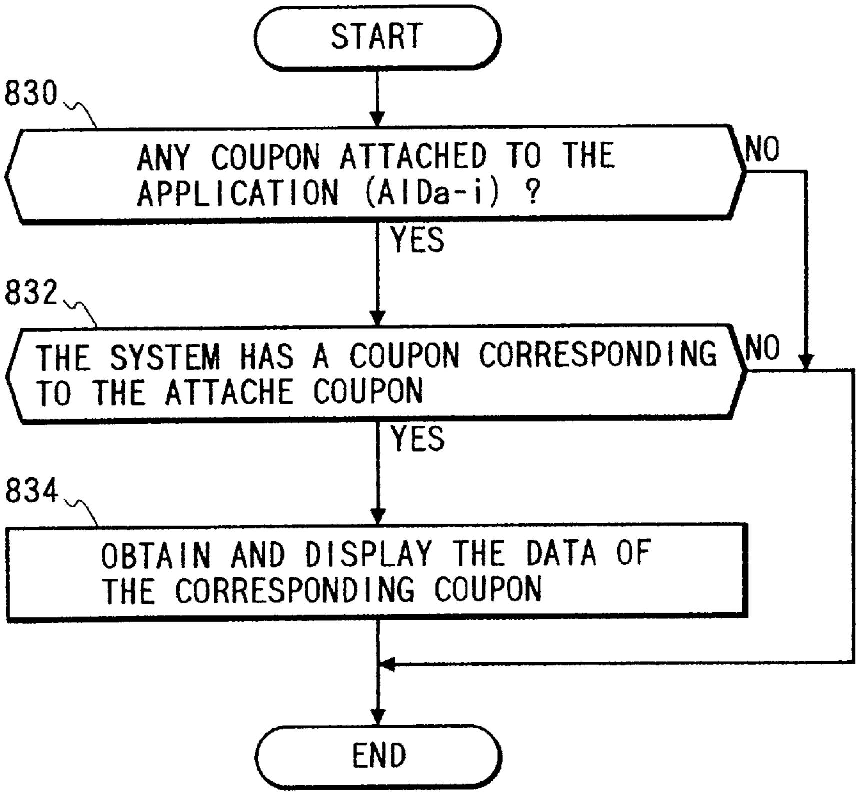
FIG. 66 is a flow chart showing the operation of a program for displaying coupon information.

FIG. 66 is a flow chart showing the operation of a program for displaying coupon information. In FIG. 66, the CPU 72 makes a test in step 830 to see if any coupon is attached to the active application ($AID_{a-i}$) If so, then in step 832 the CPU 72 makes another test to see if the system 50 has any coupon corresponding to the attached coupon. If so, the CPU 72 obtains and displays the data of the corresponding coupon in step 834 and ends the operation. Also, if the test result is NO in step 830 or 832, then the CPU 72 ends the operation. In this case, if there are a plurality of corresponding coupons, the system 50 may select one of them based on a certain criterion, or the system 50 may be so arranged as to permit the user to select a desired one of the corresponding coupons.

Figure 67:
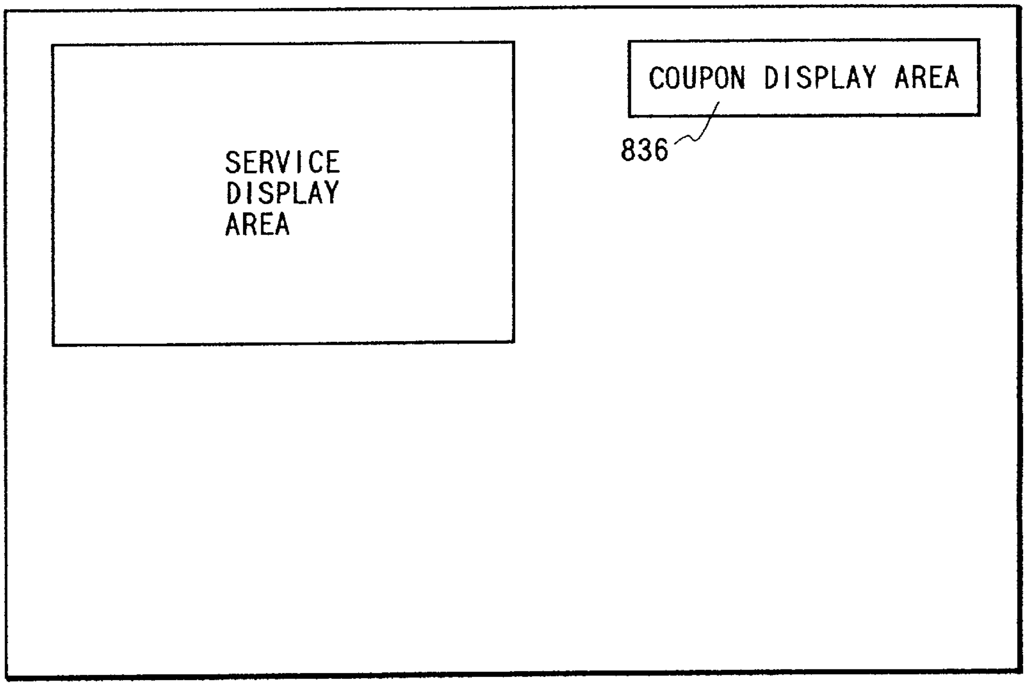
FIG. 67 is a diagram showing an exemplary display of coupon information.

FIG. 67 is a diagram showing an exemplary display of coupon information. In FIG. 67, coupon information is displayed in a upper right area. Displaying coupon information in this way will eliminate the need of looking for a coupon, making the system 50 easy to use.

Displaying Brand Information

Figure 68:
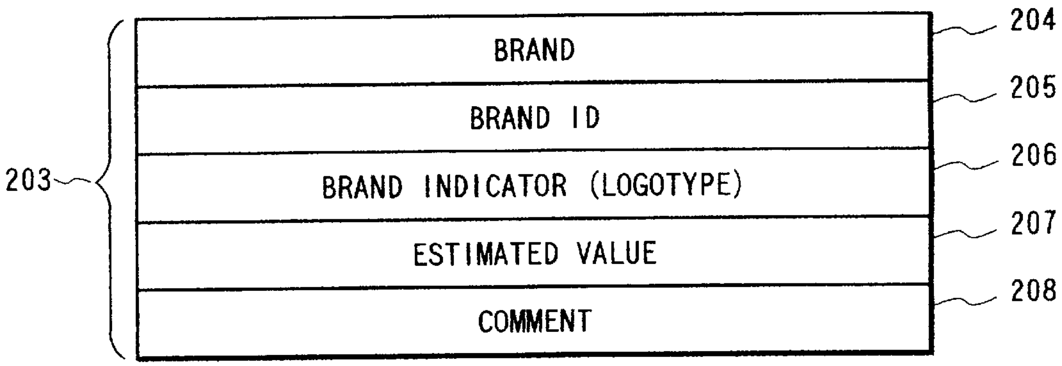
FIG. 68 is a diagram showing an exemplary structure of a brand attribute to be contained in SAI data.

The system 50 displays brand information of the active application ($AID_{a-i}$) in response to a request from the user. FIG. 68 is a diagram showing an exemplary structure of a brand attribute to be contained in SAI data. In FIG. 68, a BRAND attribute comprises an attribute ID (BRAND) 204, a brand ID 205, a brand indicator (e.g., a logotype) 207 for visually indicating the information brand, an estimated value 208 indicative of the degree of estimation and a comment.

Figure 69:
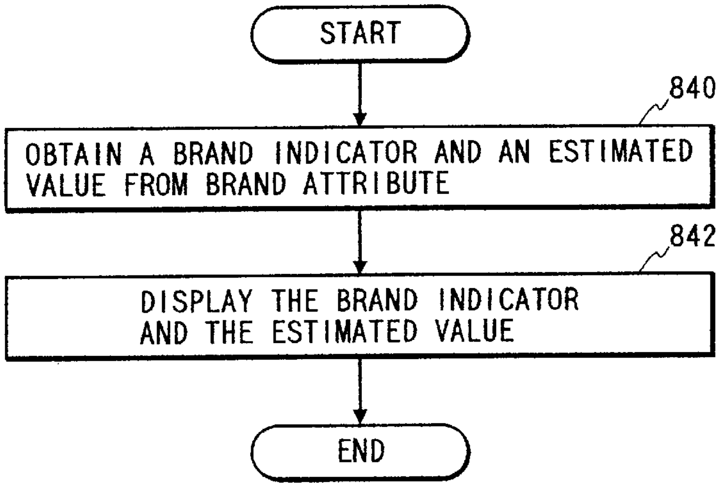
FIG. 69 is a flow chart showing the operation of a program for displaying brand information.

FIG. 69 is a flow chart showing the operation of a program for displaying brand information. In FIG. 69, the CPU 72 obtains a brand indicator 206 and an estimated value 207 from the BRAND attribute 203 contained in the SAI ($AID_{a-i}$) 10 in step 840. The CPU 72 displays the brand indicator and the estimated value in step 842. The brand information is preferably displayed before playing an application so that the user can decide whether to access to the application on checking the brand information. The brand information is displayed in the same manner as in the coupon display of FIG. 67.

Displaying Version Information

The system 50 displays version information of the active application ($AID_{a-i}$) in response to a request from the user. Since the version information is changed depending on the usage of the application ($AID_{a-i}$), each time a user uses any application, the system 50 stores the version number of the application used by the user in the log file 689 of the user.

Figure 70:
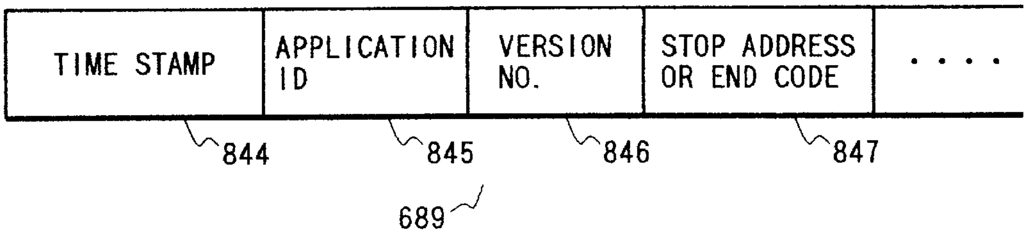
FIG. 70 is a diagram showing an exemplary structure of the log file of FIG. 39.

FIG. 70 is a diagram showing an exemplary structure of the log file of FIG. 39. In FIG. 70, each record of the log file 689 comprises the fields of time stamp 844 for containing time and date, application ID 845, version No. 846, stop address or end code 847 for use in the above described resume function, etc.

Figure 71:
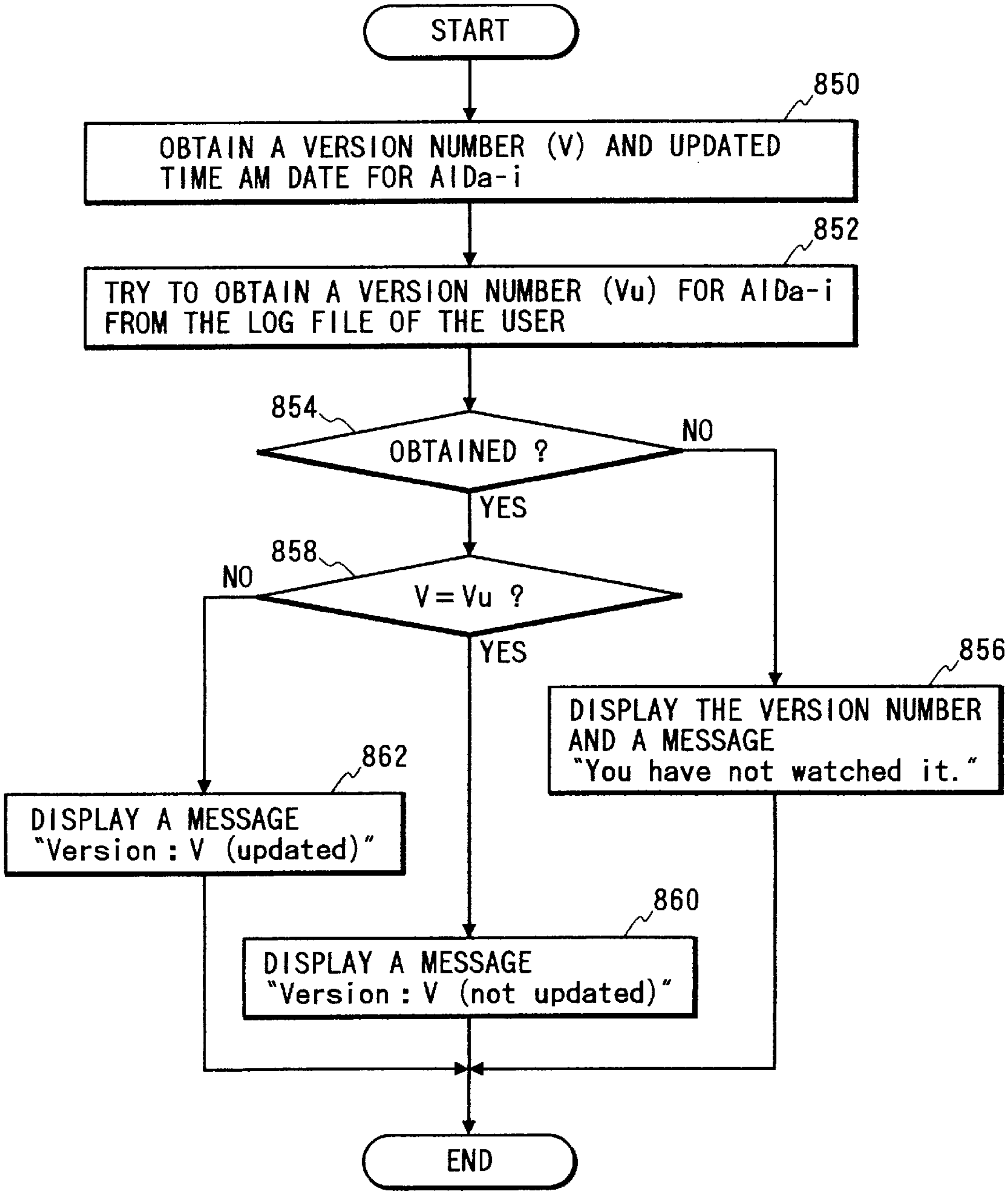
FIG. 71 is a flow chart showing the operation of a program for displaying version information.

FIG. 71 is a flow chart showing the operation of a program for displaying version information. In FIG. 71, the CPU 72 obtains a version number (V) for $AID_{a-i}$ from the version attribute 130 in step 850. In the next step 852, the CPU 72 tries to obtain a version number (Vu) for $AID_{a-i}$ from the log file 689 of the user. Then the CPU 72 makes test in step 854 to see if the version number is obtained. If so, the CPU makes another test in step 858 to see if the obtained version numbers coincide with each other. If so, then the CPU 72 displays a message "Version: V (not updated)" in step 860 and ends the operation. If the test result is NO in step 854, then the CPU 72 displays the version number (V) and the message "You have not watched it," in step 856 and ends the operation. If the test result is NO in step 858, then the CPU 72 displays a message "Version: V (updated)" in step 862 and ends the operation.

Modifications

In the above described embodiment, both application data and corresponding SAI has been obtained by broadcasting. However, the way of obtaining applications is not a matter of importance. If it is guaranteed that SAI 13 in a broad sense (all the data other than the application data of the main application) has been obtained before the main application data is used. Also, it is not necessary to obtain application data and SAIs by the same means. For example, application data may be obtained from some data base via a network or even by buying a optical disc such as a CD-ROM (compact disc read only memory), a DVD (digital versatile disc), etc, while SAIs are obtained periodically from a provider via the public communication network.

Many widely different embodiments of the present invention may be constructed without departing from the spirit and scope of the present invention. It should be understood that the present invention is not limited to the specific embodiments described in the specification, except as defined in the appended claims.

What is claimed is:

1. An application for use in a system capable of storing such applications and thereafter reproducing a desired one of the stored applications at any time, the application comprising:

application data which comprises any of static data to display, time series data to play and program to execute and which forms a main body of said application; and service adding information (SAI) comprising various data attributes including an application ID (identifier) of said application, said SAI being distributed independently from and prior to said application data, wherein said SAI is permitted to include:

a plurality of method IDs of methods processing object data specified by a method processing means;

a plurality of event attributes each defining an event which is expected to occur during reproduction of said application and an object to be executed in response to said event, said object comprising one of said methods;

a plurality of link attributes including application IDs of other applications for each permitting said SAI an access to a corresponding SAI of said other applications, thereby permitting said SAI to constitute a tree structure of applications (which is referred to as an "application package"); and a plurality of reference attributes for locating respective data sets in the system, wherein one of said applications of said application package is a main application, and wherein said link attributes and said reference attributes enable each of the methods identified by said plurality of method IDs to process as said object data any of said various data and said application data of lower layer applications which are directly and indirectly associated with said each of SAIs, permitting said main application to be provided with a wide variety of additional services.

2. A distributed application package for use in a system capable of storing the application packages and thereafter reproducing a desired one of the stored application packages at any time, the application package comprising at least one application, each of said at least one application comprising:

application data which comprises any of static data to display, time series data to play and program to execute and which forms a main body of the application; and service adding information (SAI) comprising various data including an application ID of said application, said SAI being distributed independently from and prior to said application data, wherein each of said SAIs is permitted to include:

a plurality of method IDs of methods for processing object data specified by a method processing means;

a plurality of event attributes each defining an event which is expected to occur during reproduction of said application and an object to be executed in response to said event, said object comprising one of said methods;

a plurality of link attributes comprising application IDs of other applications, in said application package, for each permitting said SAI an access to a corresponding SAI of said other applications, thereby permitting said SAIs to form a tree structure of said at least one application; and a plurality of reference attributes for locating respective data sets in the system, wherein one of said at least one application is a main application, and wherein said link attributes and said reference attributes enable each of the methods identified by said plurality of method IDs to process as said object data any of said various data and said application data of lower layer applications which are directly and indirectly associated with said each of SAIs, permitting said main application to be provided with a wide variety of additional services.

3. A distributed application package as defined in claim 2, wherein a predetermined code is inserted in at least one location in the application data of one of said at least one application, and wherein an event attribute contained in the SAI of said one of said at least one application defines as said event an occurrence of said predetermined code.

4. A distributed application package as defined in claim 2, wherein an event attribute contained in the SAI of one of said at least one application defines as said event an occurrence of a preset value of a timer.

5. A distributed application package as defined in claim 2, wherein an event attribute contained in the SAI of one of said at least one application defines as said event a reception of a command from the user.

6. A distributed application package as defined in claim 3, wherein said event attribute contained in the SAI of said one of said at least one application further defines as said object an object for displaying a mark indicating that the user can use an information displaying function by means of a predetermined operation.

7. A distributed application package as defined in claim 3, wherein the SAI of one of said at least one application includes an event attribute which defines as said event a code entered by said predetermined operation and as said object an object for executing said information displaying function.

8. A method of broadcasting application packages for use in a system capable of receiving and storing said application packages and thereafter reproducing a desired one of said stored application packages at any time, wherein each of said application packages comprises at least one application, each of said at least one application comprising application data which comprises any of static data to display, time series data to play and program to execute and which forms a main body of the application and service adding information (SAI) comprising various data including an application ID of said application, the method comprising the steps of:

preparing the contents for a TV program as application data of a main one of said at least one application;

preparing an SAI in a broad sense (i.e., the SAI of said main application and applications other than said main application);

prior to broadcasting said contents, broadcasting said SAI in broad sense; and broadcasting said contents at a predetermined broadcasting time, wherein said step of preparing said SAI in a broad sense comprises the steps of:

including, if necessary in each SAI of said SAI in a broad sense, at least one method ID of methods for processing object data specified by a method processing means;

including, if necessary in each SAI of said SAI in a broad sense, at least one event attribute defining an event which is expected to occur during reproduction of the application of said each SAI and an object to be executed in response to said event, said object comprising one of said methods;

including, if necessary in each SAI of said SAI in a broad sense, at least one link attribute comprising application ID(s), of other applications than said each SAI, for permitting said each SAI an access to SAI of said other applications, thereby permitting all of said SAIs to form a tree structure of said at least one application; and including, if necessary in each SAI of said SAI in a broad sense, at least one reference attribute for locating respective data sets in the system, wherein said at least one link attribute and said at least one reference attribute enable each of the method(s) identified by said at least one method ID to process, as said object data, any of said various data and said application data of lower layer applications which are directly and indirectly associated with said each SAI, permitting said main application to be provided with a wide variety of additional services.

9. A method as defined in claim 8, wherein said step of preparing said SAI in a broad sense comprises the steps of:

inserting a predetermined code in at least one location in the application data of one of said at least one application; and including, in the SAI of said one of said at least one application, an event attribute defining as said event an occurrence of said predetermined code.

10. A method as defined in claim 8, wherein said step of preparing said SAI in a broad sense comprises the step of including, in the SAI of one of said at least one application, an event attribute defining as said event an occurrence of a preset value of a timer.

11. A method as defined in claim 8, wherein said step of preparing said SAI in a broad sense comprises the step of including, in the SAI of one of said at least one application, an event attribute defining as said event a reception of a command from the user.

12. A method as defined in claim 9, wherein said step of preparing said SAI in a broad sense further comprises the step of including, in said event attribute contained in the SAI of said one of said at least one application as said object, an object for displaying a mark indicating that the user can use an information displaying function by means of a predetermined operation.

13. A method as defined in claim 9, wherein said step of preparing said SAI in a broad sense further comprises the step of including, in the SAI of one of said at least one application, an event attribute which defines as said event a code entered by said predetermined operation and as said object an object for executing said information displaying function.

14. A method as defined in claim 9, wherein said step of preparing said SAI in a broad sense further comprises the step of including, in the SAIs of applications among said at least one application which are to be gathered into a group, a group attribute containing a group ID of said group.

15. A method as defined in claim 8, wherein said step of preparing said SAI in a broad sense further comprises the step of making EPG (electronic program guide) data the application data of one of said at least one application.

16. A method as defined in claim 8, wherein said step of preparing said SAI in a broad sense further comprises the step of including, in the SAI of each of said at least one application, an attribute containing data specifying the time limit of said each of said at least one application (hereinafter, referred to as "the application").

17. A method as defined in claim 8, wherein said step of preparing said SAI in a broad sense further comprises the step of including, in the SAI of each of said at least one application, an attribute containing information on at least one of a producer and a provider of the application data of the application.

18. A method as defined in claim 8, wherein said step of preparing said SAI in a broad sense further comprises the step of including, in the SAI of each of said at least one application, an attribute containing signature data with respect to the application data of the application.

19. A method as defined in claim 8, wherein said step of preparing said SAI in a broad sense further comprises the step of including, in the SAI of each of said at least one application, an attribute containing specifications with which the system is required to be provided in order to reproduce the application data of the application.

20. A method as defined in claim 8, wherein said step of preparing said SAI in a broad sense further comprises the step of including, in the SAI of each of said at least one application, an attribute containing qualifications the user has to have for the application data of the application.

21. A method as defined in claim 8, wherein said step of preparing said SAI in a broad sense further comprises the step of including, in the SAI of each of said at least one application, a plurality of attributes of an identical category with respective selection criterions included therein so as to cause said plurality of attributes to be selective used depending on the situation.

22. A method as defined in claim 8, wherein said step of preparing said SAI in a broad sense further comprises the step of including, in the SAI of each of said at least one application, an attribute containing one of a rebroadcast time and date and a broadcasting cycle.

23. A method as defined in claim 8, wherein said step of preparing said SAI in a broad sense further comprises the step of including, in the SAI of each of said at least one application, an attribute containing a version number and/or update time and data.

24. A method as defined in claim 8, wherein said step of preparing said SAI in a broad sense further comprises the step of including, in the SAI of each of said at least one application, an attribute containing the reliability of the application data of the application.

25. A method as defined in claim 8, wherein said step of preparing said SAI in a broad sense further comprises the step of adding, to original data of any attribute included in the SAI of each of said at least one application, at least one piece of substitute data available in case of a failure of said original data.

26. A method as defined in claim 8, wherein said step of preparing the contents comprises the step of preparing, for said contents, still picture data, moving picture data, program data and/or a combination of these data.

27. A method as defined in claim 8, wherein said step of preparing said SAI in a broad sense further comprises the step of preparing, for the application data of each of said at least one application, text data, still picture data, moving picture data, program data and/or a combination of these data.

28. A method as defined in claim 23, wherein said step of preparing said SAI in a broad sense further comprises the step of including, in the SAI of each of said at least one application, a method attribute containing a method ID of a method for providing the user with update information based on a comparison of said version number with a one recorded in a log file for said user stored in the system.

29. A method as defined in claim 23, wherein said step of preparing said SAI in a broad sense further comprises the step of including, in the SAI of each of said at least one application, a method attribute containing a method ID of a method for informing the user of the elapsed time from the last update time and data.

30. A method as defined in claim 22, wherein said step of preparing said SAI in a broad sense further comprises the step of including, in the SAI of each of said at least one application, a method attribute containing a method ID of a method for informing the user of the period of time till said rebroadcast time and date.

31. A method as defined in claim 22, wherein said step of preparing said SAI in a broad sense further comprises the step of including, in the SAI of each of said at least one application, a method attribute containing a method ID of a method for informing the user of the period of time till said time limit of the application.

32. A method as defined in claim 8, wherein said step of preparing said SAI in a broad sense further comprises the step of including, in the SAI of each of said at least one application, a method attribute containing a method ID of a method activated in response to a reception of a command intended for the application from the user for displaying IDs contained in said at least one link attribute.

33. A system capable of obtaining and storing application packages and of reproducing a desired one of the stored application packages at any time, each of said application packages comprising at least one application, each application comprising application data which forms a main body of the application and service adding information (SAI) comprising various data attributes including an application ID of the application, and said SAI being distributed independently from and prior to said application data, the system comprising:

a mass storage device for storing said application packages and other data and programs;

a plurality of methods stored in said mass storage device for providing respective functions;

user interface means responsive to a reception of a command code intended for each of said at least one application (hereinafter, referred to as "the application") from a user for providing a message associated with said command code and the application ID of the application; and means operative on the basis of said message and said application ID of the application, for executing one of said methods associated with said message using relevant data of the application identified by said application ID, thereby reproducing said relevant data of the application.

34. A system as defined in claim 33, further comprising:

means, responsive to a reception of said SAI, for temporarily storing in an event table the data contained in the event attributes of the application containing the method ID of said one of said methods to make said data available; and means responsive to an occurrence of one of events defined in said event table for executing an object associated with said one of events.

35. A system as defined in claim 34, wherein said means for executing an object comprises timer means responsive to a clock signal for providing a timer count, wherein said one of events is a preset value of said timer count.

36. A system as defined in claim 34, wherein said one of events is an input of said command code, and wherein said means for executing an object comprises means for monitoring said command code.

37. A system as defined in claim 34, wherein said one of events is an occurrence of a predetermined code in a data stream from the application caused by said execution of said one of said methods, and wherein said means for executing an object comprises means for monitoring said data stream for said predetermined code.

38. A system as defined in claim 33, further comprising:

means, responsive to said providing a message by said user interface means, for storing, in one of log files dedicated for said user, the application ID of the application and data indicative of a start of said reproduction of the application.

39. A system as defined in claim 38, further comprising:

means responsive to the completion of said reproduction of the application for changing said data indicative of said start of said application to data indicative of the completion of said application.

40. A system as defined in claim 38, further comprising:

means responsive to a reception of a code for interrupting said reproduction for changing said data indicative of said start of said application to data indicative of the interruption of said application and adding a stop address where said application was interrupted.

41. A system as defined in claim 40, wherein said user interface comprises:

means responsive to a reception of a command code intended for each of said at least one application from a user for searching the log file of said user for said data indicative of the interruption of said application;

means responsive to a success of the search for providing a message indicating that the application is to be started from said stop address; and means responsive to a failure of the search for providing said message associated with said command code.

* * * * *